(12) United States Patent
Iwase et al.

(10) Patent No.: US 7,688,822 B2
(45) Date of Patent: Mar. 30, 2010

(54) MULTIPLEXING DEVICE AND MULTIPLEXING METHOD, PROGRAM, RECORDING MEDIUM

(75) Inventors: Ayako Iwase, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 11/911,666

(22) PCT Filed: Apr. 20, 2006

(86) PCT No.: PCT/JP2006/308298

§ 371 (c)(1),
(2), (4) Date: Oct. 16, 2007

(87) PCT Pub. No.: WO2006/115163

PCT Pub. Date: Nov. 2, 2006

(65) Prior Publication Data

US 2009/0052469 A1 Feb. 26, 2009

(30) Foreign Application Priority Data

Apr. 22, 2005 (JP) .............................. 2005-125546

(51) Int. Cl.
*H04L 12/28* (2006.01)
*H04L 12/56* (2006.01)
*H04J 3/22* (2006.01)
*H04J 3/24* (2006.01)
*H04B 1/66* (2006.01)
*H04N 11/02* (2006.01)

(52) U.S. Cl. .................... 370/389; 370/474; 375/240.26

(58) Field of Classification Search ........................ None
See application file for complete search history.

(56) References Cited

U.S. PATENT DOCUMENTS

2001/0009548 A1* 7/2001 Morris ....................... 370/392

(Continued)

FOREIGN PATENT DOCUMENTS

JP          9 9215         1/1997

(Continued)

OTHER PUBLICATIONS

Rod Hewitt, "North American MPEG-2 Information", Nov. 24, 2003.*

(Continued)

*Primary Examiner*—Kevin C Harper
*Assistant Examiner*—Jianye Wu
(74) *Attorney, Agent, or Firm*—Oblon, Spivak, McClelland, Maier & Neustadt, L.L.P.

(57) ABSTRACT

The present invention relates to a multiplexer, a multiplexing method, a program, and a recording medium, whereby TS packets encoded with different encoding methods can be multiplexed. In the event of multiplexing each TS packet of a BS audio TS 173 wherein a BS audio ES 171 encoded with a first encoder is subjected to TS packetizing, and each TS packet of an HQ audio TS 183 wherein an HQ audio ES 181 encoded with a second encoder is subjected to TS packetizing, a control unit assumes a first virtual decoder capable of decoding a BS audio ES alone, and a second virtual decoder capable of decoding an HQ audio ES alone, and determines TS packets to be multiplexed based on an elementary buffer of each virtual decoder, a data transfer rate for the elementary buffer, and multiplexing constraints for random access. The present invention can be applied to a multiplexer configured to multiplex TS packets.

11 Claims, 34 Drawing Sheets

U.S. PATENT DOCUMENTS

| | | | |
|---|---|---|---|
| 2001/0055318 A1* | 12/2001 | Obata et al. | 370/474 |
| 2003/0021298 A1 | 1/2003 | Murakami et al. | |
| 2003/0106069 A1* | 6/2003 | Crinon | 725/134 |
| 2005/0013583 A1* | 1/2005 | Itoh | 386/1 |
| 2005/0122335 A1* | 6/2005 | MacInnis et al. | 345/520 |
| 2005/0163231 A1* | 7/2005 | Kato | 375/240.28 |
| 2005/0175029 A1* | 8/2005 | Cheung et al. | 370/465 |
| 2005/0259946 A1* | 11/2005 | Kitamura | 386/46 |
| 2006/0215664 A1 | 9/2006 | Iwase et al. | |
| 2009/0052469 A1* | 2/2009 | Iwase et al. | 370/474 |

FOREIGN PATENT DOCUMENTS

| | | |
|---|---|---|
| JP | 9 261604 | 10/1997 |
| JP | 11 41193 | 2/1999 |
| JP | 11 298891 | 10/1999 |
| JP | 2000 333155 | 11/2000 |
| JP | 2001 285234 | 10/2001 |
| JP | 2002 94930 | 3/2002 |
| JP | 2005 510975 | 4/2005 |

OTHER PUBLICATIONS

Sherif El-Henaoui, et al., "A Bandwidth Allocation Protocol for MPEG VBR Traffic in ATM Networks", Proceedings of IEEE Infocom 1996, XP010158179, vol. 3, Mar. 24, 1996, pp. 1100-1107.

* cited by examiner

FIG. 10

| 241 | 173 | 183 | 242 |

MULTIPLEXING DEVICE AND MULTIPLEXING METHOD, PROGRAM, RECORDING MEDIUM

TECHNICAL FIELD

The present invention relates to a multiplexer and a multiplexing method, a program, and a recording medium, and particularly relates to a multiplexer and a multiplexing method, a program, and a recording medium, whereby TS packets of audio streams encoded with different encoding methods can be multiplexed.

BACKGROUND ART

In the event of subjecting a video stream or audio stream to TS (Transport Stream) packetizing and multiplexing using the MPEG (Moving Picture Expert Group) method, a standard model (system target decoder (STD)) serving as a decoder is assumed, and encoding processing is performed so as to perform decoding processing correctly with this STD.

For example, with Patent Document 1, technology has been disclosed wherein, assuming an STD model shown in FIG. 2, an encoding apparatus such as shown in FIG. 1 subjects an elementary stream to TS packetizing to generate an MPEG transport stream.

The encoding apparatus shown in FIG. 1 comprises an access unit detector 1, a pseudo-access-unit calculator 2, a packetizer 3, and a scheduler 4. Also, the STD model shown in FIG. 2 comprises a previous-stage buffer 21, a subsequent-stage buffer 22, and a decoder 23.

The access unit detector 1 of the encoding apparatus obtains an access unit from an elementary stream, and detects the size and decoding point-in-time information of the access unit thereof. When dividing an access unit into pseudo-access units having a predetermined size depending on the size of the previous-stage buffer 21 shown in FIG. 2, and a data transfer rate as to the previous-stage buffer 21, the pseudo-access-unit calculator 2 calculates point-in-time when the pseudo-access unit thereof is input to the previous-stage buffer 21 (input completed point-in-time) (decoded point-in-time of the pseudo-access unit). The scheduler 4 calculates point-in-time when a multiplexed stream is supplied to the decoder (clock reference) and the size of a packet (packet size) based on the size of the pseudo-access unit and the pseudo-decoding point-in-time.

The packetizer 3 packetizes the elementary stream in accordance with the packet size, encodes the decoded point-in-time and the clock reference, and generates an MPEG transport stream. The generated MPEG transport stream is sent via a transmission path 5, or recorded in a recording medium 5.

Incidentally, in the event of subjecting an audio stream to TS packetizing using the MPEG method, and multiplexing the packetized TS packets into one transport stream, the audio stream thereof has been already encoded with a predetermined encoding method beforehand. Examples of this encoding method include a fixed-length encoding method and a variable-length encoding method.

Consequently, a situation can be conceived wherein two audio streams encoded with different encoding methods are multiplexed into one transport stream.

[Patent Document 1] Japanese Unexamined Patent Application Publication No. 9-261604

DISCLOSURE OF INVENTION

Problems to be Solved by the Invention

However, a situation wherein two audio streams encoded with different encoding methods are packetized to TS packets having the same PID, and multiplexed, has not been assumed with the STD model such as shown in FIG. 2, so it has been difficult to packetize two audio streams encoded with different encoding methods to TS packets having the same PID, and multiplex the TS packets having the same PID into one transport stream.

The present invention, which has been made in light of such a situation, multiplexes the TS packets of two audio streams encoded with different encoding methods into one transport stream.

A multiplexer according to the present invention comprises: first encoding means configured to encode audio data using a first encoding method serving as a predetermined encoding method; second encoding means configured to encode the audio data using a second encoding method, which is a variable-length encoding method, and also differs from the first encoding method, arranged to add a timing value representing timing employed for a case of being decoded to each predetermined audio data unit; PES packetizing means configured to packetize the audio data encoded by the first encoding means, and the audio data encoded by the second encoding means to a PES packet, and also add point-in-time information employed for a case of being decoded to a plurality of the packetized PES packets; TS packetizing means configured to packetize the PES packet PES-packetized by the PES packetizing means to a TS packet, and also add the same ID to a plurality of the packetized TS packets; determining means configured to determine TS packets to be multiplexed from a plurality of the TS packets packetized by the TS packetizing means; and multiplexing means configured to multiplex the TS packets determined by the determining means; wherein the PES packetizing means packetize the audio data encoded by the first encoding means, and the audio data encoded by the second encoding means to a PES packet such that the audio data unit satisfying a predetermined cycle appears at the head of a PES payload; and wherein the determining means is configured to assume a first virtual decoder configured to decode the audio data encoded by the first encoding means, and a second virtual decoder configured to decode the audio data encoded by the second encoding means based on the timing value added to the audio data encoded by the second encoding means, and also determine TS packets to be multiplexed based on multiplexing constraints arranged to randomly access the multiplexed TS packets.

The determining means can be configured to determine TS packets to be multiplexed from a plurality of the TS packets packetized by the TS packetizing means based on a first elementary buffer included in the first virtual decoder and a data transfer rate as to the first elementary buffer, and a second elementary buffer included in the second virtual decoder and a data transfer rate as to the second elementary buffer.

The determining means can be configured to determine TS packets to be multiplexed from a plurality of the TS packets packetized by the TS packetizing means while causing the first elementary buffer included in the first virtual decoder, and the second elementary buffer included in the second virtual decoder to neither overflow nor underflow.

The multiplexer according to the present invention can be configured to further comprise recording means configured to record the TS packets multiplexed by the multiplexing means in a recording medium.

The audio data unit can be arranged to be an audio access unit.

The first virtual decoder can be configured to include a transport buffer at the previous stage of the first elementary buffer, and the second virtual decoder can be configured to include a transport buffer at the previous stage of the second elementary buffer, and also include a third elementary buffer at the subsequent stage of the second elementary buffer.

The determining means can be configured to determine TS packets to be multiplexed from a plurality of the TS packets packetized by the TS packetizing means, assuming that input timing as to the third elementary buffer is timing as to the timing value.

The timing value can be arranged to be a value represented with a sampling cycle of audio information at which the audio stream unit is transmitted to the third elementary buffer.

The PES packetizing means can be configured, in the event of subjecting the audio data encoded by the second encoding means to PES packetizing, to packetize the audio data encoded by the second encoding means such that the audio data unit satisfying the cycle, and including decoding information to start decoding from that position appears at the head of a PES payload.

The multiplexing constraints are constraints in which in the event that a TS includes a TS packet of audio data encoded by the second encoding means having the same point-in-time information as the point-in-time information included in a TS packet of audio data encoded by the first encoding means, the TS packet of the audio data encoded by the first encoding means is multiplexed prior to the TS packet of the audio data encoded by the second encoding means, and the determining means can be configured to determine TS packets to be multiplexed based on the assumptions of the first virtual decoder and the second virtual decoder, and the multiplexing constraints.

A multiplexing method according to the present invention comprises: a first encoding step arranged to encode audio data using a first encoding method serving as a predetermined encoding method; a second encoding step arranged to encode the audio data using a second encoding method, which is a variable-length encoding method, and also differs from the first encoding method, arranged to add a timing value representing timing employed for a case of being decoded to each predetermined audio data unit; a PES packetizing step arranged to packetize the audio data encoded by the processing in the first encoding step, and the audio data encoded by the processing in the second encoding step to a PES packet, and also add point-in-time information employed for a case of being decoded to a plurality of the packetized PES packets; a TS packetizing step arranged to packetize the PES packet PES-packetized by the processing in the PES packetizing step to a TS packet, and also add the same ID to a plurality of the packetized TS packets; a determining step arranged to determine TS packets to be multiplexed from a plurality of the TS packets packetized by the processing in the TS packetizing step; and a multiplexing step arranged to multiplex the TS packets determined by the processing in the determining step; wherein with the processing in the PES packetizing step, the audio data encoded by the processing in the first encoding step, and the audio data encoded by the processing in the second encoding step is packetized to a PES packet such that the audio data unit satisfying a predetermined cycle appears at the head of a PES payload; and wherein the processing in the determining step is arranged to assume a first virtual decoder configured to decode the audio data encoded by the processing in the first encoding step, and a second virtual decoder configured to decode the audio data encoded by the processing in the second encoding step based on the timing value added to the audio data encoded by the processing in the second encoding step, and also determine TS packets to be multiplexed based on multiplexing constraints arranged to randomly access the multiplexed TS packets.

A program according to the present invention arranged to control a computer to execute processing including: a first encoding step arranged to encode audio data using a first encoding method serving as a predetermined encoding method; a second encoding step arranged to encode the audio data using a second encoding method, which is a variable-length encoding method, and also differs from the first encoding method, arranged to add a timing value representing timing employed for a case of being decoded to each predetermined audio data unit; a PES packetizing step arranged to packetize the audio data encoded by the processing in the first encoding step, and the audio data encoded by the processing in the second encoding step to a PES packet, and also add point-in-time information employed for a case of being decoded to a plurality of the packetized PES packets; a TS packetizing step arranged to packetize the PES packet PES-packetized by the processing in the PES packetizing step to a TS packet, and also add the same ID to a plurality of the packetized TS packets; a determining step arranged to determine TS packets to be multiplexed from a plurality of the TS packets packetized by the processing in the TS packetizing step; and a multiplexing step arranged to multiplex said TS packets determined by the processing in the determining step; wherein with the processing in the PES packetizing step, the audio data encoded by the processing in the first encoding step, and the audio data encoded by the processing in the second encoding step is packetized to a PES packet such that the audio data unit satisfying a predetermined cycle appears at the head of a PES payload; and wherein the processing in the determining step is arranged to assume a first virtual decoder configured to decode the audio data encoded by the processing in the first encoding step, and a second virtual decoder configured to decode the audio data encoded by the processing in the second encoding step based on the timing value added to the audio data encoded by the processing in the second encoding step, and also determine TS packets to be multiplexed based on multiplexing constraints arranged to randomly access the multiplexed TS packets.

According to a first aspect of the present invention, the audio data encoded with the first encoding method, and the audio data encoded with the second encoding method are packetized to a PES packet, and also point-in-time information employed for a case of being decoded is added to a plurality of the packetized PES packets, and the PES packets are packetized to TS packets, and also the same ID is added to a plurality of the TS packets. Also, TS packets to be multiplexed are determined from a plurality of the TS packets, and the determined TS packets are multiplexed. The audio data encoded with the first encoding method, and the audio data encoded with the second encoding method are packetized to PES packets such that the audio data unit satisfying a predetermined cycle appears at the head of a PES payload. Further, with regard to the determination of TS packets to be multiplexed, TS packets to be multiplexed are determined, by assuming the first virtual decoder configured to decode the audio data encoded with the first encoding method, and the second virtual decoder configured to decode the audio data encoded with the second encoding method based on the timing value added to the audio data encoded with the second encoding method, based on multiplexing constraints arranged to randomly access TS packets to be multiplexed.

With a recording medium according to the present invention, a plurality of TS packets obtained by packetizing audio data encoded with a first encoding method serving as a predetermined encoding method to a plurality of PES packets, which are further packetized to a plurality of TS packets, and a plurality of TS packets obtained by packetizing audio data encoded with a second encoding method, which is a variable-length encoding method, and also differs from the first encoding method, arranged to add a timing value representing timing employed for a case of being decoded to each predetermined audio data unit to a plurality of PES packets, which are further packetized to a plurality of TS packets, are multiplexed and recorded, a plurality of the PES packets include point-in-time information employed for a case of being decoded, and also are obtained by the audio data encoded with the first encoding method, and the audio data encoded with the second encoding method being subjected to PES packetizing such that the audio data unit satisfying a predetermined cycle appears at the head of a PES payload, and a plurality of the TS packets include the same ID, and also are TS packets obtained by assuming a first virtual decoder configured to decode the audio data encoded with the first encoding method, and a second virtual decoder configured to decode the audio data encoded with the second encoding method based on the timing value added to the audio data encoded with the second encoding method, and also determining TS packets to be multiplexed based on multiplexing constraints arranged to randomly access the multiplexed TS packets.

According to a second aspect of the present invention, a plurality of TS packets obtained by packetizing audio data encoded with the first encoding method to a plurality of PES packets, which are further packetized to a plurality of TS packets, and a plurality of TS packets obtained by packetizing audio data encoded with the second encoding method arranged to add a timing value representing timing employed for a case of being decoded to each predetermined audio data unit to a plurality of PES packets, which are further packetized to a plurality of TS packets, are multiplexed and recorded, a plurality of the PES packets include point-in-time information employed for a case of being decoded, and also are obtained by the audio data encoded with the first encoding method, and the audio data encoded with the second encoding method being subjected to PES packetizing such that the audio data unit satisfying a predetermined cycle appears at the head of a PES payload, and a plurality of the TS packets include the same ID, and also are TS packets obtained by assuming a first virtual decoder configured to decode the audio data encoded with the first encoding method, and a second virtual decoder configured to decode the audio data encoded with the second encoding method based on the timing value added to the audio data encoded with the second encoding method, and also determining TS packets to be multiplexed based on multiplexing constraints arranged to randomly access the multiplexed TS packets.

According to the present invention, the TS packets of an audio stream can be multiplexed. In particular, according to the present invention, the TS packets of two audio streams encoded with different encoding methods can be multiplexed into one transport stream.

BRIEF DESCRIPTION OF THE DRAWINGS

FIG. 10 is a diagram describing a TS to be input to the TS multiplexing unit shown in FIG. 4.

Figure 1:
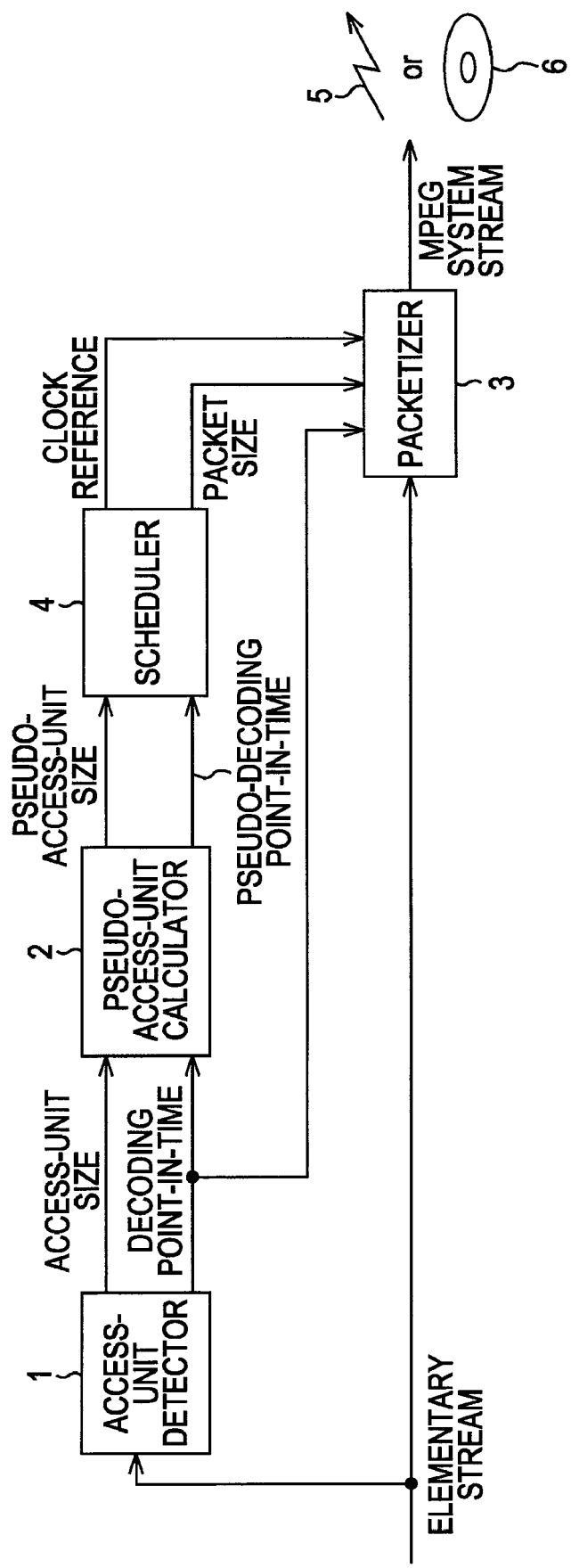
FIG. 1 is a diagram describing the configuration of an existing encoding apparatus.
Figure 2:
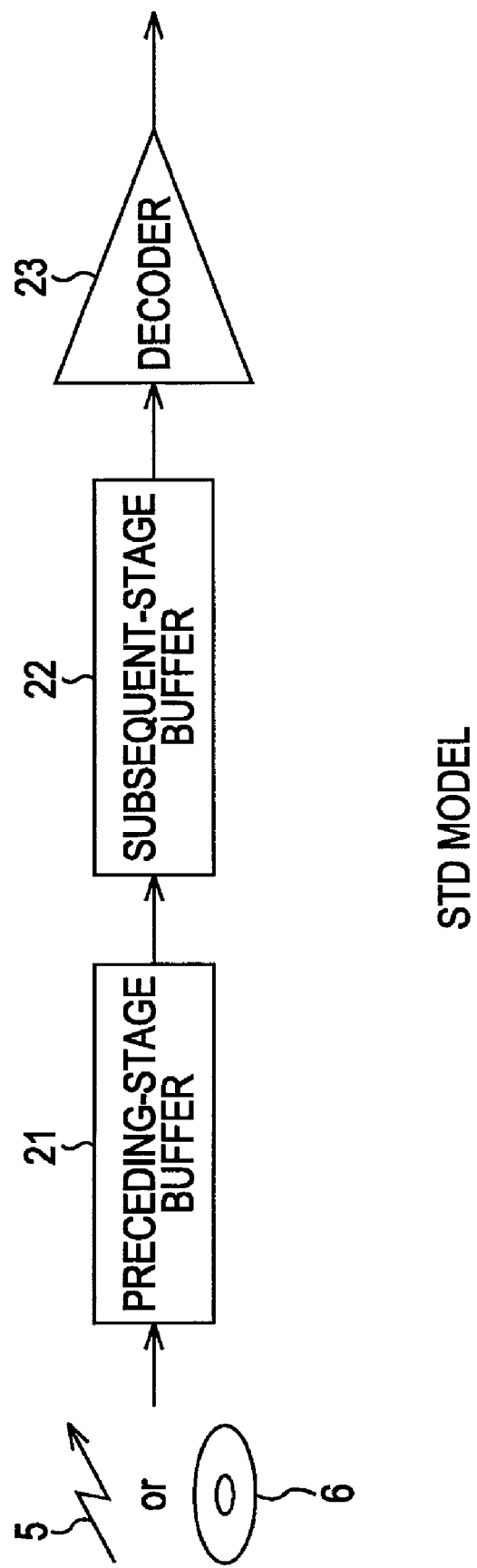
FIG. 2 is a diagram illustrating an STD model which the encoding apparatus in FIG. 1 assumes.

REFERENCE NUMERALS 111 sending apparatus
112 virtual receiving apparatus
121 virtual decoder
131 input unit
132 audio encoder
133 buffer
134 extraction information adding unit
135 control unit
136 PES-packetizing unit
137 TS-packetizing unit
138 multiplexing unit
139 sending unit
141 first encoder
142 second encoder
143 first buffer
144 second buffer
171 BS audio ES
172 BS audio PES
173 BS audio TS
181 HQ audio ES
182 HQ audio PES
183 HQ audio TS
190 transport stream
231-1 through 231-j BS audio TS packet
232-1 through 232-k HQ audio TS packet
261 PTS_DTS_flags
263 PTS
275 Input timing information
276 detailed information
341 PID filter
361-1, 361-2 transport priority filter
362-1, 362-2 transport buffer
363-1, 363-2 elementary buffer
364-1 audio decoder
364-2 audio decoder of a variable bit rate
391 FIFO buffer
392 audio decoder
501 recording apparatus
521 controller
522 operation input unit
526 recording control unit

BEST MODE FOR CARRYING OUT THE INVENTION

Description will be made below regarding an embodiment of the present invention with reference to the drawings.

Figure 3:
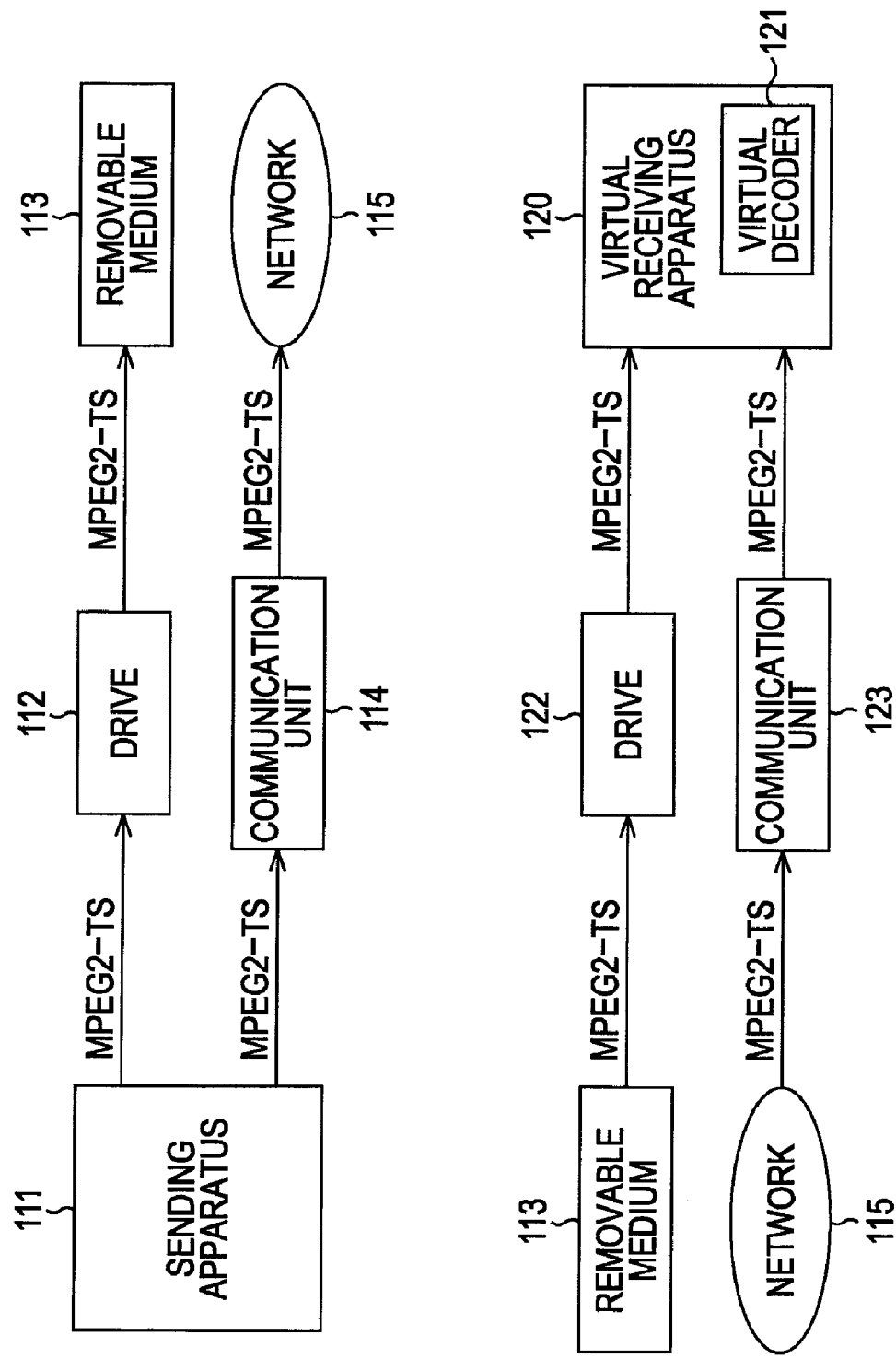
FIG. 3 is a diagram describing constraints in a case wherein a sending apparatus to which the present invention is applied encodes an audio stream using an MPEG2-TS method.

FIG. 3 is a diagram describing constraints in a case wherein a sending apparatus 111 to which the present invention is applied sends an audio stream using the MPEG (Moving Picture Experts Group) 2-TS (Transport Stream) (hereafter, referred to as MPEG2-TS) method.

The sending apparatus 111 is an apparatus wherein following a stream being subjected to PES packetizing using the MPEG2-TS method for example, the PES packets are packetized to TS packets, the TS packets are multiplexed to generate an MPEG2-TS (MPEG2 transport stream), and the MPEG2-TS is sent. For example, the sending apparatus 111 records the generated MPEG2-TS in a removable medium 113 via a drive 112, or controls a communication unit 114 to send the MPEG2-TS to a network 115. At this time, in the event of packetizing a video stream or audio stream to TS packets using the MPEG2-TS method, the sending apparatus 111 generates an MPEG2-TS by assuming a virtual decoder 121 provided in a virtual receiving apparatus 120 so as to perform decoding processing correctly at this virtual decoder. The virtual receiving apparatus 120, which is connected to a drive 122, is assumed to read out an MPEG2-TS recorded in the removable medium 113 via the drive 122, or controls a communication unit 123 to obtain an MPEG2-TS from the network 115. Note that the removable medium 113 is configured of a magnetic disk, optical disc, magneto-optic disc, or semiconductor memory, or the like. Also, a configuration example of the virtual decoder 121 will be described later with reference to FIG. 14 and FIG. 15.

Figure 4:
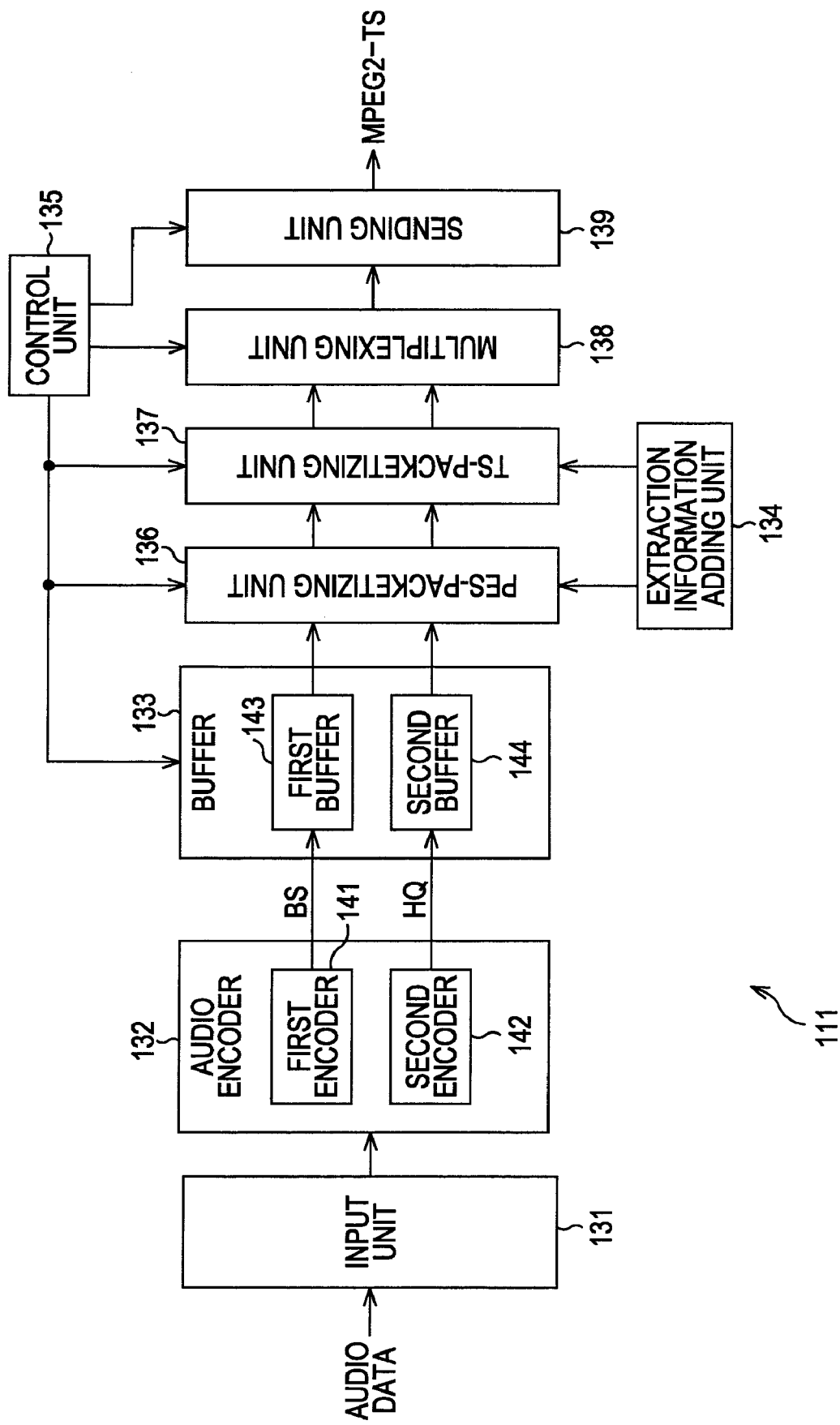
FIG. 4 is a diagram illustrating a configuration example of the sending apparatus in FIG. 3.

FIG. 4 is a block diagram illustrating a configuration example of the sending apparatus 111 shown in FIG. 3. In FIG. 4, description will be made regarding an arrangement wherein the sending apparatus 111 encodes an audio stream, packetizes this to TS packets (as MPEG2-TS packets), and sends the MPEG2-TS packets.

The sending apparatus 111 is provided with an input unit 131, an audio encoder 132, a buffer 133, an extraction information adding unit 134, a control unit 135, a PES (Packetized Elementary Stream) packetizing unit 136, a TS-packetizing unit 137, a multiplexing unit 138, and a sending unit 139. Also, the audio encoder 132 is provided with a first encoder 141, and a second encoder 142. Further, the buffer 133 is provided with a first buffer 143, and a second buffer 144.

Audio data to be sent is input to the input unit 131. The input unit 131 supplies input audio data to the first encoder 141 and the second encoder 142 of the audio encoder 132.

The first encoder 141 is an encoder configured to encode audio data with an audio encoding method decodable with a general-purpose audio decoder (e.g., fixed-length encoding method). The second encoder 142 is an encoder configured to encode audio data with an audio encoding method decodable with a high-performance audio decoder alone (e.g., variable-length encoding method). Specifically, the second encoder 142 is an audio of a variable bit rate (VBR), and performs encoding using an audio encoding method which employs a FIFO (First-In First-Out) buffer configured to suppress the peak rate of a VBR low at the time of decoding. Also, the second encoder 142 adds a timing value indicating time represented with a sampling cycle of audio information wherein an audio access unit is transferred to the FIFO buffer (a later-described FIFO buffer 391 shown in FIG. 10) of the virtual decoder at the time of encoding. Note that a timing value indicating time represented with a sampling cycle of audio information wherein an audio access unit is transferred to the FIFO buffer of the virtual decoder, which is added when the second encoder 142 performs encoding, will be also referred to as input timing below. Note that the first encoder 141 adds no input timing at the time of encoding.

Now, the second encoder 142 performs encoding using a high-performance encoding method as compared with the first encoder 141, so audio playback quality increases, functionality increases in the case of decoding and playing an audio stream which is a result of encoding with the second encoder 142 as compared with the case of decoding and playing an audio stream which is a result of encoding with the first encoder 141.

Note that, hereinafter, an encoding method employed by the first encoder 141 will be referred to as a first encoding method, and an encoding method employed by the second encoder 142 will be referred to as a second encoding method. The second encoding method is a variable bit rate (VBR) audio, and is an audio encoding method employing a FIFO (First-In First-Out) buffer configured to suppress the peak rate of a VBR low at the time of decoding. That is to say, the second encoding method is a variable-length encoding method, and in the event of decoding an audio ES encoded with this method, an FIFO buffer is necessary at the decoding side. Now, let us say that the output bit rate of an audio stream to be encoded with a variable-length encoding method and to be output is a variable length. Conversely, let us say that the output bit rate of an audio stream to be encoded with a fixed-length encoding method and to be output is a fixed length. Hereinafter, a stream which is a result of the first encoder 141 encoding audio data using the first encoding method will be referred to as a BS audio ES (basic audio elementary stream), and a stream which is a result of the second encoder 142 encoding audio data using the second encoding method will be referred to as an HQ audio ES (high quality audio elementary stream).

The first encoder 141 encodes audio data supplied from the input unit 131 using the first encoding method, and supplies a BS audio ES obtained as a result thereof to the first buffer 143 of the buffer 133. The second encoder 142 encodes audio data supplied from the input unit 131 using the second encoding method, and supplies an HQ audio ES obtained as a result thereof to the second buffer 144 of the buffer 133. Thus, the first buffer 143 stores (buffers) a BS audio ES, and the second buffer 144 stores (buffers) an HQ audio ES. Subsequently, each of the first buffer 143 and the second buffer 144 reads out an audio stream stored in itself at a predetermined timing based on the control from the control unit 135, and supplies this to the PES-packetizing unit 136.

The control unit 135 monitors a BS audio ES stored in the first buffer 143 and an HQ audio ES stored in the second buffer 144, or controls each unit of the PES-packetizing unit 136, TS-packetizing unit 137, multiplexing unit 138, and sending unit 139. Also, the control unit 135 manages a PTS (Presentation Time Stamp) serving as point-in-time information employed in a case of being decoded, or supplies a PID (Packet Identification) to be added to a TS packet for identifying the type of stream to the TS-packetizing unit 137. Further, assuming a later-described virtual decoder 121 shown in FIG. 14 and FIG. 15 as a virtual decoder, the control unit 135 performs the calculation of the amount of occupied buffer of the virtual decoder 121, and also determines TS packets to be multiplexed from the multiple TS packets packetized by the TS-packetizing unit 137 based on multiplexing constraints for random access. In other words, the control unit 135 determines (controls) TS packets which the multiplexing unit 138 multiplexes based on the calculation of the amount of occupied buffer of the virtual decoder 121, and multiplexing constraints for random access.

The PES-packetizing unit 136 extracts a BS audio ES stored in the first buffer 143, and an HQ audio ES stored in the second buffer 144 at the timing based on the control from the control unit 135, and packetizes these based on the control from the control unit 135. At this time, the PES-packetizing unit 136 stores the PTS supplied from the control unit 135 in each PES packet of a PES. That is to say, a PTS is stored in each PES packet (a PES packet corresponding to a BS audio ES and a PES packet corresponding to an HQ audio ES) output from the PES-packetizing unit 136.

With the present embodiment, let us say that each of the multiple PES packets (BS audio PES packets) generated based on a BS audio ES is supplied to the TS-packetizing unit 137 from the TS-packetizing unit 136 continuously in a predetermined order. In this case, consequently, one stream made up of the multiple BS audio PES packets (hereafter, this one stream will be referred to as a BS audio PES) is supplied to TS-packetizing unit 137 from the PES-packetizing unit 136. Also, let us say that each of the multiple PES packets generated based on an HQ audio ES (HQ audio PES packets) is supplied to the TS-packetizing unit 137 from the TS-packetizing unit 136 continuously in a predetermined order. In this case, consequently, one stream made up of the multiple HQ audio PES packets (hereafter, this one stream will be referred to as an HQ audio PES) is supplied to TS-packetizing unit 137 from the PES-packetizing unit 136.

The extraction information adding unit 134 supplies an ID (Identification) having a unique value added uniquely to each type of a BS audio stream and an HQ audio stream to the TS-packetizing unit 137 so as to allow the decoding side (virtual receiving apparatus 120 side shown in FIG. 3) to extract a BS audio stream and an HQ audio stream (i.e., streams encoded with different encoding methods). That is to say, the extraction information adding unit 134 supplies identification information (ID) for identifying each of a BS audio stream and an HQ audio stream to the TS-packetizing unit 137.

As for this ID, for example, a Transport_priority flag included in a transport packet header can be employed. The extraction information adding unit 134 supplies to the TS-packetizing unit 137 information (extraction information) such as setting Transport_priority=1 to a transport packet for sending a BS audio stream, and setting Transport_priority=0 to a transport packet for sending an HQ audio stream.

The TS-packetizing unit 137 packetizes the PES packet stream supplied from the PES-packetizing unit 136 to TS packets (transport stream packets) based on the control of the control unit 135. Specifically, the TS-packetizing unit 137 packetizes the BS audio PES supplied from the PES-packetizing unit 136 to TS packets, and also packetizes the HQ audio PES supplied from the PES-packetizing unit 136 to TS packets. At this time, not only an ID (e.g., Transport_priority flag) supplied from the extraction information 134, but also a PID from the control unit 135 are supplied to the TS-packetizing unit 136. With the present embodiment, let us say that a PID included in a BS audio stream and a PID included in an HQ audio stream are the same ID. That is to say, in the event that audio TS packets encoded with the two different encoding methods are multiplexed into one audio stream, a PID is added such that this one audio stream has the same ID as a whole. The TS-packetizing unit 137 generates TS packets so as to include the extraction information (e.g., Transport_priority flag) supplied from the extraction information adding unit 134, and the PID supplied from the control unit 135 (in the headers of the TS packets). Note that, hereafter, the results of a BS audio PES being packetized to TS packets are referred to as BS audio TS packets, and the results of an HQ audio PES being packetized to TS packets are referred to as HQ audio TS packets. Also, with BS audio TS packets and HQ audio TS packets, extraction information (e.g., Transport_priority flag) added to each TS packet differs, but with the same PID.

The multiplexing unit 138 multiplexes the TS packets supplied from the TS-packetizing unit 137 based on the control of the control unit 135. Specifically, the multiplexing unit 138 multiplexes the BS audio TS packets and the HQ audio TS packets supplied from the TS-packetizing unit 137 based on the control of the control unit 135, and generates an audio stream (MPEG2-TS) having the same PID as one stream. At this time, description will be made later regarding constraints such as the order of TS packets to be multiplexed by the PES-packetizing unit 136, and constraints when the PES-packetizing unit 136 performs PES packetizing. The multiplexing unit 138 sends the multiplexed and generated MPEG2-TS to the sending unit 139 which is the subsequent stage.

The sending unit 139 sends the MPEG2-TS supplied from the multiplexing unit 138. For example, the sending unit 139, as shown in FIG. 3, controls the drive 112 to record the MPEG2-TS in the removable medium 113, or controls the communication unit 114 to send the MPEG2-TS to an external apparatus via the network 115.

Note that the extraction information adding unit 134 not only supplies an ID serving as extraction information to the TS-packetizing unit 137, but also may further send extraction information to the PES-packetizing unit 136. For example, the extraction information adding unit 134 supplies an ID having a unique value added uniquely to each type of a BS audio stream and an HQ audio stream to the PES-packetizing unit 146 so as to allow the decoding side (e.g., the virtual receiving apparatus 121 side shown in FIG. 3) to extract each type of stream of a BS audio stream and an HQ audio stream.

As for this ID, with the present embodiment, Stream_id or Sream_id_extension is employed. Stream_id denotes Stream_id included in Stream_id included in a PES packet header conformed to the MPEG2 systems specifications. Also, Sream_id_extension denotes Sream_id_extension included in a PES packet header conformed to the MPEG2 systems specifications Amendment2 (2003). In the event that an audio stream is a stream other than MPEG Audio (MPEG-1/-2 Audio, MPEG ACC), Sream_id_extension is preferably employed. In the event of employing Sream_id_extension, the MPEG2 systems specifications Amendment2 (2003) stipulates to set "111111 1101" (value meaning extension_ stream_id) to Stream_id. Also, the MPEG2 systems specifications Amendment2 (2003) stipulates to enable Sream_id_extension having a unique value for identifying the type of stream (BS audio stream and HQ audio stream) to be employed.

In the event of the extraction information adding unit supplying a stream ID (e.g., Sream_id_extension) to the PES-packetizing unit 136, the PES-packetizing unit 146 packetizes each of the obtained BS audio stream and HQ audio stream to PES packets so as to include corresponding one stream ID of stream IDs (e.g., Sream_id_extension) supplied from the extraction information adding unit 134 in the PES packets. Each stream ID of the PES packets is an ID for identifying the type of corresponding PES packet. Now, the type of PES packet is either of a BS audio stream or an HQ audio stream. For example, the PES packet of the type of a BS audio stream denotes a PES packet including at least part of data of a BS audio stream (BS audio ES). Accordingly, in order that the virtual receiving apparatus 120 shown in FIG. 3 serving as the receiving side selects a PES packet of a desired type of audio stream, it is necessary to recognize the value of a stream ID added to the PES packet thereof.

Figure 5:
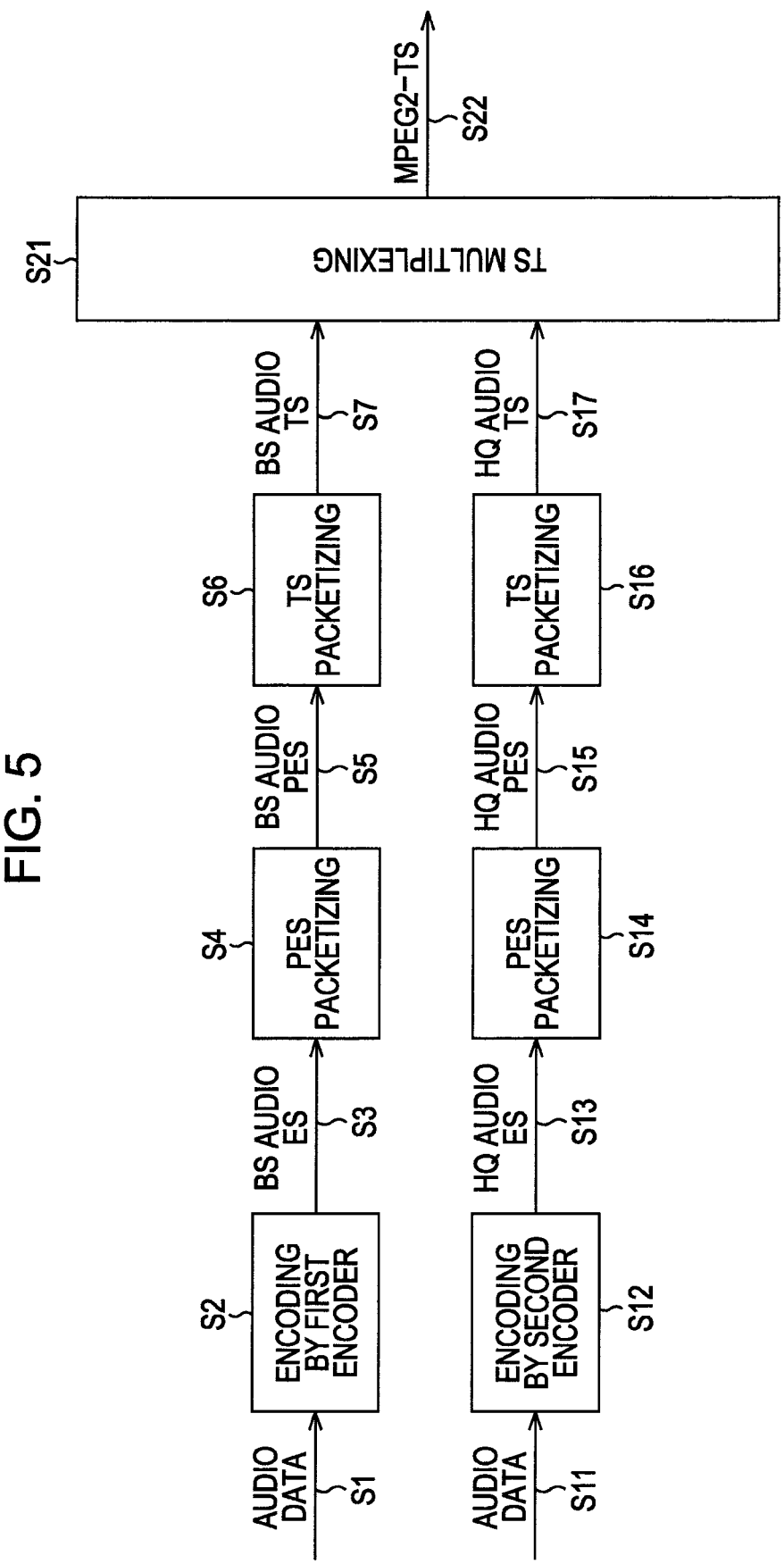
FIG. 5 is a diagram describing the data flows of a BS audio ES and an HQ audio ES.

Next, a data (stream) flow example in the sending apparatus 111 shown in FIG. 4 will be briefly described with reference to the flowchart shown in FIG. 5.

The input unit 131 supplies input audio data to the first encoder 141 in step S1, and also supplies this to the second encoder 142 in step S11. The first encoder 141 encodes the input audio data in step S2, and supplies a BS audio ES to the PES-packetizing unit 136 in step S3. The PES-packetizing unit 136 packetizes the BS audio ES supplied from the first encoder 141 to PES packets, and supplies the BS audio PES to the TS-packetizing unit 137. The TS-packetizing unit 137 packetizes the BS audio PES supplied from the PES-packetizing unit 136 in step S6 to TS packets, and supplies the BS audio TS to the multiplexing unit 138 in step S7. Also, similarly, the second encoder 142 encodes the audio data input in step S12, and supplies an HQ audio ES to the PES-packetizing unit 136 in step S13. The PES-packetizing unit 136 packetizes the HQ audio ES supplied from the second encoder 142 in step S14 to PES packets, and supplies the HQ audio PES to the TS-packetizing unit 137 in step S15. The TS-packetizing unit 137 packetizes the HQ audio PES supplied from the PES-packetizing unit 136 in step S16 to TS packets, and supplies the HQ audio TS to the multiplexing unit 138 in step S17. The multiplexing unit 138 multiplexes the BS audio TS and HQ audio TS supplied in the processing in step S7 and step S17 to generate one MPEG2-TS (transport stream) in step S21, and outputs the generated MPEG2-TS in step S22 (in the case of FIG. 4, outputs to the sending unit 139).

Thus, the BS audio ES encoded and obtained by the first encoder 141, and the HQ audio ES encoded and obtained by the second encoder 142 are each independently packetized to PES packets (step S4 and step S14), and also packetized to TS packets (step S6 and step S16), and multiplexed into one audio stream (transport stream) at the multiplexing unit 138.

Figure 6:
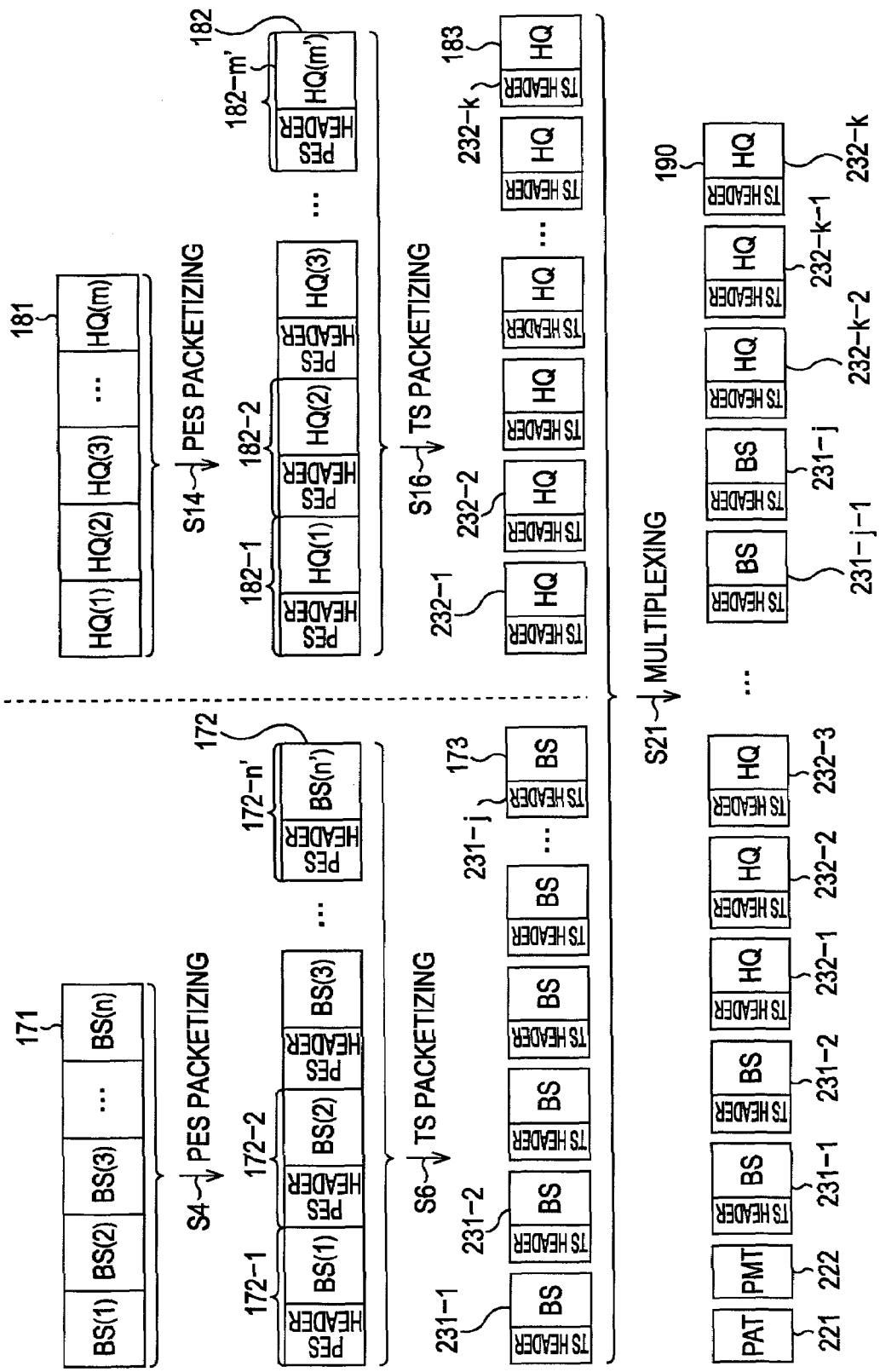
FIG. 6 is a diagram describing a data configuration example of a BS audio ES and an HQ audio ES.

A more specific example will be described with reference to FIG. 6. In FIG. 6, the same step numbers are appended with regard to the processing corresponding to the processing in FIG. 5.

With the example shown in FIG. 6, the first stage illustrates a BS audio ES 171 and an HQ audio ES 181, the second stage illustrates a BS audio PES 172 and an HQ audio PES 182, the third stage illustrates a BS audio TS 173 and an HQ audio TS 183, and the fourth stage illustrates a TS (transport stream) 190.

The BS audio ES 171 illustrates a state of being encoded and output by the first encoder 141 shown in FIG. 4, the BS audio PES 172 illustrates a state of being PES-packetized (step S4) and output by the PES-packetizing unit shown in FIG. 4, and the BS audio TS 173 illustrates a state of being TS-packetized (step S6) and output by the TS-packetizing unit 137 shown in FIG. 4. Also, the HQ audio ES illustrates a state of being encoded and output by the second encoder 142 shown in FIG. 4, the HQ audio PES 182 illustrates a state of being PES-packetized (step S14) and output by the PES-packetizing unit 136 shown in FIG. 4, and the HQ audio TS 183 illustrates a state of being TS-packetized (step S16) and output by the TS-packetizing unit 137 shown in FIG. 4. The TS 190 illustrates a state of being multiplexed (step S21) and output by the multiplexing unit 138 shown in FIG. 4.

Both of the BS audio ES 171 and the HQ audio ES 181 are encoded with a predetermined number of audio samples as one unit, and are separated and shown by a suffix shown in a parenthesis for each unit. Specifically, for example, the BS audio ES 171 is encoded by being separated into multiple units (audio access units) such as BS(1), BS(2), and so on through BS(n) (n is an arbitrary integer). Similarly, for example, the HQ audio ES 181 is encoded by being separated into multiple units (audio access units) such as HQ(1), HQ(2), and so on through HQ(m). An audio access unit is an encoding unit making up an audio ES, and is also a decoding unit. For example, let us say that in the event of playing one audio access unit of a BS audio ES, the playback time thereof is 32 milliseconds, and in the event of playing one audio access unit of an HQ audio ES, the playback time thereof is 1/1200 second.

The PES-packetizing unit 136 shown in FIG. 4 packetizes the BS audio ES 171 and the HQ audio ES 181 to PES packets having a different stream ID. For example, the PES-packetizing unit 136 sets the stream ID of each PES packet corresponding to the BS audio ES 171 to "Stream_id_extension=b1", and adds this to the PES header of a PES packet to be generated. Also, for example, the PES-packetizing unit 136 sets the stream ID of each PES packet corresponding to the HQ audio ES 181 to "Stream_id_extension=b2", and adds this to the PES header of a PES packet to be generated. In FIG. 4, the BS audio PES 172 is configured of PES packets 172-1 through 172-n' made up of a PES header and a PES payload (BS(1), BS(2), and so on through BS(n') in the drawing). In other words, the BS audio PES 172 is configured of n' (n' is an arbitrary integer) PES packets 172-1 through 172-n'. Also, the HQ audio PES 182 is configured of BS audio PES packets 182-1 through 182-m' made up of a PES header and a PES payload (HQ(1), HQ(2), and so on through BS(m') in the drawing). In other words, the HQ audio PES 182 is configured of m' (m' is an arbitrary integer) HQ audio PES packets 182-1 through 182-m'.

As for constraints in the case of PES packetizing, there is a constraint wherein PES packetizing needs to be performed such that there should be PES packets within one second wherein a PTS value stored in a PES header of the BS audio PES 172 is identical to a PTS value stored in a PES header of the HQ audio PES 182. Here, with between the BS audio PES packet 172-1 (PES packet made up of a PES header and a PES payload (described as BS(1)) in the drawing) and the HQ audio PES packet 182-1 (PES packet made up of a PES header and a PES payload (described as HQ(1)) in the drawing), the PTS values included in the mutual PES headers are equal. PES packetizing is performed such that such PES packets having the same PTS should exist within one second in the case of converting (calculating) the PTS into time. That is to say, PES packetizing is performed such that an HQ audio PES packets having the same PTS as the PTS of a BS audio PES packet exists within one second. Note that with the sending apparatus 111 shown in FIG. 4, the PES-packetizing unit 136 is configured to perform PES packetizing based on this constraint.

Figure 7:
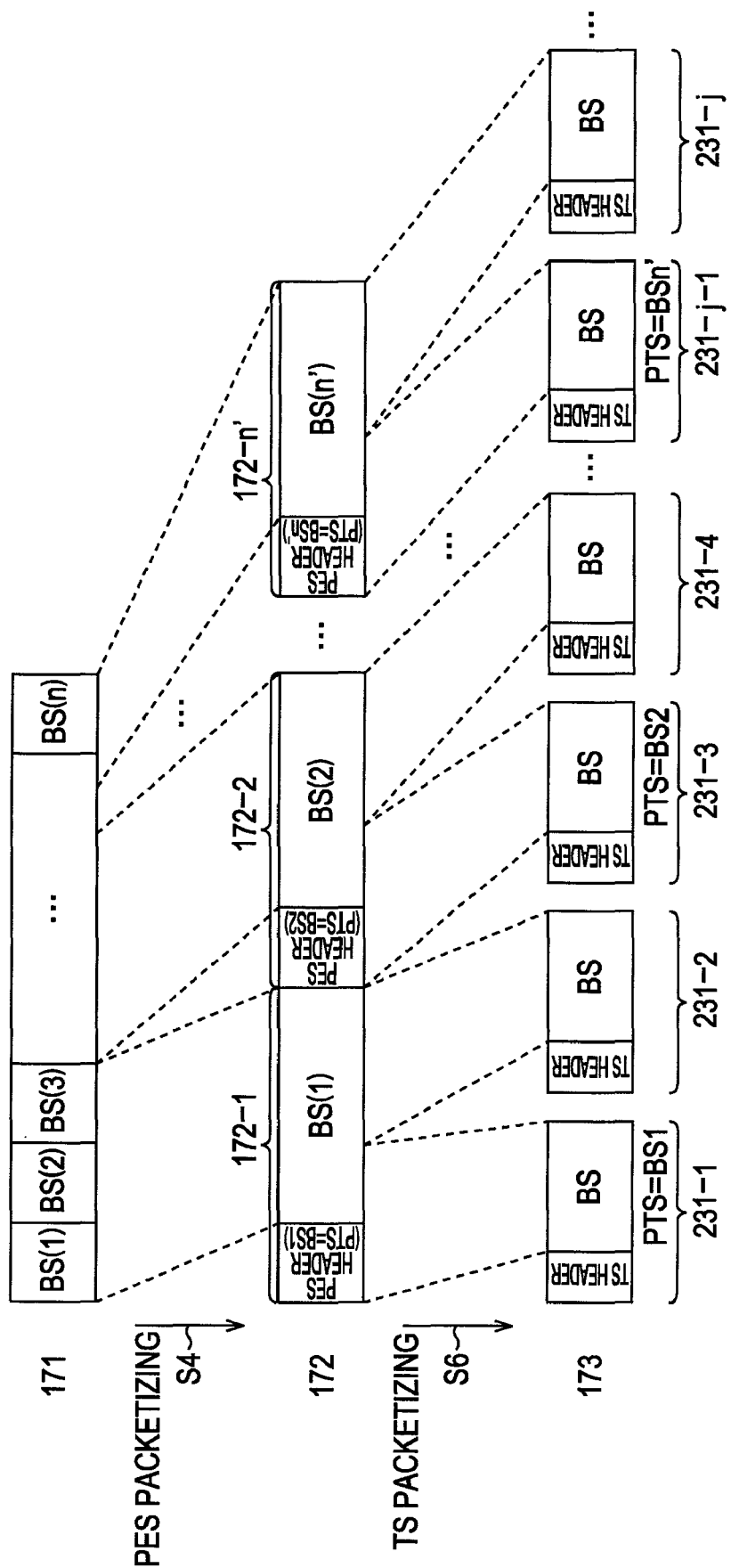
FIG. 7 is a diagram describing an example wherein a BS audio ES is converted into a BS audio TS.

For example, the PES-packetizing unit 136, as shown in the first stage and the second stage in FIG. 7, adds a PTS to each PES header of multiple BS audio PES packets making up the BS audio PES 172 (e.g., PTS=BS1 to the BS audio PES packet 172-1), and also stores one or more access units included in the BS audio ES 171 to each PES payload. Also, for example, the PES-packetizing unit 136, as shown in the first stage and the second stage in FIG. 8, adds a PTS to each PES header of multiple HQ audio PES packets making up the HQ audio PES 182 (e.g., PTS=HQ1 to the HQ audio PES packet 182-1), and also stores one or more access units included in the HQ audio ES 181 to each PES payload. Thus, the PES-packetizing unit 136 generates the BS audio PES 172 and the HQ audio PES 182 shown in FIG. 6, and supplies these to the TS-packetizing unit 137.

On the other hand, the TS-packetizing unit 137 packetizes each PES packet making up the BS audio PES 172 to TS packets, and also packetizes each PES packet making up the HQ audio PES 182 to TS packets. At this time, the TS-packetizing unit 137 adds a transport_priority flag for identifying the BS audio PES 172 and the HQ audio PES 182, and a PID for identifying an audio stream to the header (TS header) of a TS packet to be generated. That is to say, let us say that the PID stored in each TS header of the multiple TS packets 231-1 through 231-j (j is an arbitrary integer) making up the generated BS audio TS 173, and the PID stored in each TS header of the multiple TS packets 232-1 through 232-k (k is an arbitrary integer) making up the generated HQ audio TS 183 are the same PID, but the transport_priority flag stored in each TS header of the multiple TS packets 231-1 through 231-j making up the generated BS audio TS 173, and the transport_priority flag stored in each TS header of the multiple TS packets 232-1 through 232-k making up the generated HQ audio TS 183 differ.

Figure 8:
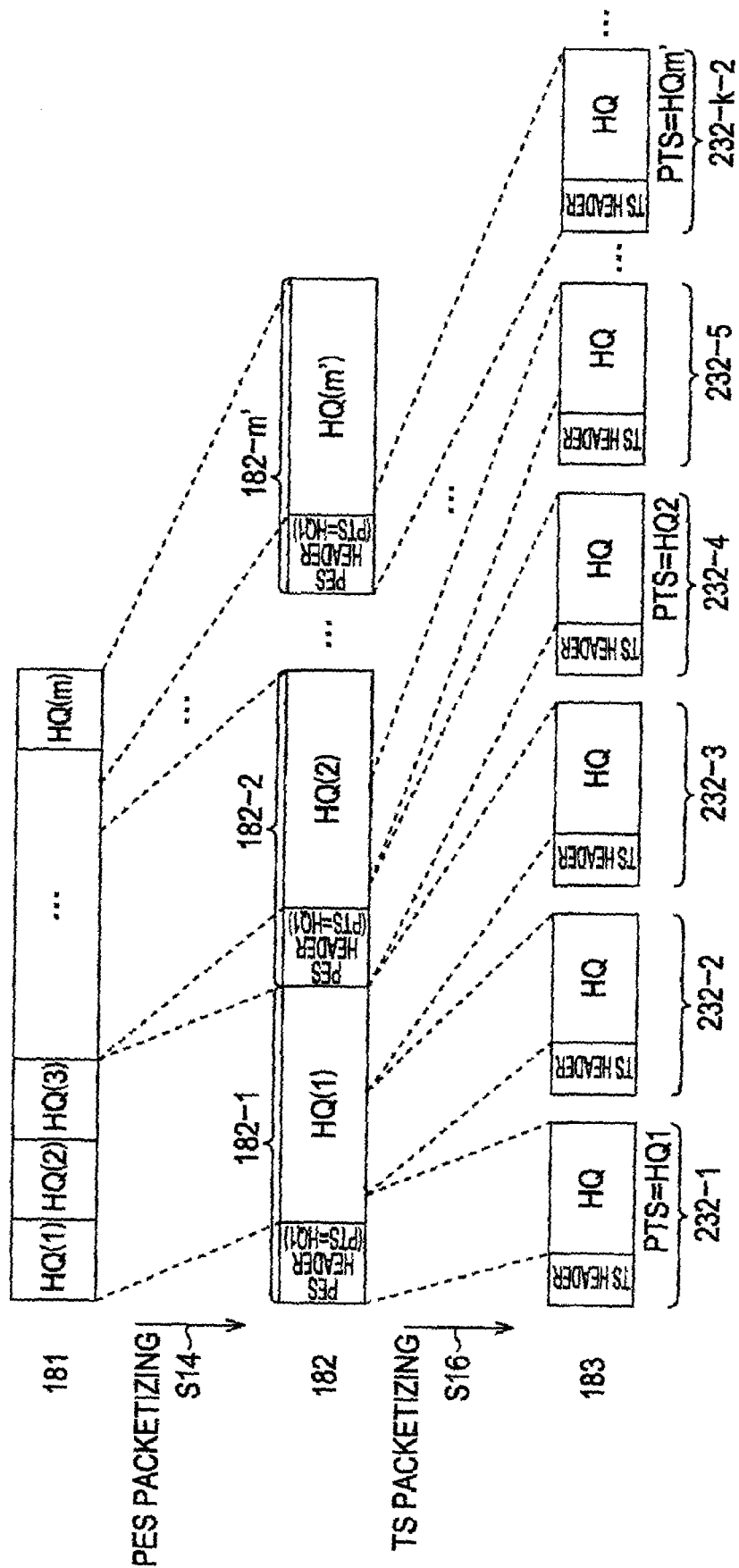
FIG. 8 is a diagram describing an example wherein an HQ audio ES is converted into an HQ audio TS.

Specifically, the TS-packetizing unit 137, as shown in the second stage and the third stage in FIG. 7, adds "PID=a0, tp (transport_priority)=1" to each TS header of the multiple BS audio TS packets making up the BS audio TS 173, and as shown in the second stage and the third stage in FIG. 8, adds "PID=a0, tp (transport_priority)=0" to each header of the multiple HQ audio TS packets making up the HQ audio TS 183.

Thus, the same PID is added to one audio stream (TS190), and a different tp (transport_priority) is added thereto to identify a BS audio ES and an HQ audio ES included in one stream.

The multiplexing unit 138 multiplexes the BS audio TS 173 and the HQ audio TS 183 based on the control from the control unit 135 to generate one transport stream (MPEG2-TS) 190. With the example shown in FIG. 6, the TS (MPEG2-TS) 190 is configured so as to include a TS packet 221 corresponding to a PAT (Program Association Table), a TS packet 222 corresponding to a PMT (Program Map Table), BS audio TS 231-1 through 231-j (j is an arbitrary integer), and HQ audio TS 232-1 through 232-k (k is an arbitrary integer).

As for constraints in the case of multiplexing this, there are the following two constraints.

The first constraint is a constraint wherein following completion of multiplexing of TS packets equivalent to one PES packet, multiplexing of TS packets equivalent to the next one PES packet needs to be performed. That is to say, with both of a BS audio ES and an HQ audio ES, TS packets equivalent to one PES packet needs to be multiplexed continuously, and also TS packets including different types of PES packets does not need to be mixed. As for a specific example, in the event that the BS audio PES packet 172-1 is stored in the TS payloads of the BS audio TS packets 231-1 through 231-3, and the HQ audio PES packet 182-1 is stored in the TS payloads of the HQ audio TS packets 232-1 through 232-3, the BS audio TS packets 231-1 through 231-3 need to be multiplexed continuously, and also the HQ audio TS packets 232-1 through 232-3 need to be multiplexed continuously. Based on this constraint, for example, following the BS audio TS packets 231-1 through 231-3, the HQ audio TS packets 232-1 through 232-3 are multiplexed continuously. According to this constraint, for example, with a playback apparatus capable of playback of other types of audio stream, audio can be managed smoothly.

The second constraint is a constraint (multiplexing constraint for random access) wherein with a relation between a BS audio TS packet and an HQ audio TS packet both having the same PTS value, multiplexing should be performed such that the HQ audio TS packet is certainly disposed after the BS audio TS packet. For example, in the event that the PTS value stored in the BS audio TS packet 231-1 and the PTS value stored in the HQ audio TS packet 232-1 have the same PTS value, it is necessary to perform multiplexing such that the HQ audio TS packet 232-1 is disposed after the BS audio TS packet 231-1 (not necessarily immediately after thereof, as long as after thereof). That is to say, there is provided a constraint wherein with regard to TS packets in which a PES packet and a PES payload having the same PTS value are stored, the TS packet of an HQ audio ES is disposed after the TS packet of a BS audio ES. This second constraint is a constraint based on a restriction wherein the entry point of an EP_map employed for performing random access needs to be an interval of one second or less. The details of an EP_map will be described later with reference to FIG. 23 through FIG. 29.

As for this cycle, for example, in the event that the playback time equivalent to the five audio access units of the BS audio ES 171 is equal to the playback time equivalent to the 192 audio access units of the HQ audio ES 181, consequently access units having the same PTS exist at a cycle equivalent to the five audio access units of the BS audio ES 171 (i.e., equivalent to the 192 audio access units of the HQ audio ES 181).

Next, brief description will be made regarding change in a data configuration in the case of the BS audio ES 171 shown in FIG. 6 being PES-packetized to a BS audio PES 172, and the BS audio PES 172 being further TS-packetized to a BS audio TS 173 with reference to FIG. 7. Note that in the drawing, the portions corresponding to the portions shown in FIG. 6 are appended with the same reference numerals and the same step numbers.

As shown in FIG. 7, in the event of the BS audio ES 171 being subjected to PES packetizing (step S4), the multiple audio access units (BS(1), BS(2), and so on through BS(n)) included in the BS audio ES 171 are stored in the PES payloads of the BS audio PES packets 172-1 through 172-n' making up the BS audio PES 172. In the case of the example shown in FIG. 7, the three audio access units of the BS(1) through BS(3) of the BS audio ES 171 are stored in the PES payload of the BS audio PES packet 172-1, and the value of PTS=BS1 is stored in the PES header of the BS audio PES packet 172-1. Also, for example, the three audio access units of the BS(4) through BS(6) of the BS audio ES 171 are stored in the PES payload of the BS audio PES packet 172-2, and the value of PTS=BS2 is stored in the PES header of the BS audio PES packet 172-2. Also, for example, the two audio access units of the BS(n−1) and BS(n) of the BS audio ES 171 are stored in the PES payload of the BS audio PES packet 172-n', and the value of PTS=BSn' is stored in the PES header of the BS audio PES packet 172-n'.

Subsequently, in the event of the BS audio PES 172 being subjected to TS packetizing (step S6), the data of the BS audio PES 172 is each stored in the TS payloads of BS audio TS packets 231-1 through 231-j making up the BS audio TS 173. For example, the BS audio PES packet 172-1 is stored in the TS payloads of the BS audio TS packets 231-1 and 231-2, and the BS audio PES packet 172-2 is stored in the TS payloads of the BS audio TS packets 231-3 and 232-4. At this time, the PTS of the PES header of the BS audio PES packet 172-1, i.e., PTS=BS1 is stored in the TS payload of the BS audio TS packet 231-1, the PTS of the PES header of the BS audio PES packet 172-2, i.e., PTS=BS2 is stored in the TS payload of the BS audio TS packet 231-3, and the PTS of the PES header of the BS audio PES packet 172-n', i.e., PTS=BSn' is stored in the TS payload of the BS audio TS packet 231-j−1.

Thus, among the BS audio TS packets, there is a TS packet of which the TS payload stores a PTS value.

Next, brief description will be made regarding change in a data configuration in the case of the HQ audio ES 181 shown in FIG. 6 being PES-packetized to an HQ audio PES 182, and the HQ audio PES 182 being further TS-packetized to an HQ audio TS 183 with reference to FIG. 8. Note that in the drawing, the portions corresponding to the portions shown in FIG. 6 are appended with the same reference numerals and the same step numbers. Also, the HQ audio ES shown in FIG. 8 is basically the same as the case of the BS audio ES shown in FIG. 7.

As shown in FIG. 8, in the event of the HQ audio ES 181 being subjected to PES packetizing (step S14), the multiple audio access units (HQ(1), HQ(2), and so on through HQ(m)) included in the HQ audio ES 181 are stored in the PES payloads of the HQ audio PES packets 182-1 through 182-m' making up the HQ audio PES 182. In the case of the example shown in FIG. 8, the three audio access units of the HQ(1) through HQ(3) of the HQ audio ES 181 are stored in the PES payload of the HQ audio PES packet 182-1, and the value of PTS=HQ1 is stored in the PES header of the HQ audio PES packet 182-1. Also, for example, the three audio access units of the HQ(4) through HQ(6) of the HQ audio ES 181 are stored in the PES payload of the HQ audio PES packet 182-2, and the value of PTS=HQ2 is stored in the PES header of the HQ audio PES packet 182-2. Also, for example, the two audio access units of the HQ(m−1) and HQ(m) of the HQ audio ES 181 are stored in the PES payload of the HQ audio PES packet 182-m', and the value of PTS=HQm' is stored in the PES header of the HQ audio PES packet 182-m'.

Subsequently, in the event of the HQ audio PES 182 being subjected to TS packetizing (step S16), the data of the HQ audio PES 182 is each stored in the TS payloads of HQ audio TS packets 232-1 through 232-k making up the HQ audio TS 183. For example, the HQ audio PES packet 182-1 is stored in the TS payloads of the HQ audio TS packets 232-1 through 232-3, and the HQ audio PES packet 182-2 is stored in the TS payloads of the HQ audio TS packets 232-4 and 232-6. At this time, the PTS of the PES header of the HQ audio PES packet 182-1, i.e., PTS=HQ1 is stored in the TS payload of the HQ audio TS packet 232-1, the PTS of the PES header of the HQ audio PES packet 182-2, i.e., PTS=HQ2 is stored in the TS payload of the HQ audio TS packet 232-4, and the PTS of the PES header of the HQ audio PES packet 182-m', i.e., PTS=HQm' is stored in the TS payload of the HQ audio TS packet 232-k−2.

Thus, among the HQ audio TS packets, there is a TS packet of which the TS payload stores a PTS value.

Subsequently, in the event of multiplexing the BS audio TS 173 shown in FIG. 7 and the HQ audio TS 183 shown in FIG. 8, multiplexing is performed based on a constraint wherein following completion of multiplexing of TS packets equivalent to one PES packet, multiplexing of TS packets equivalent to the next one PES packet needs to be performed, and a constraint wherein with a relation between a BS audio TS packet and an HQ audio TS packet having the same PTS value, multiplexing needs to be performed such that the HQ audio TS packet is disposed after the BS audio TS packet.

Figure 9:
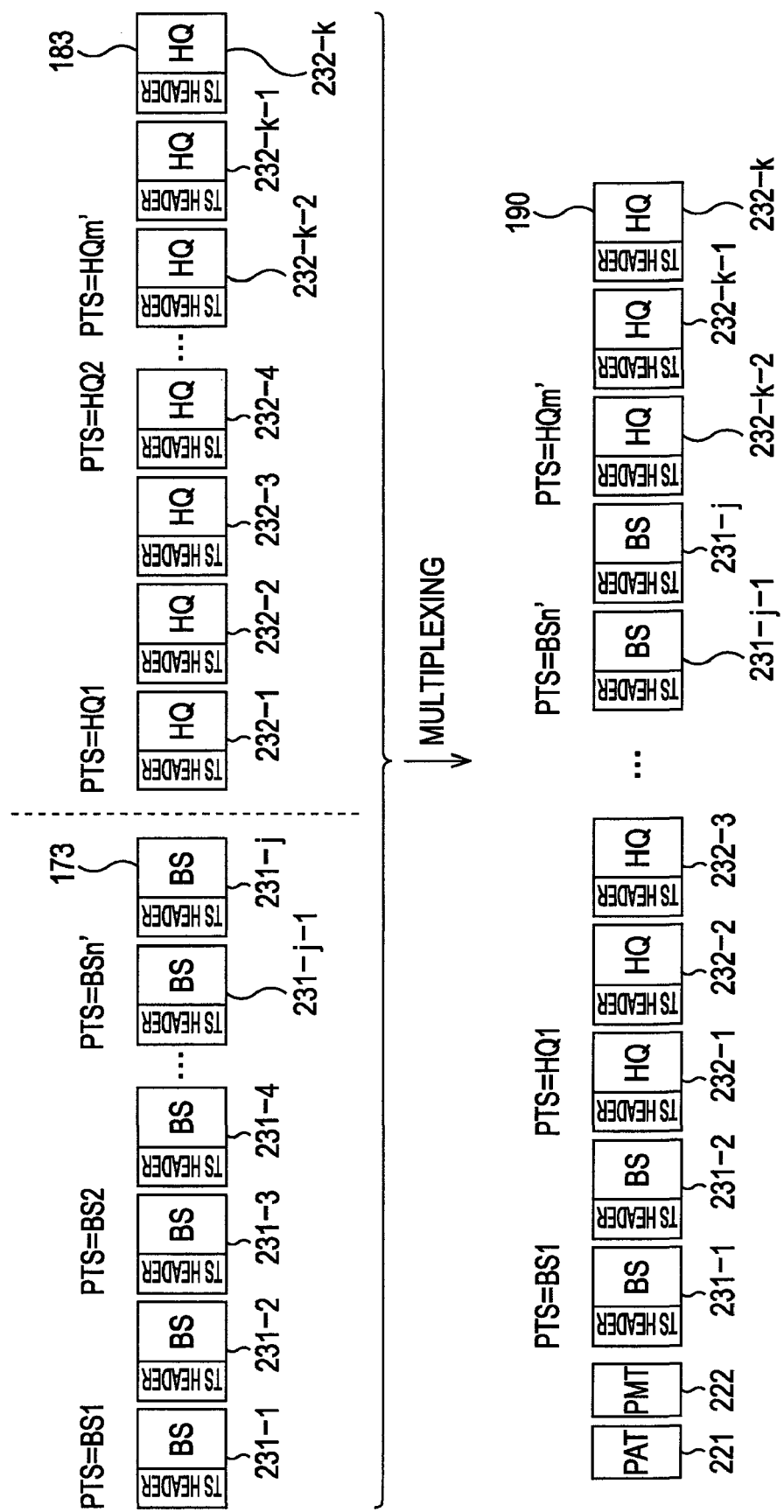
FIG. 9 is a diagram describing an example wherein a BS audio TS and an HQ audio TS are multiplexed.

A specific example of multiplexing based on the constraints will be described with reference to FIG. 9. In FIG. 9, the first stage illustrates the BS audio TS 173 and the HQ audio TS 183, and the second stage illustrates the TS in the case of multiplexing the BS audio TS 173 and the HQ audio TS 183.

For example, in the event that the PTS value (=BS1) stored in the BS audio TS packet 231-1, and the PTS value (=HQ1) stored in the HQ audio TS packet 232-1 are equal, as shown in the second stage in FIG. 9, multiplexing is performed such that the HQ audio TS packet 232-1 is disposed after the BS audio TS packet 231-1 having PTS=BS1 (second multiplexing constraint). Also, at this time, part of the data of the BS audio PES packet 172-1 shown in FIG. 7 is stored in the BS audio TS packet 231-1, and the data of the BS audio PES packet 172-1 is stored in not only the BS audio TS packet 231-1 but also the BS audio TS packet 231-2, so the BS audio TS packet 231-1 and the BS audio TS packet 231-2 need to be multiplexed continuously (first multiplexing constraint). Similarly, part of the data of the HQ audio PES packet 182-1 shown in FIG. 8 is stored in the HQ audio TS packet 232-1, and the data of the HQ audio PES packet 182-1 is stored in not only the HQ audio TS packet 232-1 but also the HQ audio TS packets 232-2 and 232-3, so the HQ audio TS packet 232-1 through 232-3 need to be multiplexed continuously (first multiplexing constraint).

Consequently, as shown in the second stage shown in FIG. 9, the HQ audio TS packets 232-1 through 232-3 are disposed after the BS audio TS packets 231-1 and 231-2. Note that with the example shown in FIG. 9, an arrangement is made wherein the HQ audio TS packets 232-1 through 232-3 are disposed immediately after the BS audio TS packets 231-1 and 231-2, but an arrangement may be made wherein other data is disposed between the BS audio TS packets 231-1 and 231-2, and the HQ audio TS packets 232-1 through 232-3.

Figure 10:
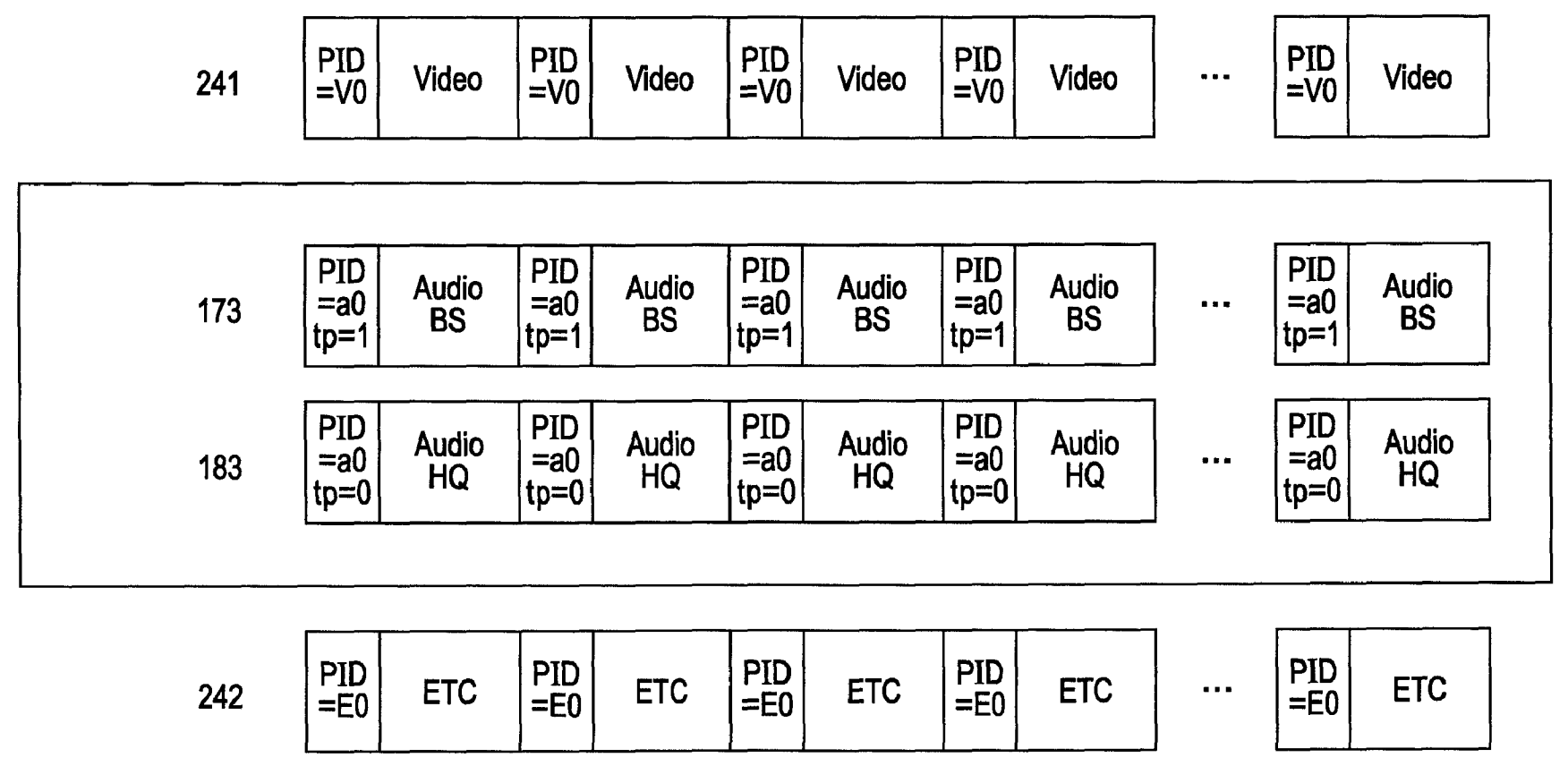

Note that with description up to FIG. 9, description has been made regarding a case wherein the sending apparatus 111 shown in FIG. 4 sends audio data, but actually, the sending apparatus 111 shown in FIG. 4 also sends video data and system data (the data of a graphic stream, a text subtitle stream, or the like). In this case as well, video data is encoded by an unshown video encoder, PES-packetized, and TS-packetized, and then multiplexed at the multiplexing unit 138 along with audio TS packets. At this time, the PID of a TS packet corresponding to the video data, and the PID of a TS packet corresponding to the audio data differ (it is needless to say that the PID of the BS audio TS packet and the PID of the HQ audio TS packet are the same) as shown in FIG. 10. In the case of the example shown in FIG. 10, "PID=V0" is added to the header of each TS packet included in a TS 241 serving as video data (video ES) as shown in the first stage, "PID=E0" is added to the header of each TS packet included in a TS 242 serving as other data (system data) as shown in the fourth stage. Thus, a stream having one or more different PIDs is included in one program stream.

That is to say, a stream is input to the multiplexing unit 138 as a separate stream such as a video TS 241, BS audio TS 173, HQ audio TS 283, and other TS 242. Here, a BS audio ES and an HQ audio ES are mutually independent streams having no hierarchical relationship. Therefore, there is no constraint at the time of multiplexing (e.g., there is no constraint such as multiplexing a BS audio ES and an HQ audio ES as a set). Also, with the present embodiment, audio ESes encoded with different encoding methods are appended with the same PID, thereby generating a transport stream.

Next, the PES packet configuration and TS packet configuration of the HQ audio ES 181 having the same PTS value as the PTS value of the BS audio PES 172 will be described with reference to FIG. 11. Specifically, FIG. 11 is a diagram describing the configuration of the PES packet (FIG. 8) of the HQ audio ES 181, and the configuration of the TS packet 232-1 in the case of PTS=BS1=HQ1 in FIG. 6 through FIG. 9.

The HQ audio PES packet 182-1, as described with reference to FIG. 6 and FIG. 8, is configured of a PES header and a PES payload. A PES header includes a PTS_DTS_flags 261, other data 262, a PTS 263, and other data 264.

The PTS_DTS_flags 261 is information indicating the presence/absence of a PTS and a DTS (Decoding Time Stamp). The PTS_DTS_flags having a value of "00(b)" indicates that neither a PTS field nor a DTS field is included in the PES header, the PTS_DTS_flags having a value of "10(b)" indicates that a PTS field alone is included in the PES header, and the PTS_DTS_flags having a value of "11(b)" indicates that PTS and DTS fields are included in the PES header. In the case of the example shown in FIG. 11, the value of the PTS_DTS_flags 261 is set as PTS_DTS_flags=10(b), which indicates that only the value of the PTS 263 is included in the PES header, and no DTS value is included therein, and a PTS value is described in the field of the PTS 263. In the case of the example shown in FIG. 11, PTS=HQ1 which is the same PTS value as the PTS (=BS1) stored in the corresponding BS audio PES packet 172-1 is stored in the field of the PTS 263.

Figure 11:
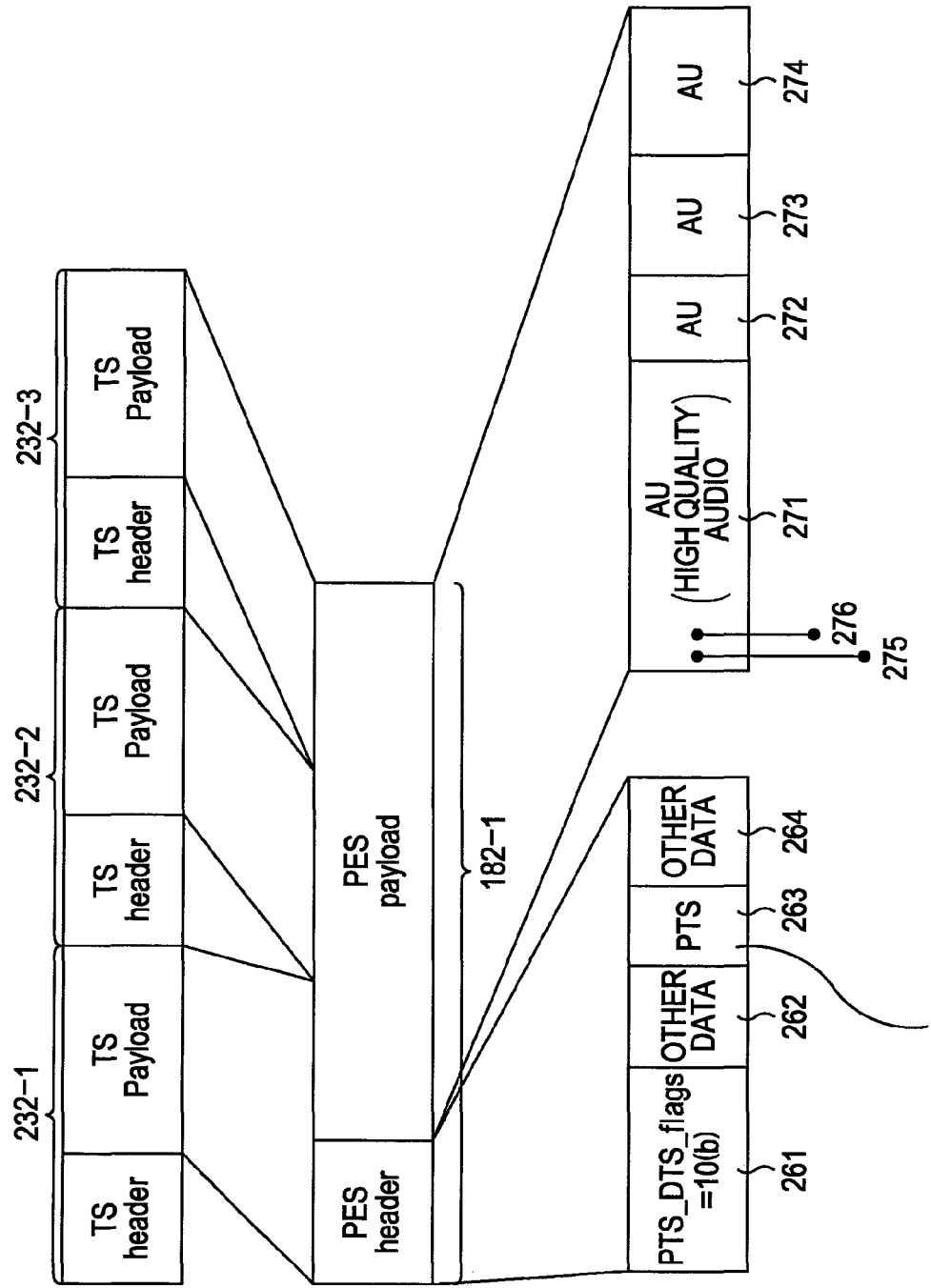
FIG. 11 is a diagram describing data configuration examples of an HQ audio PES packet and an HQ audio TS packet.

In the case of the example shown in FIG. 11, four audio access units (AU) 271 through 274 are included in the PES payload of the HQ audio PES packet 182-1. The audio access units 271 through 274 are high quality audios. The audio access unit 271 includes Input timing information 275 and detailed information 276. The Input timing information 275 is a timing value indicating time represented with a sampling cycle of audio information wherein an audio access unit is transferred to the FIFO buffer of the virtual decoder, which is applied when the second encoder 142 encodes. The detailed information 276 is decoding information which enables decoding at the position thereof to be started. In other words, the detailed information 276 is information to start decoding from that position. This information (detailed information), by which decoding can be started, includes, for example, a sampling frequency, channel information, and so forth. Also, the detailed information 276 is included in not all of the access units.

Thus, the headmost audio access unit (of the PES payload) of the HQ audio PES packet having the same PTS as the PTS of the BS audio PES includes the Input timing information 275 and the detailed information 276.

Note that the detailed information 276 is not always included in the HQ audio PES packet. Specifically, the detailed information 276 is included in the HQ audio PES packet having the same PTS as the PTS of the BS audio PES, but is not included in the HQ audio PES packet having no same PTS as the PTS of the BS audio PES in some cases.

Each of the TS packets 232-1 through 232-3 which are results of the HQ audio PES packet 182-1 being subjected to TS packetizing includes a TS header and a TS payload, such as described with reference to FIG. 6 and FIG. 8. A PID and a tp mentioned above with reference to FIG. 10 are added to a TS header, though not shown in FIG. 11.

Thus, a timing value (Input timing) to be added when the second encoder 142 performs encoding is stored as the Input timing information 275 in the PES payload in which the headmost data of the audio access unit 271 is stored. Let us say that, for example, the data length of the PTS 263 is 33 bits, the data length of the DTS is 33 bits, and the data length of the Input timing is 16 bits.

Now, description will be made with reference to FIG. 12 regarding two examples satisfying the constraints in the case of multiplexing the BS audio TS 173 and the HQ audio TS 183 shown in FIG. 6 (in the case of obtaining a TS 190).

As described above, the constraints in the case of multiplexing the BS audio TS 173 and the HQ audio TS 183 into a TS 190 are a constraint wherein following completion of multiplexing of TS packets equivalent into one PES packet, multiplexing of TS packets equivalent into the next one PES packet needs to be performed (first constraint), and a constraint wherein with a relation between the BS audio TS packet and the HQ audio TS packet both having the same PTS value, multiplexing needs to be performed such that the HQ audio TS packet is disposed after the BS audio TS packet (second constraint).

A first example of a packet layout will be described with reference to the upper side of FIG. 12. Note here that the BS audio TS packet 281-1 and the BS audio TS packet 281-2 correspond to any one of the BS audio TS packets 231-1 through 231-j, and the HQ audio TS packet 282-1 and the HQ audio TS packet 282-2 correspond to any one of the BS audio TS packets 232-1 through 232-k shown in FIG. 6.

Figure 12:
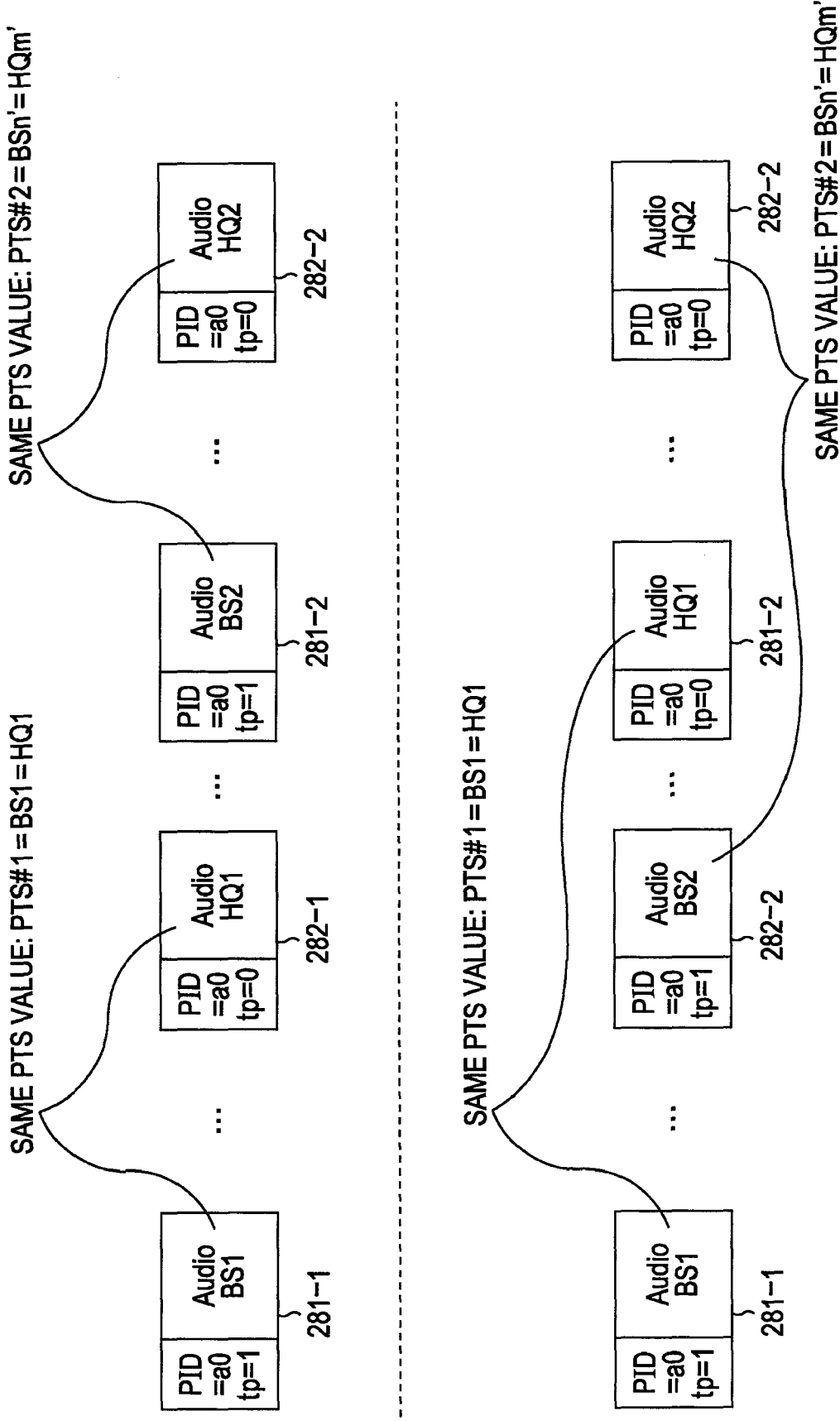
FIG. 12 is a diagram for describing the multiplexing constraints of a BS audio TS packet and an HQ audio TS packet.

At the upper side of FIG. 12, in the event that the PTS values of the BS audio TS packet 281-1 and the HQ audio TS packet 282-1 are both PTS#1, the HQ audio TS packet 282-1 is disposed after the BS audio TS packet 281-1. That is to say, with regard to TS packets having the same PTS value (both PTS#1), the BS audio TS packet 281-1 is disposed before the HQ audio TS packet 282-1. Similarly, in the event that the PTS values of the BS audio TS packet 281-2 and the HQ audio TS packet 282-2 are both PTS#2, the HQ audio TS packet 282-2 is disposed after the BS audio TS packet 281-2. That is to say, with regard to TS packets having the same PTS value (both PTS#2), the BS audio TS packet 281-2 is disposed before the HQ audio TS packet 282-2.

Figure 13:
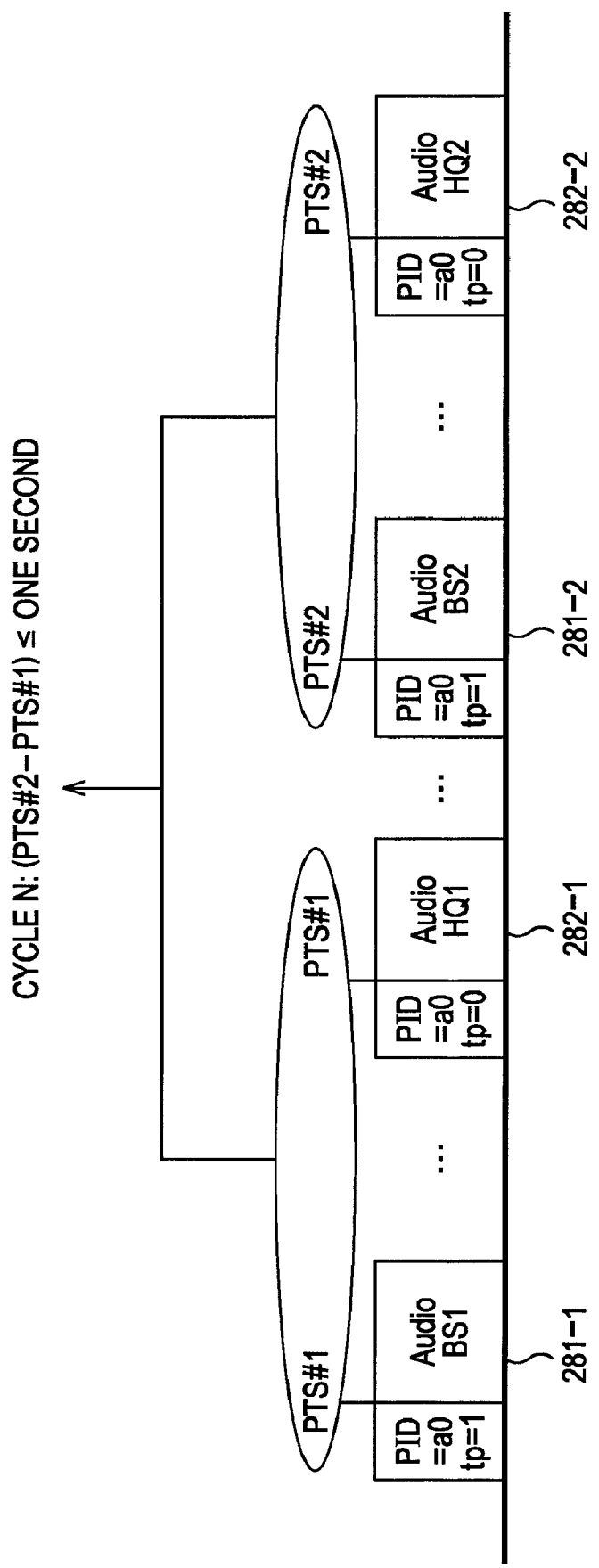
FIG. 13 is a diagram for describing the multiplexing constraints of a BS audio TS packet and an HQ audio TS packet.

At this time, according to the above-mentioned constraint at the time of PES packetizing, PES packets having the same PTS are PES-packetized so as to exist within one second in the case of converting (calculating) the PTS into time, so in the event of converting from the PTS#1 to PTS#2 into time, the time thereof is set to within one second. That is to say, as shown in FIG. 13, ((PTS#2)−(PTS#1)) is set to within one second.

Here, a cycle of which the one cycle interval is equal to or shorter than one second, which is a cycle wherein the display point-in-time of a BS audio ES access unit and the display point-in-time of an HQ audio ES access unit are equal (e.g., cycle of "PTS#2−PTS#1" shown in FIG. 13), is hereafter referred to as a cycle N. This cycle N may be changed within a stream.

A second example of a packet layout will be described with reference to the lower side of FIG. 12. At the lower side of FIG. 12, in the event that the PTS values of the BS audio TS packet 281-1 and the HQ audio TS packet 282-1 are both PTS#1, the HQ audio TS packet 282-1 is disposed after the BS audio TS packet 281-1. That is to say, with regard to TS packets having the same PTS value (both PTS#1), the BS audio TS packet 281-1 is disposed before the HQ audio TS packet 282-1. Similarly, in the event that the PTS values of the BS audio TS packet 281-2 and the HQ audio TS packet 282-2 are both PTS#2, the HQ audio TS packet 282-2 is disposed after the BS audio TS packet 281-2. That is to say, with regard to TS packets having the same PTS value (both PTS#2), the BS audio TS packet 281-2 is disposed before the HQ audio TS packet 282-2.

With the TS at the lower side of FIG. 12, the HQ audio TS packet 282-1 is disposed after the BS audio TS packet 281-2, which is different from the upper side. That is to say, the BS audio TS packet 281-2 of which the PTS value is PTS#2 is disposed before the HQ audio TS packet 282-1 of which the PTS value is PTS#1. However, according to the constraints, with TS packets having the same PTS value, the HQ audio TS packet needs to be disposed after the BS audio TS packet. That is to say, other data may be included between the BS audio TS packet and the HQ audio TS packet having the same PTS value, so consequently, with the TS at the lower side of FIG. 12 as well, this constraint is protected.

Thus, the HQ audio TS packet having the same PTS value as the PTS value of the BS audio TS packet needs to be disposed after the BS audio TS packet, as shown at the lower side of FIG. 12, even in the event that the HQ audio TS packet 282-1 having the PTS#1 is disposed after the BS audio TS packet 281-2 having the PTS#2, as long as multiplexing of TS packets equivalent to the next one PES packet is performed following completion of multiplexing of TS packets equivalent to one PES packet, the constraint is consequently satisfied.

Note that at the lower side of FIG. 12 as well, PES packets having the same PTS have been PES-packetized so as to always exist within one second in the case of the PTS being converted (calculated) into time, so in the event of converting from the PTS#1 to PTS#2 into time, the time thereof is set to within one second.

With the present embodiment, in the event that the sending apparatus 111 packetizes the BS audio ES 171 and the HQ audio ES 181 to TS packets, and multiplexes the multiple BS audio TS packets making up the BS audio TS 173, and the multiple HQ audio TS packets making up the HQ audio TS 183, which are obtained as a result thereof, into one transport stream 190 (MPEG2-TS), TS packets to be multiplexed are determined in accordance with the performance of the virtual receiving apparatus 120 (FIG. 3), and the multiplexing constraints for random access. That is to say, even in the event that the virtual receiving apparatus 120 is a virtual receiving apparatus capable of handling both of a BS audio ES and an HQ audio ES (capable of decoding both of a BS audio ES and an HQ audio ES), or even in the event that the virtual receiving apparatus 120 is a virtual receiving apparatus capable of handling only a BS audio ES (capable of decoding a BS audio ES alone), the timing of multiplexing TS packets can be regulated (TS packets to be multiplexed can be determined sequentially) at the sending apparatus 111 side such that decoding can be performed while causing the buffer provided in the virtual receiving apparatus 120 to neither overflow nor underflow, and also the multiplexing constraints for random access can be protected.

Specifically, the sending apparatus 111 regulates TS packets to be multiplexed so as to handle a virtual receiving apparatus (hereafter, referred to as a first virtual receiving apparatus) capable of decoding the BS audio TS 173 shown in FIG. 6, and a receiving apparatus (hereafter, referred to as a second virtual receiving apparatus) capable of decoding the HQ audio TS 183 shown in FIG. 6 to generate the transport stream 190 shown in FIG. 6. That is to say, the sending apparatus 111 determines TS packets to be multiplexed so as to cause the decoder buffer for BS audio ES of a predetermined size to neither overflow nor underflow in the event that the virtual receiving apparatus 120 extracting and decoding a BS audio ES, and also so as to cause the decoder buffer for HQ audio ES of a predetermined size to neither overflow nor underflow in the event that the virtual receiving apparatus 120 extracting and decoding an HQ audio ES, and so as to protect the multiplexing constraints for random access.

That is to say, the two types of virtual receiving apparatus are assumed in the case of the virtual receiving apparatus 120 capable of decoding only a BS audio ES, and in the case of the virtual receiving apparatus 120 capable of decoding an HQ audio ES, and the timing of multiplexing TS packets is regulated so as to be capable of decoding the TS 190 multiplexed with each of the two types of virtual receiving apparatus (first virtual receiving apparatus and second virtual receiving apparatus), and also based on the multiplexing constraints for random access.

Figure 14:
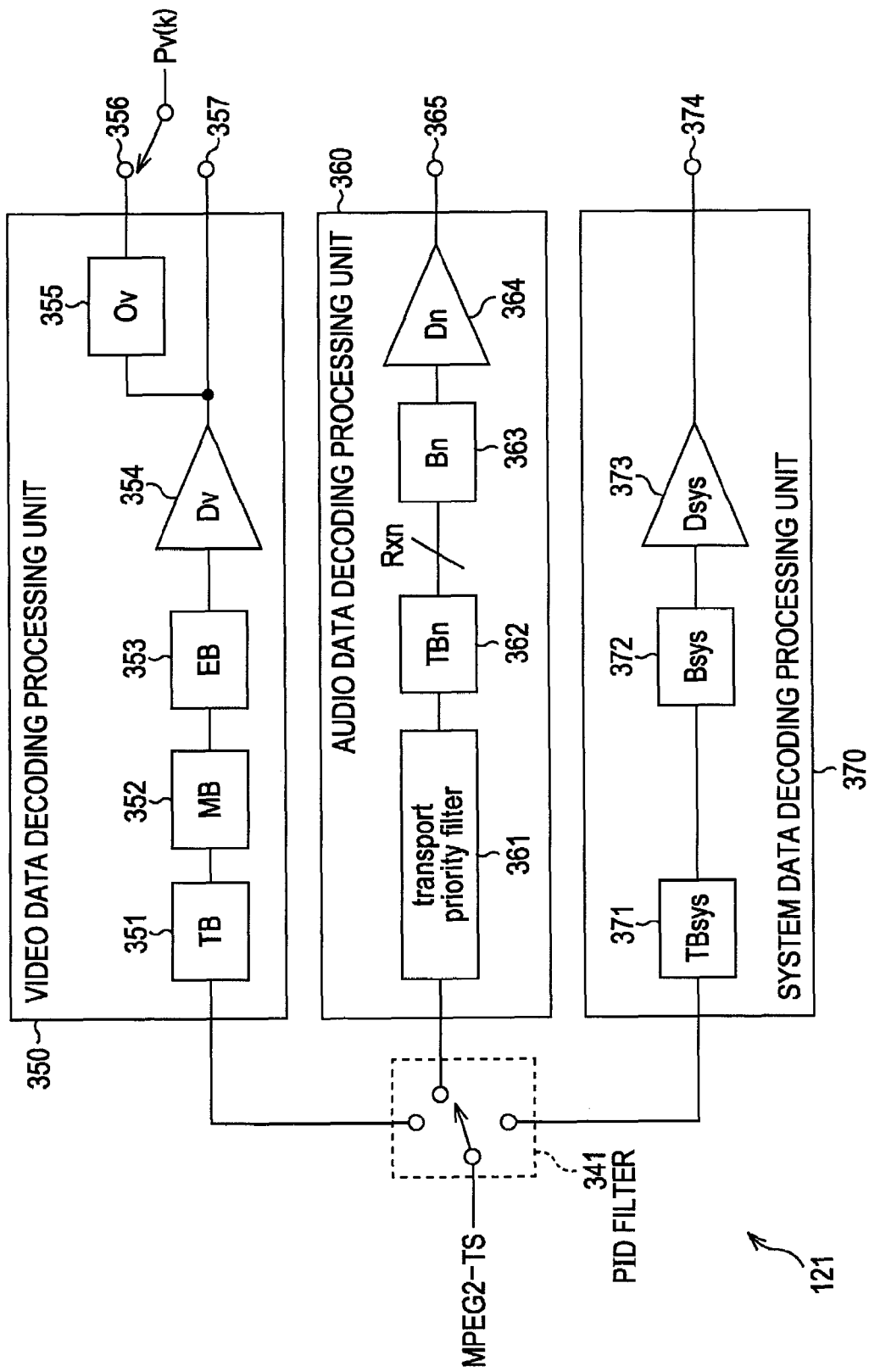
FIG. 14 is a diagram illustrating a model example of the virtual decoder shown in FIG. 3.

FIG. 14 is a diagram describing a model of the virtual decoder 121 for encoding constraints in the case of multiplexing a BS audio TS and an HQ audio TS. That is to say, FIG. 14 illustrates a configuration example of the virtual decoder 121 (FIG. 3) model included in the virtual receiving apparatus 120 which is assumed in the case of the sending apparatus 111 multiplexing a BS audio TS and an HQ audio TS using the MPEG2-TS method. In other words, the virtual decoder 121 shown in FIG. 14 is a model of the virtual decoder 121 assumed in the case of the sending apparatus 111 multiplexing a BS audio TS and an HQ audio TS.

The MPEG2-TS sent to the virtual receiving apparatus 120 (FIG. 3) is supplied to the virtual decoder 121. The MPEG2-TS supplied to the virtual decoder 121, as shown in FIG. 14, is subjected to filtering for each type of TS packet by a filter 341.

Specifically, the MPEG2-TS is configured of multiple TS packets, and each TS packet is appended with a PID for identifying the TS packet thereof. Based on the PID added to each packet making up the MPEG2-TS, the filter 341 supplies TS packets making up a video stream (in the case of the example shown in FIG. 10, TS packets of PID=V0) to a video data decoding processing unit 350 configured to process a video stream, and supplies TS packets making up an audio stream (in the case of the example shown in FIG. 10, TS packets of PID=a0) to an audio data decoding processing unit 360 configured to process an audio stream, and supplies TS packets relating to a system (in the case of the example shown in FIG. 10, TS packets of PID=E0) to a system data decoding processing unit 370 configured to process data relating to a system.

The video data decoding processing unit 350 is provided with a transport buffer (referred to as TBv in the drawing) 351, a multiplexer buffer (referred to as MBv in the drawing) 352, an elementary buffer (referred to as EBv in the drawing) 353, a video decoder (referred to as Dv in the drawing) 354, and an output reordering buffer (referred to as Ov in the drawing) 355.

Upon a TS packet (in the case of the example shown in FIG. 10, TS packet of PID=V0) making up a video stream being supplied to the video data decoding processing unit via the filter 341, the TS packet is stored in the transport buffer 351. Subsequently, the data is supplied to the multiplexing buffer 352 at a predetermined bit rate. The multiplexing buffer 352 stores the supplied data to subject this to smoothing, and then supplies the data to the elementary buffer 353 at a predetermined bit rate. The video decoder 354 extracts a video access unit stored in the elementary buffer 353 at a predetermined timing, and decodes and outputs this. Part of the decoded data is output from a terminal 356 via the output reordering buffer 355, and the other data is output from a terminal 357, and played.

The audio data decoding processing unit 360 is provided with a transport priority filter 361, a transport buffer (referred to as TBn in the drawing) 362, an elementary buffer (referred to as Bn in the drawing) 363, and an audio decoder (referred to as Dn in the drawing) 364.

Upon a TS packet (in the case of the example shown in FIG. 10, TS packet of PID=a0) making up an audio stream being supplied to the audio data decoding processing unit 360 via the filter 341, the transport priority filter 361 subjects the TS packet to filtering depending on the performance of the virtual decoder 121. For example, the transport priority filter 361 performs filtering based on the value of the tp (see FIG. 10) added to the header (e.g., TS header 282 shown in FIG. 11) of the TS packet. The TS packet subjected to filtering by the transport priority filter 361 is supplied to the transport buffer 362 which is the subsequent stage. The transport buffer 362 stores the TS packet subjected to filtering by the transport priority filter 361 and supplied.

The TS packet stored in the transport buffer 362 is supplied to the elementary buffer 363 at a rate Rxn depending on the performance of the virtual decoder 121. The Rxn is a leak rate from the transport buffer 362, and in the event that there is data in the transport buffer 362, the data is input to the elementary buffer 363 from the transport buffer 362 at the rate Rxn. Also, in the event that there is no data in the transport buffer 362, the Rxn becomes zero.

The elementary buffer 363 stores the data supplied at the bit rate of the Rxn from the transport buffer 362. Here, let us say that the size of the elementary buffer 363 differs depending on an audio encoding method (MPEG1 audio, MPEG2 AAC audio, etc.). Note that in the event that there is data in the transport buffer 362, the data is supplied at the bit rate (speed) of the Rxn to the elementary buffer 363 from the transport buffer 362, but in the event that there is no data in the transport buffer 362, the data from the transport buffer 362 is not supplied to the elementary buffer 363 (i.e., becomes Rxn=0).

The audio decoder 364 extracts an audio access unit stored in the elementary buffer 363 at a predetermined timing, decodes this, outputs this via a terminal 365, and plays this. Specifically, when the PTS of an audio access unit is equal to the time on the system clock of a T-STD, the audio decoder 364 extracts the audio access unit thereof from the elementary buffer 363. Note that an audio access unit is an encoding unit making up an audio stream, and also becomes a decoding unit. Note that the details of the audio data decoding processing unit 360 shown in FIG. 14 will be described later with reference to FIG. 15.

The system data decoding processing unit 370 is provided with a transport buffer (referred to as TBsys in the drawing) 371, an elementary buffer (referred to as Bsys in the drawing) 372, and a system decoder (referred to as Dsys in the drawing) 373.

Upon a TS packet (TS packet of PID=E0 in the case of the example shown in FIG. 10) relating to the system being supplied to the system data decoding processing unit 370 via the filter 341, the TS packet is stored in the transport buffer 371. The data stored in the transport buffer 371 is supplied to the elementary buffer 372. The system decoder 373 extracts a system access unit stored in the elementary buffer 72 at a predetermined timing, decodes this, and outputs this via a terminal 374.

Note that examples of a TS packet relating to the system include the TS packet 221, and the TS packet 222 serving as a PMT shown in FIG. 6.

Next, the details of the audio data decoding processing unit 360 shown in FIG. 14 will be described with reference to FIG. 15.

Figure 15:
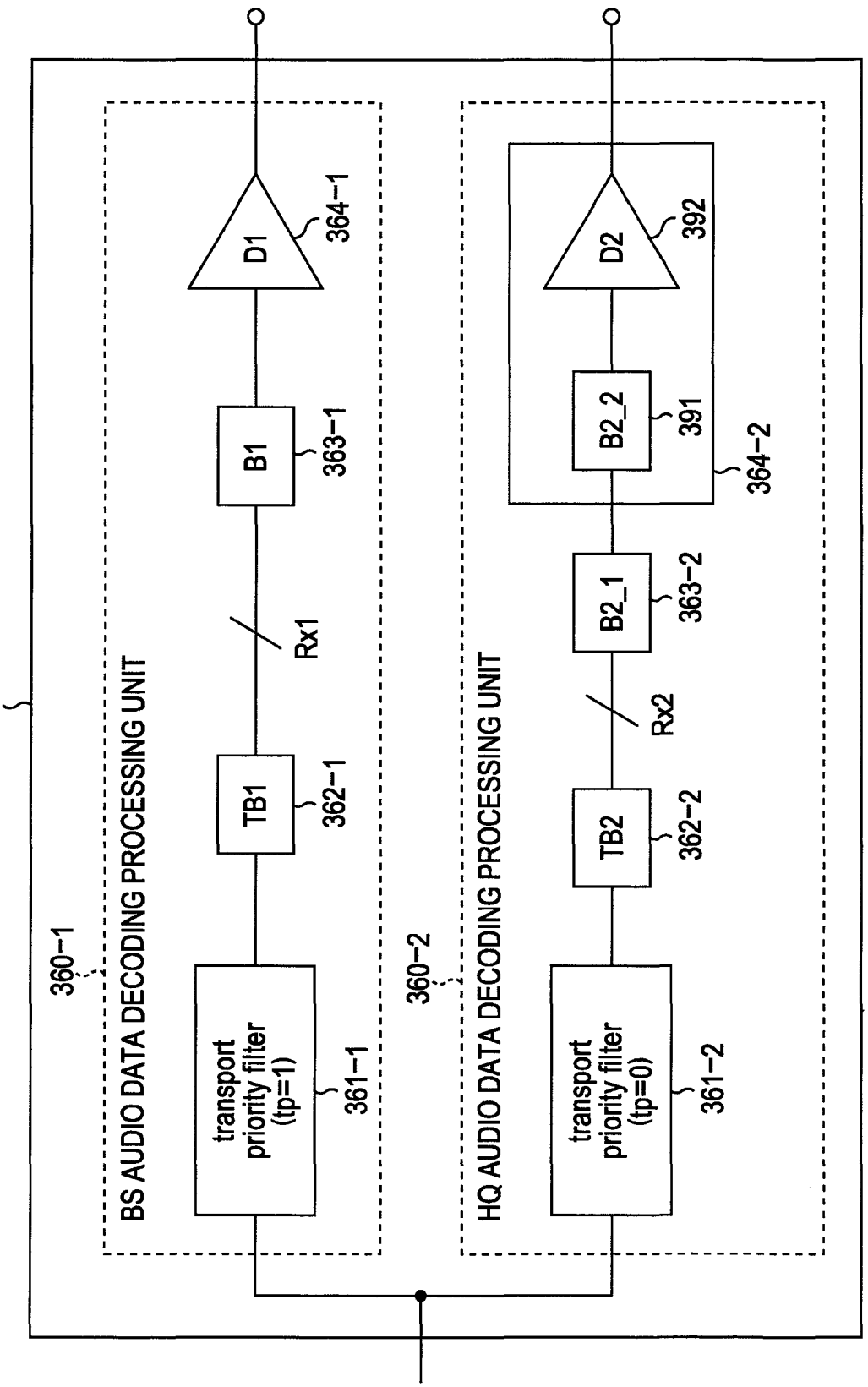
FIG. 15 is a diagram describing a detailed example of the audio data decoding processing unit shown in FIG. 14.

The interior of the audio data decoding processing unit 360, as shown in FIG. 15, is divided into two systems of a BS audio data decoding processing unit 360-1, and an HQ audio data decoding processing unit 360-2. This configuration is provided to verify the two of the BS audio data decoding processing unit 360-1 serving as a decoder model of which the object to be decoded is a BS audio ES alone, and the HQ audio data decoding processing unit 360-2 serving as a decoder model of which the object to be decoded is an HQ audio ES at a time.

The BS audio data decoding processing unit 360-1 is provided with a transport priority filter (referred to as transport priority filter (tp=1) in the drawing) 361-1, a transport buffer (referred to as TB1 in the drawing) 362-1, an elementary buffer (referred to as B1 in the drawing) 363-1, and an audio decoder (referred to as D1 in the drawing) 364-1. That is to say, the transport priority filter 361-1, transport buffer 362-1, elementary buffer 363-1, and audio decoder 364-1 of the audio data decoding processing unit 360-1 shown in FIG. 15 correspond to the transport priority filter 361, transport buffer 362, elementary buffer 363, and audio decoder 364 of the audio data decoding processing unit 360 shown in FIG. 14, respectively.

The transport priority filter 361-1 selects a TS packet of tp=1 (Transport_priority=1) alone, and supplies this to the transport buffer 362-1. The transport buffer 362-1 supplies data to the elementary buffer 363-1 with the value (Rxn) of an input bit rate as to the elementary buffer 363-1 as Rx1. The elementary buffer 363-1 stores the data supplied at the bit rate of the Rx1 from the transport buffer 362-1. Here, let us say that the capacity (Bn) of the elementary buffer 363-1 is referred to as B1. The audio decoder 364-1 extracts an audio access unit stored in the elementary buffer 363-1 at a predetermined timing, decodes this, and outputs this. Specifically, when the PTS of an audio access unit is equal to the time on the system time clock of the T-STD, the audio decoder 364-1 extracts the audio access unit thereof from the elementary buffer 363-1.

Thus, the BS audio data decoding processing unit 360-1 is a virtual decoder assuming decoding of a BS audio ES. Hereinafter, the virtual decoder 121 of which the audio data decoding processing unit 360 is substituted with the BS audio data decoding processing unit 360-1 will be referred to as a first virtual decoder. That is to say, a virtual decoder provided in the first virtual receiving apparatus will be referred to as the first virtual decoder.

On the other hand, the HQ audio data decoding processing unit 360-2 is provided with a transport priority filter (referred to as transport priority filter (tp=0) in the drawing) 361-2, a transport buffer (referred to as TB2 in the drawing) 362-2, an elementary buffer (referred to as B2_1 in the drawing) 363-2, and an audio decoder 364-2 of a variable bit rate. Also, the audio decoder 364-2 of a variable bit rate is provided with a FIFO buffer (referred to as B2_2 in the drawing) 391, and an audio decoder (referred to as D2 in the drawing) 392. In other words, the elementary buffer of the HQ audio data decoding processing unit 360-2 is divided into two (two of the elementary buffer 363-2 and the FIFO buffer 391). That is to say, the transport priority filter 361-2, transport buffer 362-2, elementary buffer 363-2, and audio data 364-2 of the audio data decoding processing unit 360-2 shown in FIG. 15 correspond to the transport priority filter 361, transport buffer 362, elementary buffer 363, and audio decoder 364 of the audio data decoding processing unit 360 shown in FIG. 14, respectively.

The transport priority filter 361-2 selects a TS packet of tp=0 (Transport_priority=0) alone, and supplies this to the transport buffer 362-2. The transport buffer 362-2 supplies data to the elementary buffer 363-2 with the value (Rxn) of an input bit rate as to the elementary buffer 363-2 as Rx2. The elementary buffer 363-2 stores the data supplied at the bit rate of the Rx2 from the transport buffer 362-2. Here, the capacity (Bn) of the elementary buffer 363-2 will be referred to as B2_1.

Figure 16:
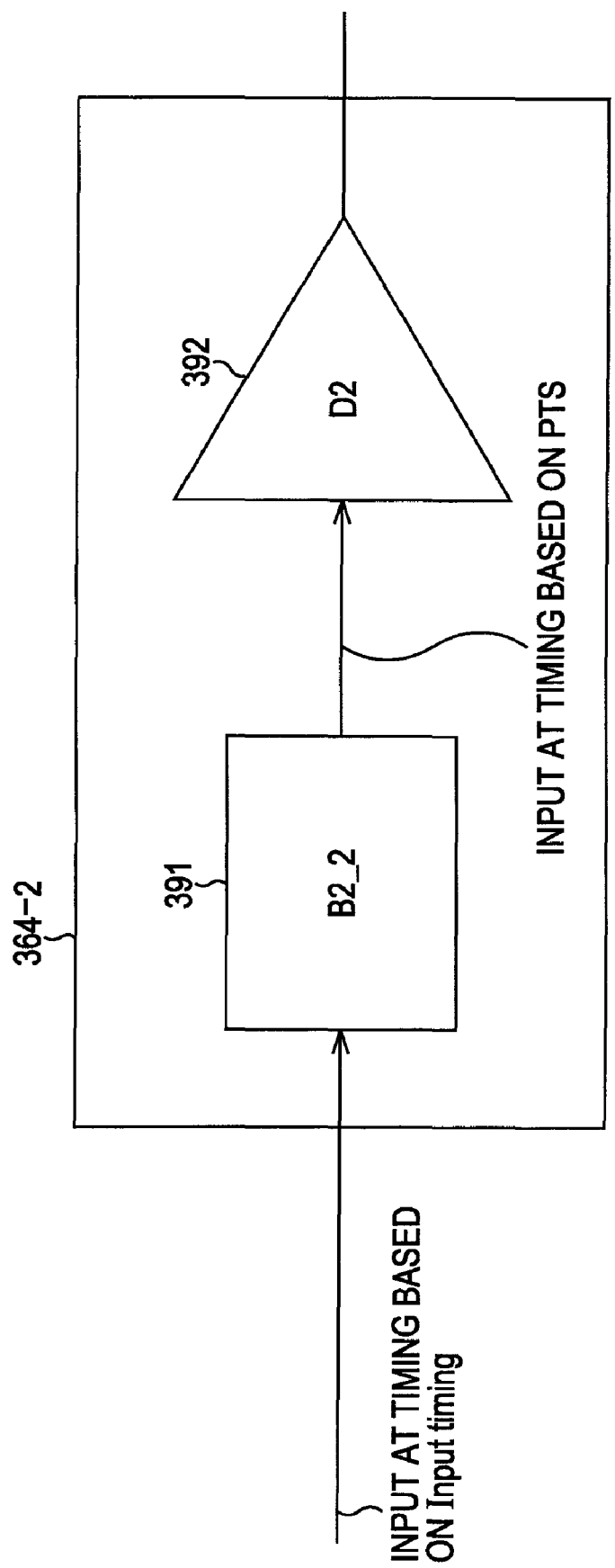
FIG. 16 is a diagram describing the audio decoder of a variable bit rate shown in FIG. 15.

The audio decoder 364-2 of a variable bit rate extracts an audio access unit stored in the elementary buffer 363-2 at a predetermined timing, and decodes this, and outputs this. Specifically, as shown in FIG. 16, the input timing of data as to the FIFO buffer 391 of the audio decoder 364-2 of a variable bit rate is determined with Input timing (timing value) included in an HQ audio ES. This Input timing, as described above with reference to FIG. 11, is a value (Input timing information 275 shown in FIG. 11) to be added when the second encoder 142 encodes audio data. That is to say, data is input to the FIFO buffer 391 at the timing based on the Input timing (Input timing information 275 shown in FIG. 11) embedded in an HQ audio ES (audio stream of a variable bit rate). Also, when the PTS of an audio access unit becomes equal to the time on the system time clock of the T-STD, the audio decoder 392 extracts the audio access unit thereof from the FIFO buffer 391, decodes this, and outputs this. That is to say, the FIFO buffer 391 is employed for the audio decoder 364-2 of a variable bit rate. Thus, the audio decoder 364-2 of a variable bit rate is realized with the FIFO buffer 391 and the audio decoder 392.

At this time, the input timing of data as to the FIFO buffer 391 is arranged to be determined based on the Input timing (timing value), which eliminates the necessity of adding a DTS (Decoding Time Stamp) to a stream, and consequently the PES-packetizing unit 136 of the sending apparatus 111 (FIG. 4) can perform PES packetizing smoothly without performing a calculation for obtaining a DTS in the event of subjecting an HQ audio ES to PES packetizing. Also, the PES-packetizing unit 136 can readily perform PES packetizing only by storing the Input timing included in an HQ audio ES in the PES payload 253 (FIG. 11) of a PES packet as it is beforehand. Further, the PES-packetizing unit 136 does not need to store a DTS value in a PES packet to be generated, whereby the data amount of PES packets can be suppressed. That is to say, the data amount of PES packets can be further reduced.

Thus, the HQ audio data decoding processing unit 360-2 is a virtual decoder assuming decoding of an HQ audio ES. Hereinafter, the virtual decoder 121 of which the audio data decoding processing unit 360 is substituted with the HQ audio data decoding processing unit 360-2 will be referred to as a second virtual decoder. That is to say, a virtual decoder provided in the second virtual receiving apparatus will be referred to as the second virtual decoder.

With the elementary buffer 363-2 (B2_1) shown in FIG. 15, the amount of occupied buffer is reduced at the timing based on the Input timing. Also, the FIFO buffer 391 (B2_2) does not overflow, but may underflow. Therefore, it is necessary to multiplex TS packets at timing such as preventing the FIFO buffer 391 (B2_2) from underflow, and also preventing the elementary buffer 363-2 (B2_1) from overflow and underflow.

Now, in FIG. 15, for example, let us say that the buffer size of the elementary buffer 363-1 (B1) is 18640 bytes, the buffer size of the elementary buffer 363-1 (B2_1)+the FIFO buffer 391 is 524250 bytes, the leak rate Rx1 is 2 Mbps, and the leak rate Rx2 is 48 Mbps.

The sending apparatus 111 shown in FIG. 4 needs to perform multiplexing by sequentially determining TS packets to be multiplexed from BS audio TS packets and HQ audio TS packets based on the multiplexing constraints for random access such that the virtual receiving apparatus 120 including the virtual decoder 121 shown in FIG. 15 can perform decoding correctly.

That is to say, the sending apparatus 111 needs to perform multiplexing by determining (regulating) audio TS packets to be multiplexed based on the multiplexing constraints for random access so as to prevent the transport buffer 362-1 and the transport buffer 362-2 of the virtual decoder 121 shown in FIG. 15 from overflow, and also prevent the elementary buffer 363-1 and the elementary buffer 363-2 from overflow and underflow, and further prevent the FIFO buffer 391 from underflow.

Therefore, the sending apparatus 111 regulates the timing of multiplexing arranged to multiplex the BS audio TS 173 and the HQ audio TS 183 shown in FIG. 6 to generate a transport stream 190 based on the multiplexing constraints for random access so as to satisfy the virtual decoder 121 shown in FIG. 15 described above, i.e., so as to perform decoding with both of the BS audio data decoding processing unit 360-1 and the HQ audio data decoding processing unit 360-2. That is to say, the sending apparatus 111 performs multiplexing by sequentially determining TS packets to be multiplexed based on the multiplexing constraints for random access at timing such as preventing each buffer of the first virtual receiving apparatus (the first virtual decoder, i.e., the virtual decoder including the BS audio data decoding processing unit 360-1) and the second virtual receiving apparatus (the second virtual decoder, i.e., the virtual decoder 121 including the HQ audio data decoding processing unit 360-2) from overflow and underflow.

Figure 17:
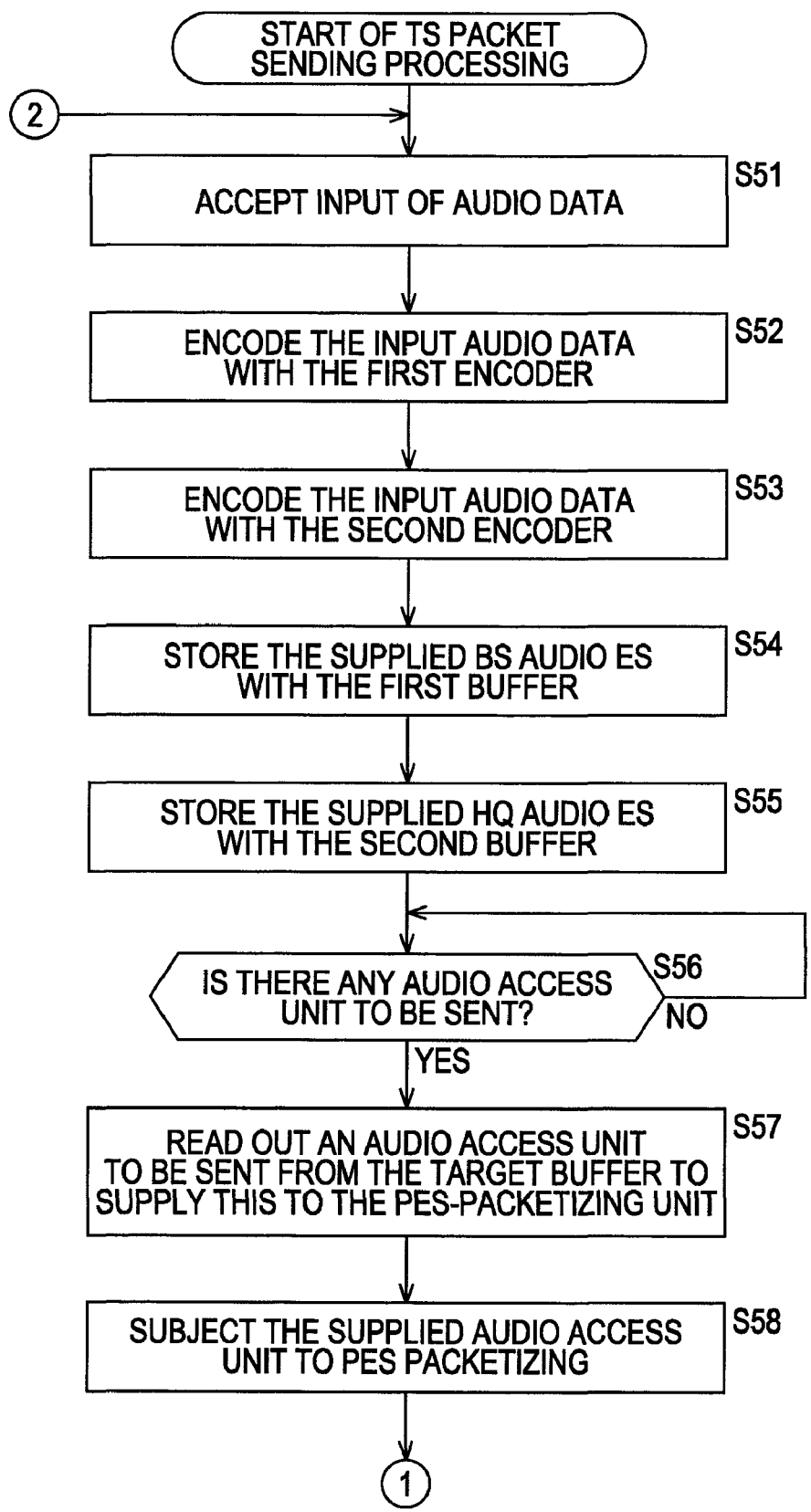
FIG. 17 is a flowchart describing TS packet sending processing.
Figure 18:
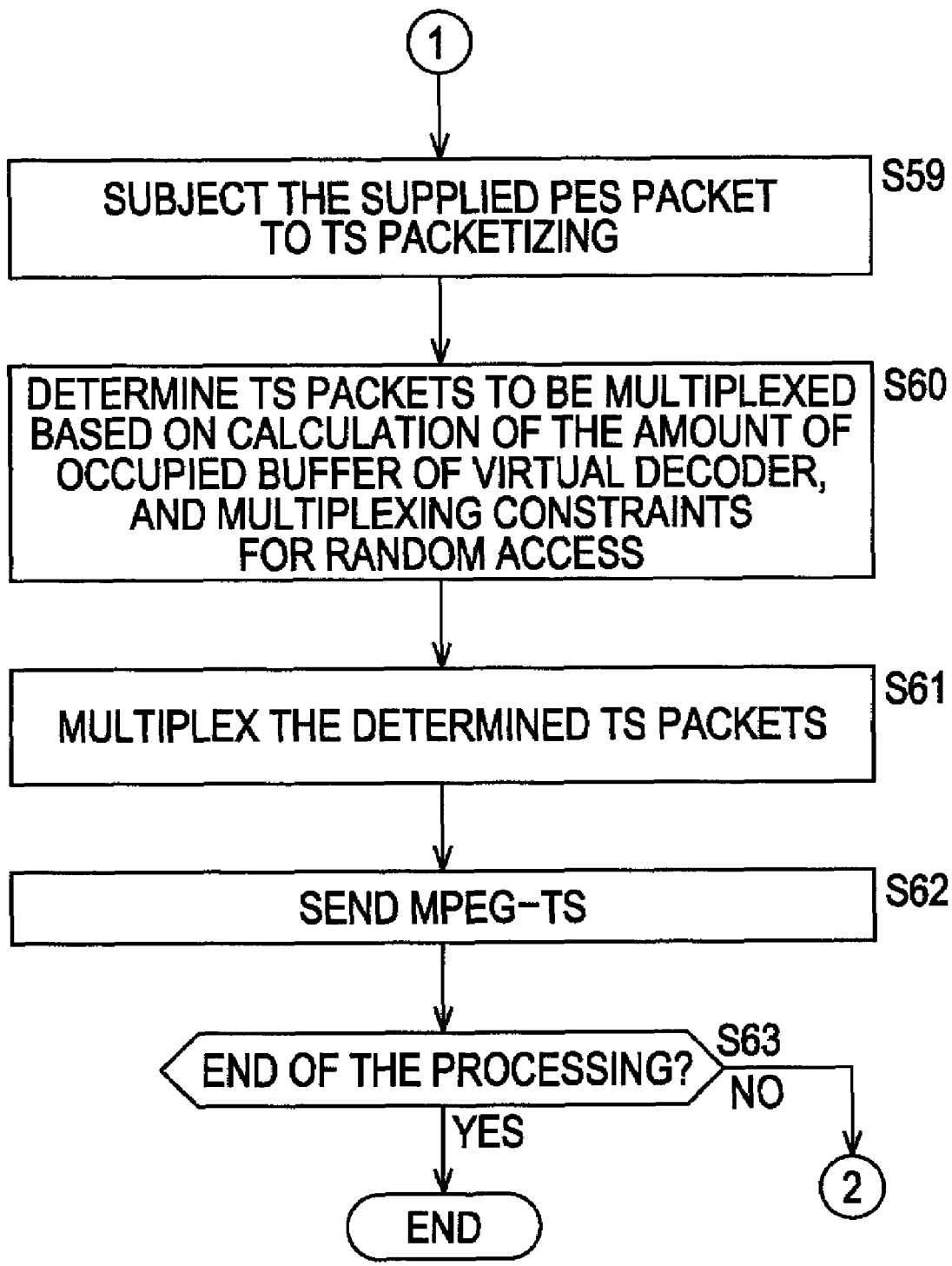
FIG. 18 is a flowchart describing TS packet sending processing.

Next, description will be made regarding processing in a case wherein the sending apparatus 111 thus described considers the performance of the virtual receiving apparatus 121, and also subjects an audio stream to encoding, TS packetizing, multiplexing, and sending based on the multiplexing constraints for random access. FIG. 17 and FIG. 18 are flowcharts describing the TS packet sending processing by the sending apparatus 111 shown in FIG. 4. Note that this processing is started when the power of the sending apparatus 111 is turned on, and an audio stream is input to the input unit 131.

In step S51, the input unit 131 accepts input of audio data, and outputs the accepted audio data to the audio encoder 132. Specifically, the input unit 131 supplies the audio data to the first encoder 141 and the second encoder 142 within the audio encoder 132.

In step S52, the first encoder 141 encodes the audio data using the first encoding method. As described above, for example, a fixed-length encoding method is employed as the first encoding method. The first encoder 141 supplies the BS audio ES obtained as a result of the encoding to the first buffer 143 of the buffer 133 which is the subsequent stage.

In step S53, the second encoder 142 encodes the audio data using the second encoding method. As described above, the second encoding method is a variable-length encoding method, and the second encoder 142 adds input timing at the time of encoding (the Input timing information 275 shown in FIG. 11). The second encoder 142 supplies the HQ audio ES obtained as a result of encoding to the second buffer 144 of the buffer 133 which is the subsequent stage.

Note that the BS audio ES output from the first encoder 141 in step S52 corresponds to the BS audio ES 171 shown in FIG. 6, and the HQ audio ES output from the second encoder 142 in step S53 corresponds to the HQ audio ES 181 shown in FIG. 6.

In step S54, the first buffer 143 stores (buffers) the BS audio ES 171 (see FIG. 6) supplied from the first encoder 141 of the audio encoder 13.

In step S55, the second buffer 144 stores (buffers) the HQ audio ES 181 (see FIG. 6) supplied from the second encoder 142 of the audio encoder 13.

In step S56, the control unit 135 determines whether or not an audio access unit to be sent is stored in the buffer 133, and stands by until determination is made that there is an audio access unit in the buffer 133. The control unit 135 monitors elementary streams (BS audio ES 171 and HQ audio ES 181) stored in the buffer 133 (first buffer 143 and second buffer 144), and also manages PTSs, thereby performing the determination in step S56 based on these. Specifically, the control unit 135 determines based on PTSs whether or not an audio access unit to be sent is stored in the first buffer 143 in the case of a BS audio ES, and determines based on the Input timing (Input timing information 275 shown in FIG. 11) whether or not an audio access unit to be sent is stored in the second buffer 144 in the case of an HQ audio ES.

For example, each of the audio access units of the BS audio ES 171 (e.g., BS(1), BS(2), and so on through BS(n) shown in FIG. 6) is arranged to have a fixed length, so the control unit 135 determines whether or not PTS(N)=PTS0+TT×h ("PTS0" denotes the PTS of the first audio access unit, "TT" denotes the display interval of access units, and h denotes the number of suffix shown with parentheses shown in FIG. 6) is stored in the first buffer 143. Also, for example, each of the audio access units of the HQ audio ES (e.g., HQ(1), HQ(2), and so on through HQ(m) shown in FIG. 6) is arranged to have a variable length, so the control unit 135 determines based on the Input timing added to the HQ audio ES 181 whether or not an audio access unit is stored in the second buffer 144. This is because with an HQ audio ES, audio access units have a variable length, which differ at the time of a BS audio ES, so upon control being performed with PTSs, for example, in the event that the size of an access unit is great, underflow may be caused due to transfer not being on time, and accordingly, it is necessary to transfer an audio access unit to the audio decoder of a variable bit rate at the point-in-time desired with the Input timing (Input timing information 275 shown in FIG. 11) which is earlier than the point-in-time of a PTS.

Note that the above-described fixed length and variable length are definitions as to the data size of an audio access unit, and each display interval as to one audio access unit is arranged to be constant. For example, let us say that the display interval of a BS audio ES is 32 milliseconds per one access unit, and in the display interval of an HQ audio ES is $1/1200$ second per one access unit.

In the event that determination is made in step S56 that there is an audio access unit to be sent, in step S57 the control unit 135 performs control so as to read out an audio access unit to be sent from the buffer 133 serving as an object, and supply this to the PES-packetizing unit 136. For example, the control unit 135 performs control so as to read out an audio access unit to be sent from the first buffer 143, and supply this to the PES-packetizing unit 136. Also, for example, the control unit 135 performs control so as to read out an audio access unit to be sent from the second buffer 144, and supply this to the PES-packetizing unit 136. Also, the control unit 135 instructs the PES-packetizing unit 136 to perform PES packetizing, and proceeds to the processing in step S58.

In step S58, the PES-packetizing unit 136 subjects the audio access unit supplied in the processing in step S57 to PES packetizing. Specifically, the PES-packetizing unit 136 includes the PTS supplied from the control unit 135 in the audio access unit (the audio access unit of a BS audio ES or HQ audio ES) supplied from the first buffer 143 or the second buffer 144 at the processing in step S57, and subjects this audio access unit to PES packetizing so as to satisfy the constraints. The PES-packetizing unit 136 supplies the PES packet subjected to PES packetizing and generated to the TS-packetizing unit 137.

For example, the PES-packetizing unit 136 obtains the BS audio ES supplied from the first buffer 143 (obtains the audio access unit corresponding to the PTS), and packetizes the BS audio ES to PES packets. Also, for example, the PES-packetizing unit 136 obtains the HQ audio ES supplied from the second buffer 144 (obtains the audio access unit corresponding to the Input timing), and packetizes the HQ audio ES to PES packets. At this time, the PES-packetizing unit 136 stores the PTS supplied from the control unit 135 in each PES packet making up a PES packet stream (e.g., BS audio PES 172 or HQ audio PES 182 shown in FIG. 6). Subsequently, the PES-packetizing unit 136 supplies the generated PES packet (e.g., among the BS audio PES 172 shown in FIG. 6, the PES packet subjected to PES packetizing in the processing in step S57, or among the HQ audio PES 182 shown in FIG. 6, the PES packet subjected to PES packetizing in the processing in step S57) to the TS-packetizing unit 137. At this time, the PES-packetizing unit 136 performs PES packetizing based on the constraints at the time of PES packetizing. The details of the PES packetizing processing will be described later with reference to FIG. 19.

Note that the BS audio PES output from the PES-packetizing unit 136 in step S58 corresponds to the BS audio PES 172 shown in FIG. 6, and the HQ audio PES output from the PES-packetizing unit 136 in step S58 corresponds to the HQ audio PES 182 shown in FIG. 6.

In step S59, the TS-packetizing unit 137 subjects the PES packet supplied from the PES-packetizing unit 136 to TS packetizing, and supplies the TS packet subjected to TS packetizing to the multiplexing unit 138. For example, the TS-packetizing unit 137 subjects the multiple BS audio PES packets making up the BS audio PES 172 to TS packetizing such as the multiple BS audio TS packets making up the BS audio TS 173 shown in FIG. 6. Subsequently, the TS-packetizing unit 137 supplies the multiple BS audio TS packets making up the BS audio TS 173 to the multiplexing unit 138 which is the subsequent stage. Similarly, for example, the TS-packetizing unit 137 subjects the multiple HQ audio PES packets making up the HQ audio PES 182 to TS packetizing such as the multiple HQ audio TS packets making up the HQ audio TS 183 shown in FIG. 6. Subsequently, the TS-packetizing unit 137 supplies the multiple HQ audio TS packets making up the HQ audio TS 183 to the multiplexing unit 138 which is the subsequent stage.

At this time, as shown in FIG. 10, the same PID and a different value of transport_priority are added to each TS header of the BS audio TS 173 and the HQ audio TS 183 both subjected to TS packetizing. In the case of the example shown in FIG. 5, "PID=a0, tp=1" is included in each TS packet of the BS audio TS 183, and "PID=a0, tp=0" is included in each TS packet of the HQ audio TS 183.

In step S60, the control unit 135 determines TS packets to be multiplexed based on calculation of the amount of occupied buffer of the virtual decoder 121, and the multiplexing constraints for random access. Specifically, the control unit 135 determines TS packets to be multiplexed next (any TS packet of a BS audio TS packet and an HQ audio TS packet) based on calculation of the amount of occupied buffer of the first virtual decoder and the second virtual decoder (see FIG. 14 and FIG. 15), and the multiplexing constraints for random access, and controls the multiplexing unit 138 to multiplex the TS packets of which the multiplexing is determined. That is to say, the control unit 135 determines the order of TS packets to be multiplexed to multiplex the BS audio TS 173 and the HQ audio TS 183 shown in FIG. 6 to generate a transport stream 190. Note that description will be made later regarding the calculation processing of the amount of occupied buffer of the virtual decoder 121 (first virtual decoder and second virtual decoder) with reference to FIG. 20 and FIG. 21, and description will be made later regarding the multiplexing constraint processing for random access with reference to FIG. 22.

In step S61, of the TS packets supplied from the TS-packetizing unit 137, the multiplexing unit 138 multiplexes the TS packets determined to be multiplexed at the processing in step S60 by the control unit 135. Specifically, of the respective TS packets of the BS audio TS 173 and the respective TS packets of the HQ audio TS 183 shown in FIG. 6, the multiplexing unit 138 (sequentially) multiplexes the TS packets determined to be multiplexed at the processing in step S60. Thus, the transport stream 190 shown in FIG. 6 is generated. The multiplexing unit 138 supplies the transport stream 190 generated by multiplexing the BS audio TS 173 and the HQ audio TS 183 to the sending unit 139.

In step S62, the sending unit 139 sends the transport stream 190 (FIG. 6) supplied from the multiplexing unit 138. The sending unit 139, for example, as shown in FIG. 3, controls the drive 112 to send a transport stream (MPEG2-TS) to the removable medium 113, or controls the communication unit 114 to send this to a receiving apparatus via the network 115. This receiving apparatus is not the virtual receiving apparatus 120 described with reference to FIG. 3 and FIG. 14, but an unshown receiving apparatus which actually receives the MPEG2-TS (includes a decoder).

In step S63, the control unit 135 determines whether to end the processing. For example, the control unit 135 determines to end the processing, in the event of completing input of audio data to the input unit 131, in the event of a user instructing to end the TS packet sending processing, in the event of completing sending of one audio stream, and so forth. In step S63, in the event of determining not to end the processing, the processing returns to step S51, where the subsequent processing is repeated. That is to say, again, input of audio data is accepted, the audio data is subjected to TS packetizing, TS packets to be multiplexed are determined based on calculation of the amount of occupied buffer of the virtual decoder 121, and the multiplexing constraints for random access, the determined TS packets are multiplexed, and a transport stream generated as a result of the multiplexing is sent. In step S63, in the event of determining to end the processing, the processing ends.

According to the processing shown in FIG. 17 and FIG. 18, TS packets are multiplexed in the order wherein the TS packets have been determined to be multiplexed based on calculation of the amount of occupied buffer of the first virtual decoder and the second virtual decoder (virtual decoder 121) described with reference to FIG. 14 and FIG. 15, and the multiplexing constraints for random access, so as long as a receiving apparatus (not shown) including a decoder compatible with a model of the virtual decoder 121 shown in FIG. 14 and FIG. 15 is employed, a transport stream (multiple TS packets) multiplexed with this processing can be decoded in a sure manner.

Figure 19:
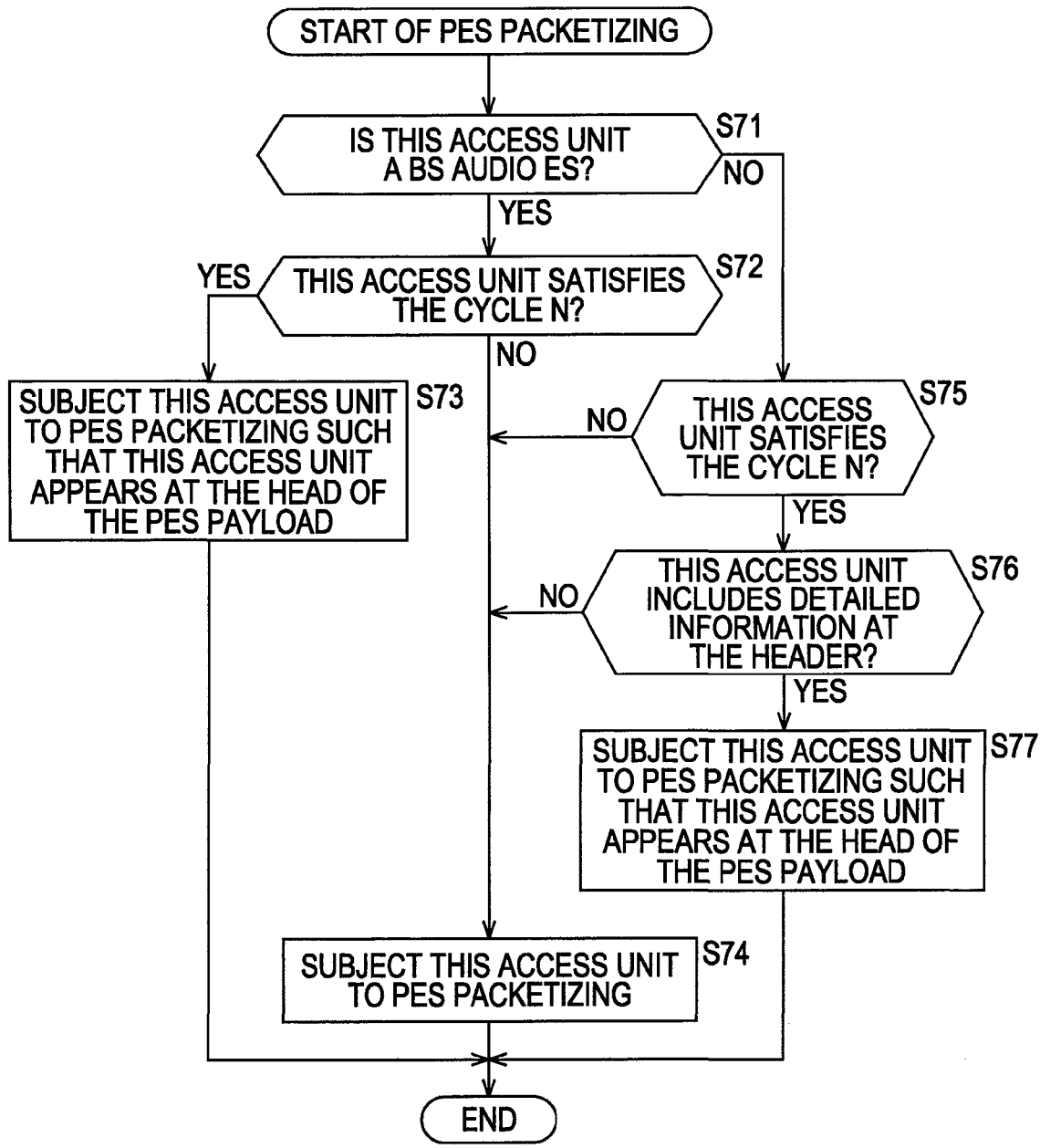
FIG. 19 is a flowchart describing PES packetizing processing.

Next, the details of the PES packetizing processing executed by the PES-packetizing unit 136, which is the processing in step S58 shown in FIG. 17, will be described with reference to the flowchart shown in FIG. 19.

In step S71, the PES-packetizing unit 136 determines whether or not the audio access unit supplied from the first buffer 143 or the second buffer 144 (audio access unit of a BS audio ES or an HQ audio ES) is an audio access unit of a BS audio ES. For example, in the case of the example shown in FIG. 6, an audio access unit of the BS audio ES 171 or HQ audio ES 181 of the first stage is supplied to the PES-packetizing unit 136, so determination is made whether the supplied audio access unit is the BS audio ES or HQ audio ES.

In the event that determination is made in step S71 that the supplied audio access unit is an access unit of a BS audio ES, the processing proceeds to step S72, and the PES-packetizing unit 136 determines whether or not the access unit of the BS audio ES is an access unit satisfying the cycle N. That is to say, the PES-packetizing unit 136 determines whether or not the access unit of the BS audio ES is an access unit satisfying the cycle N described above with reference to FIG. 13.

In the event that determination is made in step S72 that the access unit of the BS audio ES is an access unit satisfying the cycle N, in step S73 the PES-packetizing unit 136 subjects the access unit to PES packetizing such that the access unit appears at the head of a PES packet. At this time, the PES-packetizing unit 136 stores the PTS supplied from the control unit 135 in the PES header of the PES payload. In the example shown in FIG. 7, in the event that determination is made that the access unit of the BS(1) of the BS audio ES 171 is an access unit satisfying the cycle N, the PES-packetizing unit 136 subjects the access unit (BS(1)) such that the access unit (BS(1)) appears at the head of the PES payload of the PES packet 172-1. Subsequently, the PES-packetizing unit 136 stores PTS=BS1 supplied from the control unit 135 in the PES header of the PES packet 172-1.

On the other hand, in the event that determination is made in step S72 that the access unit of the BS audio ES is not an access unit satisfying the cycle N, the processing proceeds to step S74, where the PES-packetizing unit 136 subjects the access unit to PES packetizing. In the example shown in FIG. 7, in the event that determination is made that the access unit of the BS(2) of the BS audio ES 171 is not an access unit satisfying the cycle N, the PES-packetizing unit 136 stores the access unit (BS(2)) in the PES payload of the PES packet 172-1, thereby performing PES packetizing.

Thus, according to the processing in step S72, step S73, and step S74, the access units of a BS audio ES can be subjected to PES packetizing sequentially. Specifically, as for an access unit of a BS audio ES satisfying the cycle N, PES packetizing is performed such that the access unit appears at the head of a PES payload, and as for the other access units, PES packetizing is performed without providing constraints.

On the other hand, in the event that determination is made in step S71 that the supplied audio access unit is an access unit of a BS audio ES, i.e., in the event that the audio access unit supplied to the PES-packetizing unit 136 is an audio access unit of a HQ audio ES, the processing proceeds to step S75, where the PES-packetizing unit 136 determines whether or not the access unit of the HQ audio ES is an access unit satisfying the cycle N. That is to say, the PES-packetizing unit 136 determines whether or not the access unit of the HQ audio ES is an access unit satisfying the cycle N described above with reference to FIG. 13.

In the event that determination is made in step S75 that the access unit of the HQ audio ES is an access unit satisfying the cycle N, in step S76 the PES-packetizing unit 136 determines whether or not the access unit is an access unit of which the header includes detailed information. Specifically, the PES-packetizing unit 136 determines whether or not the detailed information 276 described above with reference to FIG. 11 is included in the header of the audio access unit.

In the event that determination is made in step S76 that the access unit is an access unit of which the header includes the detailed information 276, the processing proceeds to step S77, where the PES-packetizing unit 136 subjects the access unit to PES packetizing such that the access unit appears at the head of a PES payload. At this time, the PES-packetizing unit 136 stores the PTS supplied from the control unit 135 in the PES header of the PES payload. In the example shown in FIG. 8, in the event that determination is made that the access unit of the HQ(1) of the HQ audio ES 181 is an access unit satisfying the cycle N (YES in step S75), the PES-packetizing unit 136 subjects the access unit (HQ(1)) such that the access unit (HQ(1)) appears at the head of the PES payload of the PES packet 182-1. Subsequently, the PES-packetizing unit 136 stores PTS=HQ1 supplied from the control unit 135 in the PES header of the PES packet 182-1.

On the other hand, in the event that determination is made in step S75 that the access unit of the HQ audio ES is not an access unit satisfying the cycle N, or in the event that determination is made in step S76 that the access unit of the HQ audio ES is an access unit of which the header includes the detailed information 276, the processing proceeds to step S74, where the PES-packetizing unit 136 subjects the access unit to PES packetizing. In the example shown in FIG. 8, in the event that determination is made that the access unit of the HQ(2) of the HQ audio ES 181 is not an access unit satisfying the cycle N, or in the event that determination is made that the access unit of the HQ(2) of the HQ audio ES 181 is an access unit satisfying the cycle N, but is not an access unit of which the header includes the detailed information 276, the PES-packetizing unit 136 stores the access unit (HQ(2)) in the PES payload of the PES packet 182-1, thereby performing PES packetizing.

Thus, according to the processing in step S74 through step S77, the access units of an HQ audio ES can be subjected to PES packetizing sequentially. Specifically, as for an access unit of an HQ audio ES of which the header includes the detailed information 276 (FIG. 11), PES packetizing is performed such that the access unit appears at the head of a PES payload, and as for the other access units, PES packetizing is performed without providing constraints.

The processing ends following the processing in step S73, following the processing in step S74, or following the processing in step S77.

Thus, the cycle N (FIG. 13) is defined such that the display point-in-time of a BS audio ES access unit and the display point-in-time of an HQ audio ES access unit are equal, and one cycle interval is equal to or shorter than one second, an BS audio ES access unit is subjected to PES packetizing based on this cycle, and an HQ audio ES access unit is subjected to PES packetizing based on not only that cycle but also regarding whether or not the header includes the detailed information, whereby PES packets can be generated in light of the constraints in the case of multiplexing and in the case of random access.

Next, description will be made with reference to FIG. 20 and FIG. 21 regarding the calculation of the amount of occupied buffer of the virtual decoder executed by the control unit 135 in step S60 shown in FIG. 18.

First, the calculation processing of the amount of occupied buffer as to BS audio will be described with reference to the flowchart shown in FIG. 20. Note that this processing is processing wherein the control unit 135 shown in FIG. 4 calculates the timing of multiplexing of TS packets, assuming that the virtual decoder 121 serving as the receiving side can decode a BS audio ES alone. That is to say, this processing is processing which the control unit 135 executes, assuming that the virtual decoder 121 serving as the receiving side is the first virtual decoder.

In step S101, in the event that the transport buffer 362-1 of the BS audio data decoding processing unit 360-1 shown in FIG. 15 has space to store a TS packet of tp=1, the control unit 135 controls the multiplexing unit 138 to multiplex the TS packet. That is to say, in the event that the transport buffer 362-1 shown in FIG. 15 has space to store a BS audio TS packet (TS packet corresponding to a BS audio ES), the control unit 135 controls the multiplexing unit 138 to multiplex the BS audio TS packet thereof.

In step S102, the control unit 135 perform calculation, assuming that in the event that the elementary buffer 363-1 (Bn=B1) of the virtual decoder 121 shown in FIG. 15 has space, data is extracted at a bit rate of Rx1 (Rxn=Rx1) from the transport buffer 362-1, and this is supplied to the elementary buffer 363-1 (B1). As described above, the input bit rate as to the elementary buffer 363-1 of the first virtual decoder is the Rx1, so the control unit 135 performs calculation, assuming that data is extracted at a rate of the Rx1, and also performs calculation, assuming that the storage capacity of the elementary buffer 363-1 is Bn=B1.

In step S103, the control unit 135 performs calculation, assuming that when the PTS of an audio access unit becomes equal to the time on the system time clock of the virtual decoder 121, the audio access unit thereof is extracted from the elementary buffer 363-1 (B1), and is supplied to the audio decoder 364-1. For example, the control unit 135 performs calculation, assuming that when the system time clock of the virtual decoder 121 becomes equal to the PTS of an audio access unit, an audio access unit having the PTS thereof is extracted from the elementary buffer 363-1, and is supplied to the audio decoder 364-1. Subsequently, the processing ends.

Figure 20:
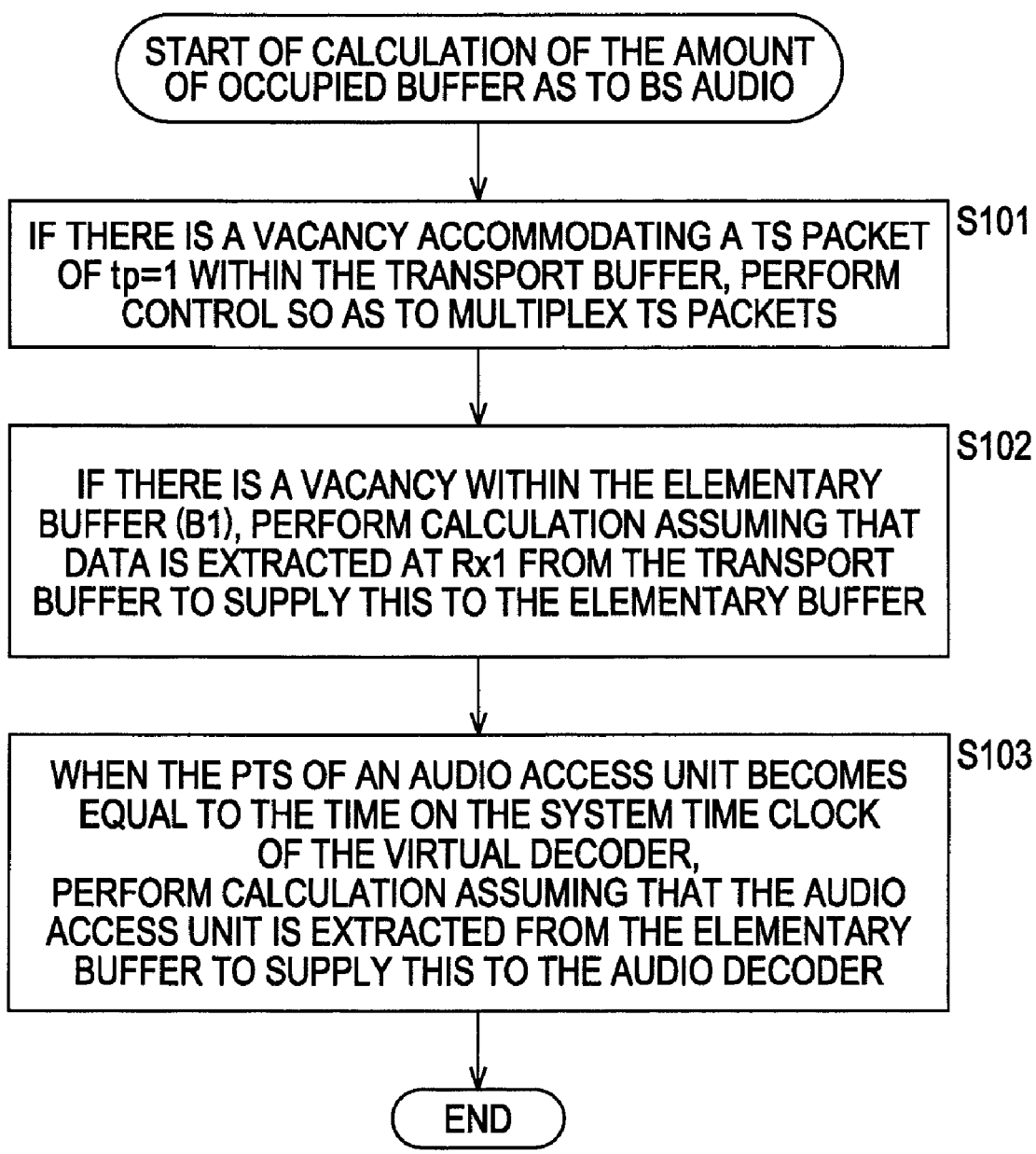
FIG. 20 is a flowchart describing calculation processing of the amount of occupied buffer as to BS audio.

Note that the processing shown in FIG. 20 is processing executed in the case of executing the processing in step S60 shown in FIG. 18, which is repeatedly executed.

Thus, the control unit 135 calculates the amount of occupied buffer of the decoder, assuming the decoder (first virtual decoder) capable of decoding a BS audio ES alone. That is to say, the control unit 135 calculates the amount of occupied buffer of the first virtual decoder, assuming that the BS audio data decoding processing unit 360-1 shown in FIG. 15 is provided in the audio data decoding processing unit 360 shown in FIG. 14, and based on this, and later-described multiplexing constraints for random access shown in FIG. 22, the control unit 135 determines the multiplexing timing of TS packets. Thus, the decoder (actual decoder) capable of decoding a BS audio ES alone can decode a BS audio ES in a sure manner while causing the amount of occupied buffer to neither overflow nor underflow.

Next, the calculation processing of the amount of occupied buffer as to HQ audio will be described with reference to the flowchart shown in FIG. 20. Note that this processing is processing wherein the control unit 135 shown in FIG. 4 calculates the timing of multiplexing of TS packets, assuming that the virtual decoder 121 serving as the receiving side can decode an HQ audio ES. That is to say, this processing is processing which the control unit executes, assuming that the virtual decoder 121 serving as the receiving side is the second virtual decoder.

In step S151, in the event that the transport buffer 362-2 of the HQ audio data decoding processing unit 360-2 shown in FIG. 15 has space to store a TS packet of tp=0, the control unit 135 controls the multiplexing unit 138 to multiplex the TS packet. That is to say, in the event that the transport buffer 362-2 shown in FIG. 15 has space to store an HQ audio TS packet (TS packet corresponding to an HQ audio ES), the control unit 135 controls the multiplexing unit 138 to multiplex the HQ audio TS packet thereof.

In step S152, the control unit 135 perform calculation, assuming that in the event that the elementary buffer 363-2 (Bn=B2_1) of the virtual decoder 121 shown in FIG. 15 has space, data is extracted at a bit rate of Rx2 (Rxn=Rx2) from the transport buffer 362-2, and this is supplied to the elementary buffer 363-2 (B2_1). As described above, the input bit rate as to the elementary buffer 363-2 of the second virtual decoder is the Rx2, so the control unit 135 performs calculation, assuming that data is extracted at a rate of the Rx2, and also performs calculation, assuming that the storage capacity of the elementary buffer 363-2 is Bn=B2_1.

In step S153, the control unit 135 performs calculation, assuming that based on the Input timing of an audio access unit, the audio access unit thereof is extracted from the elementary buffer 363-2 (B2_1), and is supplied to the FIFO buffer 391 (B2_2). As described above, the Input timing (see FIG. 11) is added to the HQ audio ES encoded and output by the second encoder 142, so the control unit 135 performs calculation, assuming that based on this Input timing, an audio access unit is extracted from the elementary buffer 363-2 (B2_1), and is supplied to the FIFO buffer 391 (B2_2).

In step S154, the control unit 135 performs calculation, assuming that based on the PTS of an audio access unit, the audio access unit thereof is extracted from the FIFO buffer (B2_2), and is supplied to the audio decoder 392. Specifically, the control unit 135 performs calculation, assuming that when the PTS of an audio access unit becomes equal to the time on the system time clock of the virtual decoder 121 (second virtual decoder), the audio access unit thereof is extracted from the FIFO buffer 391, and is supplied to the audio decoder 392. Subsequently, the processing ends.

Thus, with the elementary buffer 363-2 (B2_1), the amount of occupied buffer develops at the timing based on the Input timing. Also, the FIFO buffer 391 (B2_2) does not overflow, but may underflow. Therefore, it is necessary to multiplex TS packets at timing such as preventing the FIFO buffer 391 (B2_2) from underflow, and also preventing the elementary buffer 363-2 (B2_1) from overflow and underflow.

Next, description will be made with reference to the flowchart shown in FIG. 22 regarding the multiplexing constraint processing for random access executed by the control unit 135 in step S60 shown in FIG. 18. Note that this processing is processing wherein the control unit 135 shown in FIG. 4 constrains the multiplexing timing of TS packets in light of an EP_map created for random access (the details will be described later).

In step S201, the control unit 135 determines whether or not within a BS audio TS and an HQ audio TS there is a TS packet including an HQ audio PES packet having the same PTS value as the PTS value of the PES header included in the TS payload of a BS audio TS packet. For example, the control unit 135 determines whether or not within the BS audio TS 173 and the HQ audio TS 183 there is a TS packet including an HQ audio PES packet having the same PTS value as PTS=BS1 which is the PTS value of the PES header (BS audio PES packet 172-1 shown in FIG. 7) included in the payload of the BS audio TS packet shown in FIG. 7. In the event of PTS=BS1 (FIG. 7)=HQ1 (FIG. 8), the control unit 135 determines that within the BS audio TS 173 and the HQ audio TS 183 there is a TS packet (HQ audio TS packet 232-1 shown in FIG. 8) including an HQ audio PES packet having the same PTS value (BS1=HQ1) as the PTS value (BS1) of the PES header included in the TS payload of a BS audio TS packet.

A more specific example will be described with reference to FIG. 9. The PTS values of PES headers are stored in the BS audio TS packets 231-1, 231-3, and 231-j–1. Similarly, the PTS values of PES headers are stored in the HQ audio TS packets 232-1, 232-4, and 232-k–2. Now, let us say that PTS#1=BS1=HQ1 and PTS#2=BS2n'=HQm' hold, and BS2 and HQ2 differ. At this time, determination is made that within the BS audio TS 173 and the HQ audio TS 183 there is the TS packet 232-1 including an HQ audio PES packet having the same PTS value (PTS#1=HQ1) as the PTS value (PTS#1=BS1) of the PES header included in the TS payload of the BS audio TS packet 231-1. On the other hand, BS2 and HQ2 are not equal, so determination is made that within the BS audio TS 173 and the HQ audio TS 183 there is no TS packet including an HQ audio PES packet having the same PTS value as the PTS value (BS2) of the PES header included in the TS payload of the BS audio TS packet 231-3.

In the event that determination is made in step S201 that within a BS audio TS and an HQ audio TS there is a TS packet including an HQ audio PES packet having the same PTS value as the PTS value of the PES header included in the TS payload of a BS audio TS packet, the processing proceeds to step S202, where the control unit 135 determines the TS packet including a BS audio PES packet as a TS packet to be multiplexed prior to the TS packet including an HQ audio PES packet. For example, in FIG. 9, in the event that determination is made that within the BS audio TS 173 and the HQ audio TS 183 there is the TS packet 232-1 including an HQ audio PES packet having the same PTS value (PTS#1=HQ1) as the PTS value (PTS#1=BS1) of the PES header included in the TS payload of the BS audio TS packet 231-1, in step S202 the control unit 135 determines the TS packet 231-1 including the BS audio PES packet 172-1 (see FIG. 7) as a TS packet to be multiplexed prior to the TS packet 232-1 including the HQ audio PES packet 182-1 (see FIG. 8).

In the event that determination is made in step S201 that within a BS audio TS and an HQ audio TS there is no TS packet including an HQ audio PES packet having the same PTS value as the PTS value of the PES header included in the TS payload of a BS audio TS packet, or following the processing in step S202, the processing ends.

Figure 22:
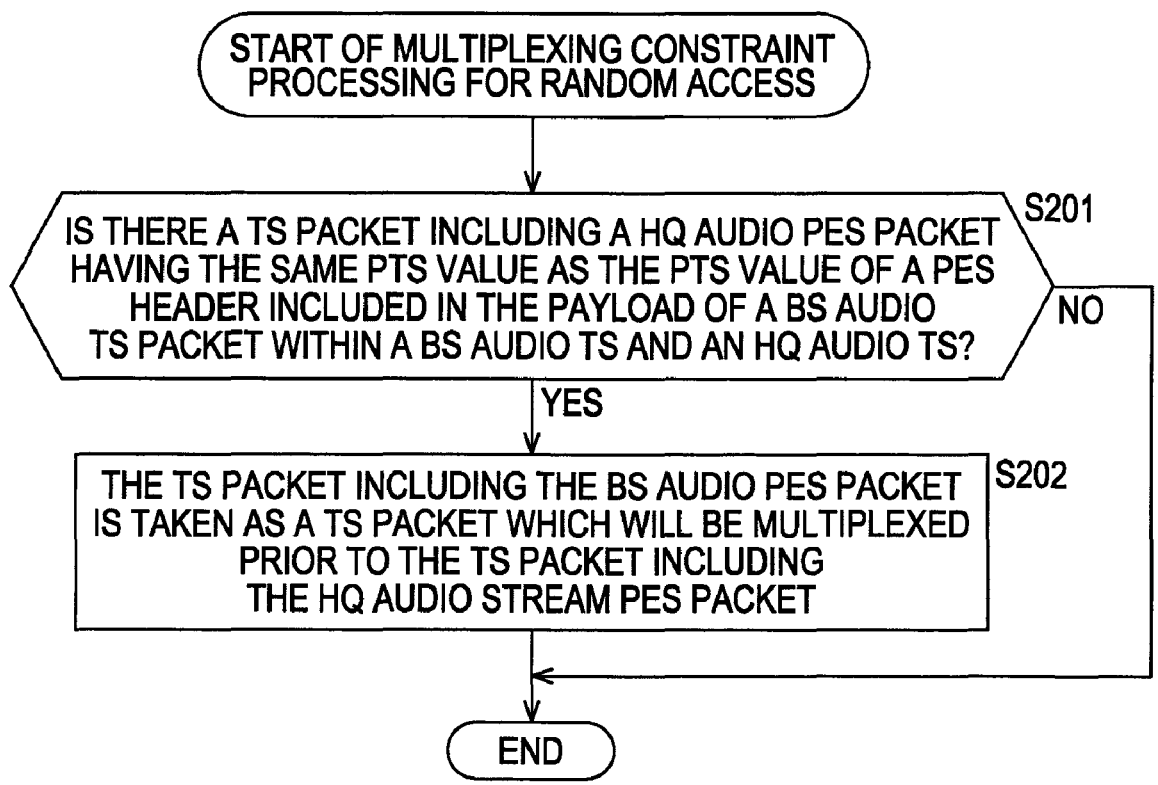
FIG. 22 is a flowchart describing multiplexing constraint processing for random access.

According to the processing shown in FIG. 22, let us say that in the event that the PTS values included in a BS audio TS packet and an HQ audio TS packet are equal, as for the TS packets including the PES packet thereof, the BS audio TS packet is multiplexed prior to the HQ audio TS packet.

Note that the processing shown in FIG. 22 is processing executed in the case of executing the processing in step S60 shown in FIG. 18, which is repeatedly executed.

Thus, the control unit 135 executes the multiplexing constraint processing for random access. Accordingly, an EP_map which is created for random access can be created, whereby a TS can be multiplexed so as to enable random access. Thus, the actual decoder can decode a BS audio ES in a sure manner while causing the amount of occupied buffer to neither overflow nor underflow, and also be capable of random access.

Figure 21:
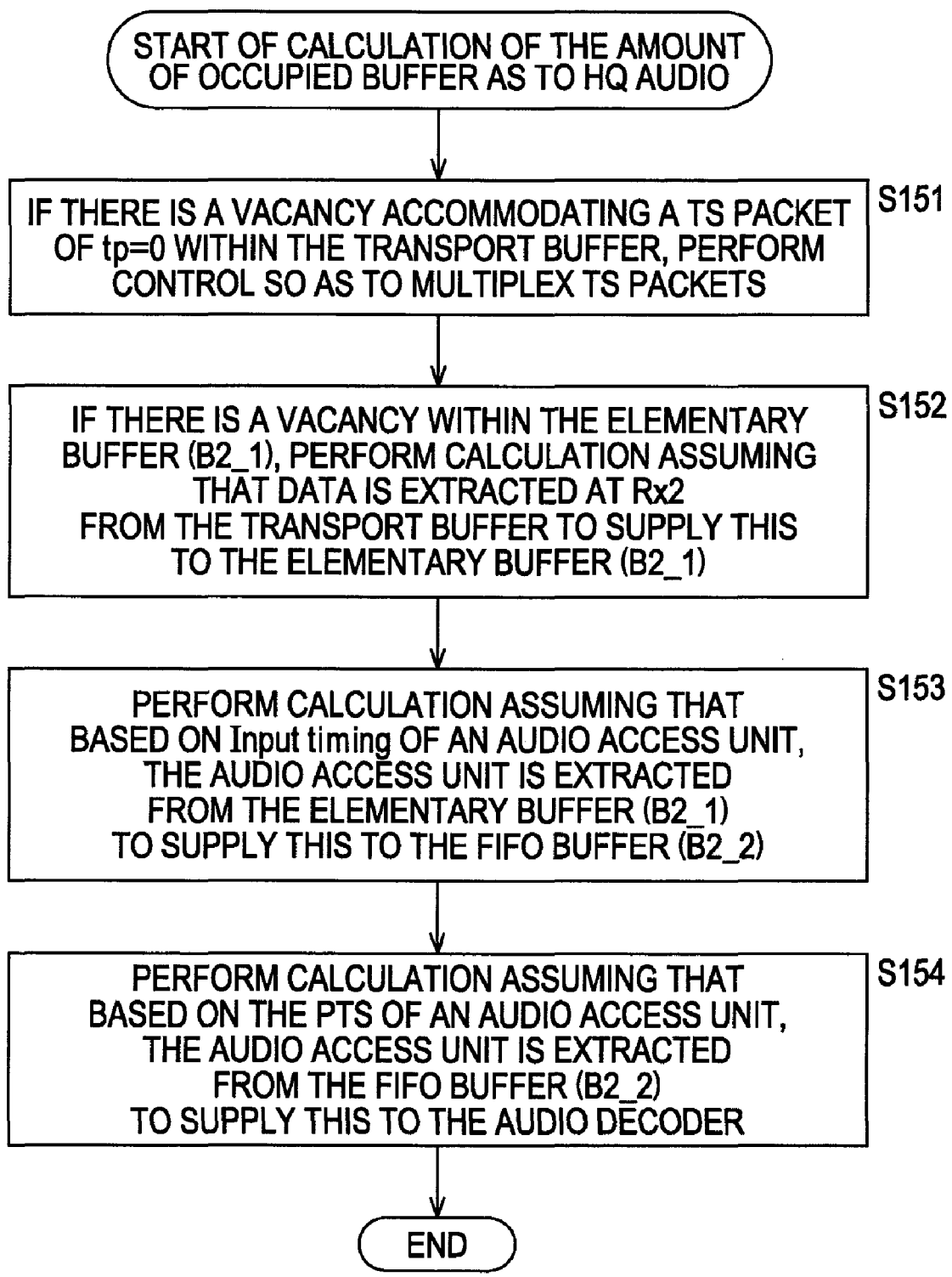
FIG. 21 is a flowchart describing calculation processing of the amount of occupied buffer as to HQ audio.

Note that the processing shown in FIG. 21 and FIG. 22 is processing executed in the case of executing the processing in step S60 shown in FIG. 18, and is repeatedly executed. That is to say, in the event of executing the processing in step S60 shown in FIG. 18, the processing shown in FIG. 20, the processing shown in FIG. 21, and the processing shown in FIG. 22 is executed in parallel. More specifically, in the event of executing the processing in step S60 shown in FIG. 18, the control unit 135 calculates the multiplexing timing of TS packets corresponding to BS audio by the processing shown in FIG. 20, and also calculates the multiplexing timing of TS packets corresponding to HQ audio by the processing shown in FIG. 21, and further repeatedly executes the multiplexing constraint processing for random access by the processing shown in FIG. 22.

In other words, the control unit 135 determines (regulates) audio TS packets to be multiplexed such as preventing the transport buffer 362-1 and the transport buffer 362-2 from overflow, and also preventing the elementary buffer 363-1 and the elementary buffer 363-2 from overflow and underflow, and further preventing the FIFO buffer 391 from underflow, of the virtual decoder 121 shown in FIG. 15.

Thus, the control unit 135 calculates the amount of occupied buffer of the decoder, assuming a virtual decoder capable of decoding a BS audio ES (first virtual decoder), and a virtual decoder capable of decoding an HQ audio ES (second virtual decoder), and also executes the multiplexing constraint processing for random access to determine TS packets to be multiplexed (determine the order of TS packets to be multiplexed). Thus, even with a decoder (actual decoder) capable of decoding a BS audio ES alone, and even with a decoder (actual decoder) capable of decoding an HQ audio ES, decoding can be performed in a sure manner while causing the amount of occupied buffer to neither overflow nor underflow. Also, random access can be performed as to the multiplexed TS 190.

That is to say, even in the event that the actual receiving apparatus, which receives the TS packets (MPEG2-TS) multiplexed by the sending apparatus, can actually decode a BS audio ES alone or can decode an HQ audio ES, decoding can be performed smoothly while causing the buffer included in each receiving apparatus to neither overflow nor underflow.

Note that a BS audio ES and an HQ audio ES are identifiable with the value of the transport_priority (tp) such as shown in FIG. 10, but have a mutually independent relation, so there is no constraint in the case of multiplexing a BS audio ES and an HQ audio ES. Therefore, a BS audio ES and an HQ audio ES can be handled as independent streams.

Next, an example will be described wherein an EP_map for random access is created using the MPEG2-TS sent by the processing shown in FIG. 17 and FIG. 18. For example, description will be made regarding processing in the case of a Clip AV stream file generated based on the MPEG2-TS being recorded in a recording medium, and also in the case of an EP_map for random access being created and recorded based on the Clip AV stream file thereof.

Figure 23:
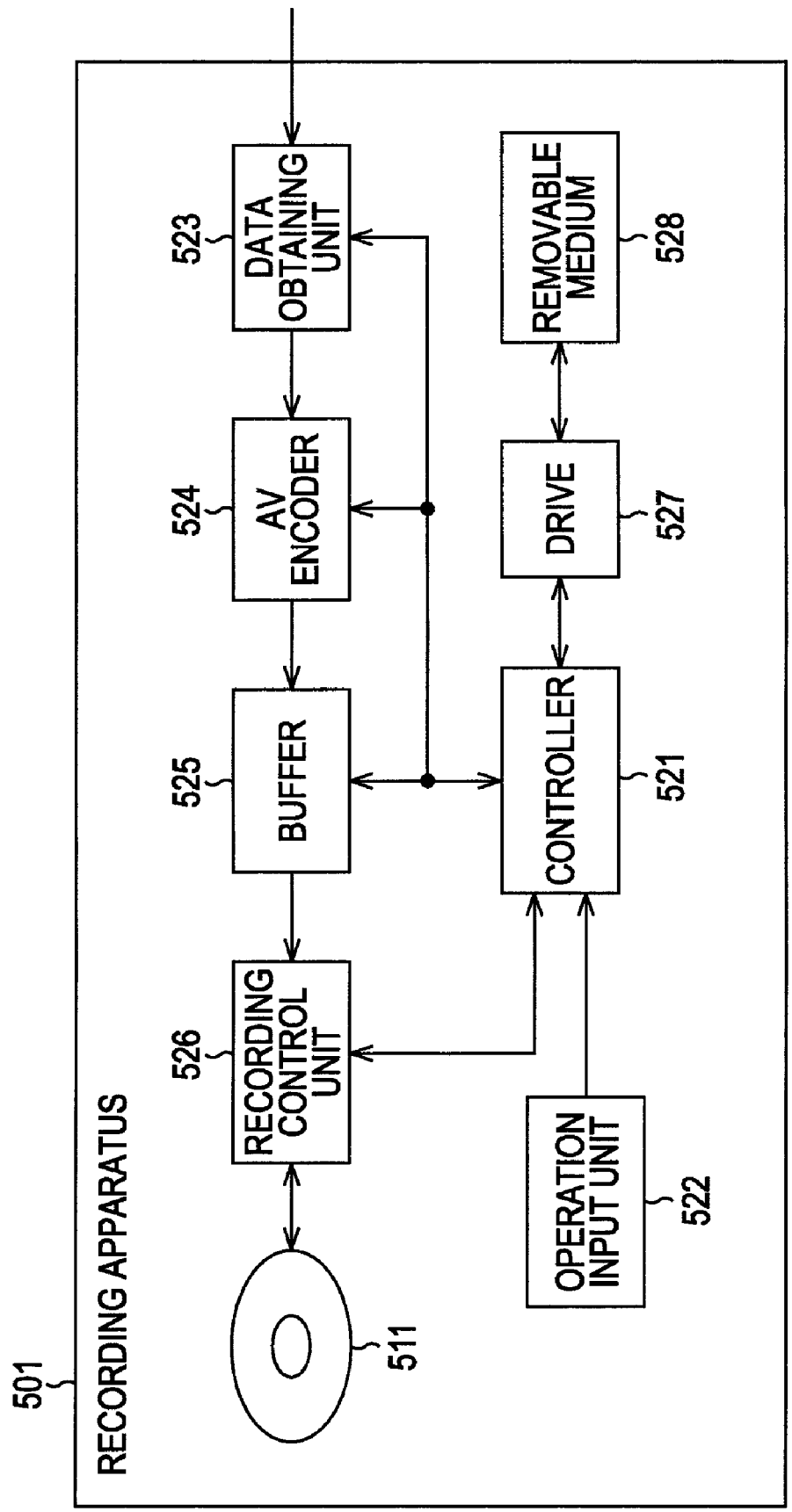
FIG. 23 is a block diagram illustrating a configuration example of a recording apparatus configured to create an EP_map.

FIG. 23 is a block diagram illustrating a configuration example of a recording apparatus 501 which creates and records an EP_map based on the Clip AV stream file recorded in an optical disc 511.

The recording apparatus 501 is provided with an optical disc 511, a controller 521, an operation input unit 523, an AV (Audio Visual) encoder 524, a buffer 525, a recording control unit 526, a drive 527, and a removable medium 528.

The controller 521 executes a control program prepared beforehand, thereby controlling the overall operation of the recording apparatus 501. For example, the controller 521 can control processing arranged to record an EP_map and so forth which enables a later-described playback apparatus (playback apparatus 641 shown in FIG. 30) to randomly access to the optical disc 511 based on the Clip AV stream file recorded in the optical disc 511 which is a mounted recording medium.

The operation input unit 522 is configured of an input device, for example, such as buttons, keys, a touch panel, a jog dial, a mouse and so forth, and a receiving unit configured to receive a signal such as infrared rays sent from a predetermined remote commander, which obtains the operation input of a user to supply this to the controller 521.

The data obtaining unit 523 externally obtains AV data, i.e., video data and audio data, and supplies these to the AV encoder 524. The AV encoder 524 encodes the supplied video data and audio data with each predetermined encoding method, and supplies a video ES (elementary stream) and an audio ES to the buffer 525. The buffer 525 temporally buffers the encoded data, and supplies this to the recording control unit 526 at a predetermined timing.

The recording control unit 526 records the data (MPEG2-TS) supplied from the buffer 525 or controller 521 in the optical disc 511 in accordance with the control by the controller 521.

Also, for example, the operation input unit 522 accepts input of specification of a predetermined playback zone among an AV stream from a user, and supplies this to the controller 521. On the other hand, the controller 521 creates the database of AV streams (Clip), the database wherein playback zones of an AV stream (PlayItems) are grouped (PlayList), and the management information of the recorded contents of the optical disc 511 (index.bdmv and MovieObject.bdmv). Application database information made up of such information is input to the recording control unit 526, as with an AV stream. The recording control unit 526 records a database file in the optical disc 511 based on the control signal output from the controller 521.

Also, the controller 521 is connected with the drive 527 as necessary, and the drive 527 is mounted with, for example, a magnetic disk (including a flexible disk), an optical disc (CD-ROM (Compact Disc-Read Only Memory), including DVD), a magneto-optic disk (MD (registered trademark), including Mini-Disk), or the removable medium 528 made up of semiconductor memory or the like.

It is needless to say that a magnetic disk or semiconductor memory, for example, may be employed as a recording medium configured to record contents, besides the optical disc 511.

Figure 24:
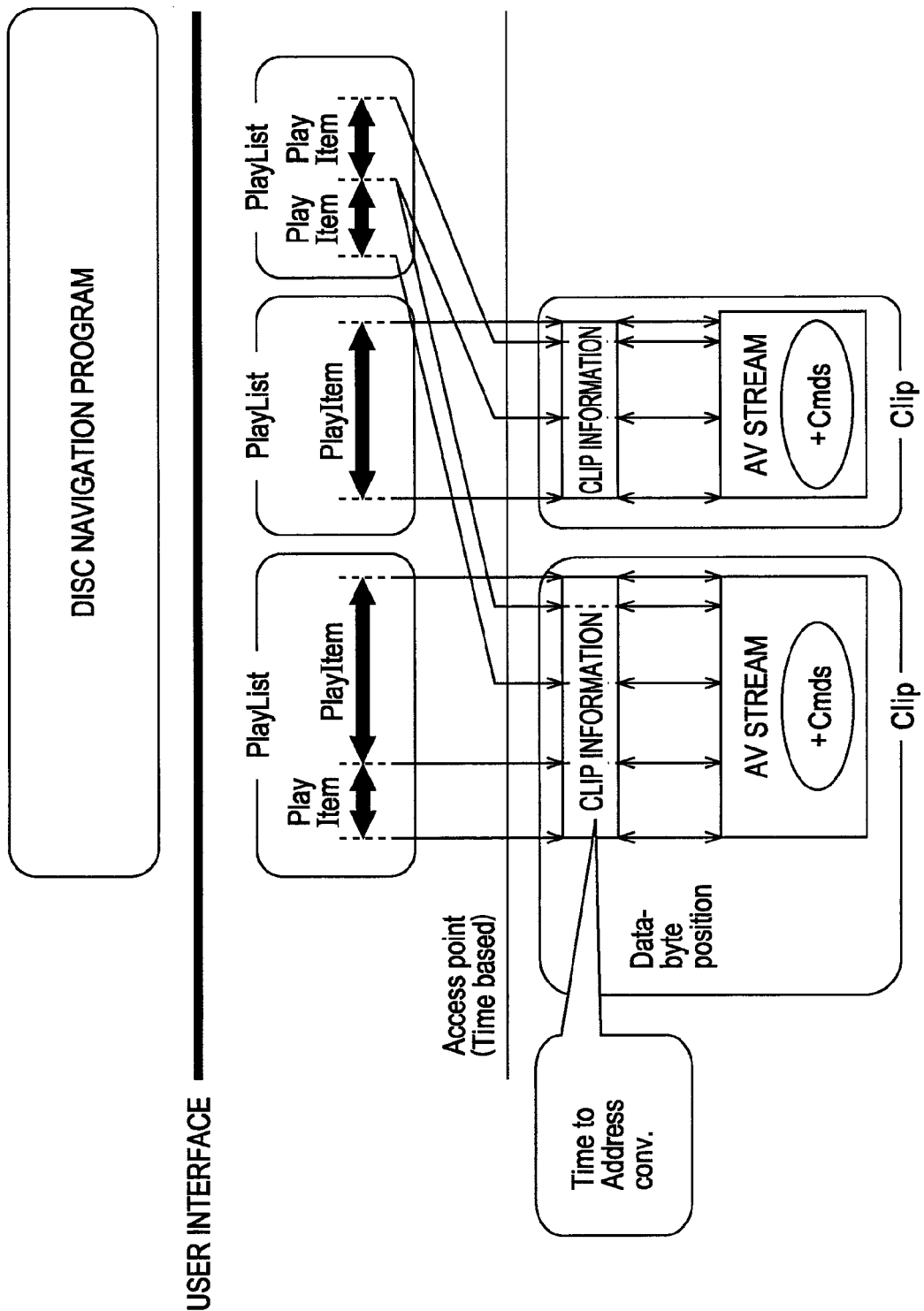
FIG. 24 is a diagram illustrating an application format example on an optical disc.
Figure 30:
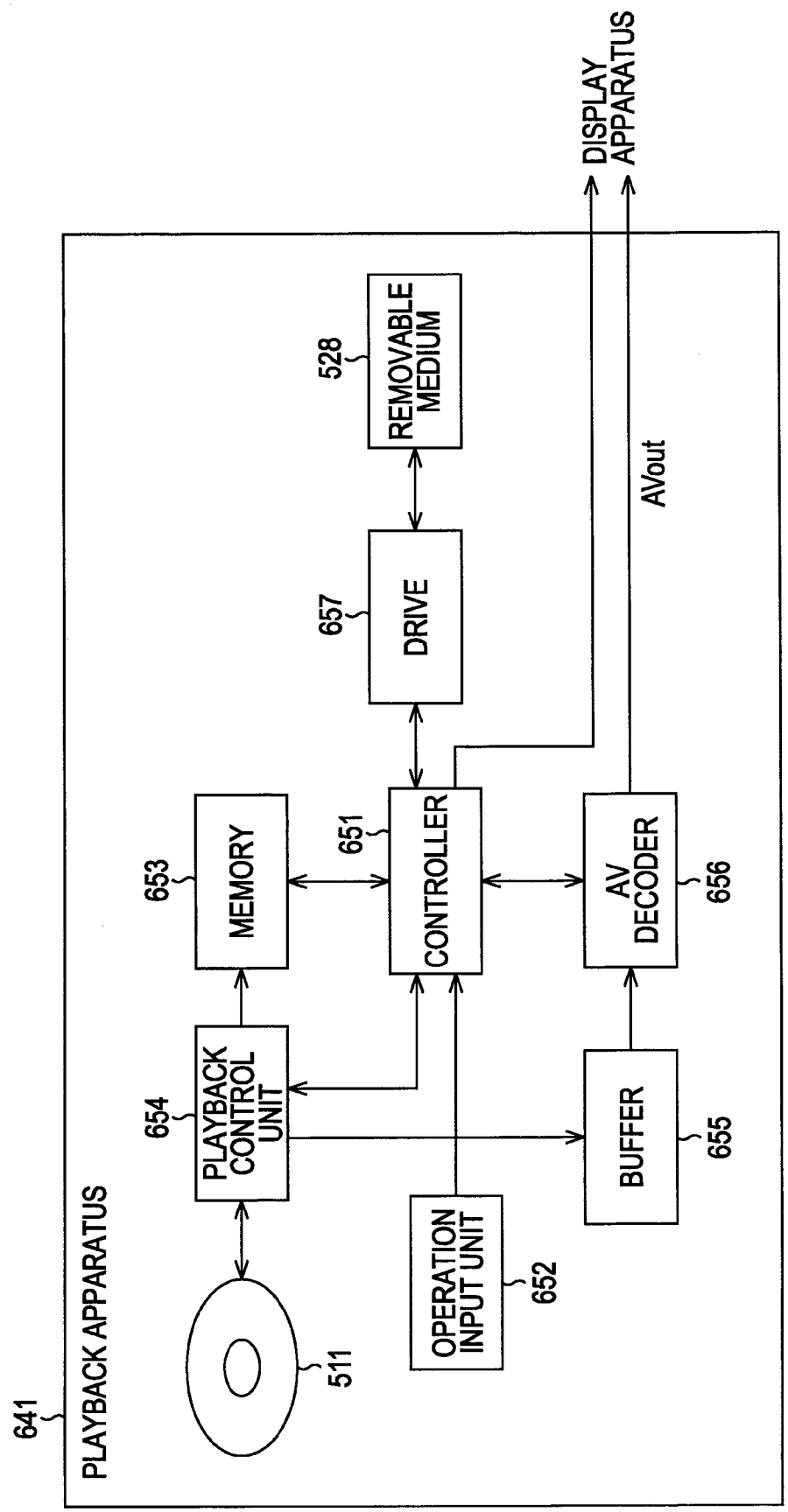
FIG. 30 is a block diagram illustrating a configuration example of a playback apparatus.

FIG. 24 is a diagram illustrating an application format example on the optical disc 511 to be mounted on the recording apparatus 501 shown in FIG. 23, or a later-described playback apparatus 641 shown in FIG. 30.

An application format includes the two layers of a PlayList and a Clip arranged to manage AV streams. Here, a pair of an AV stream and Clip information accompanied therewith are taken as one object, which are collectively called Clip. Also, Clip information is also referred to as a Clip information file.

One AV stream file stores data wherein an MPEG (Moving Picture Expert Group) 2 transport stream is disposed in the structure stipulated with the application format. In general, a file employed for a computer and so forth is handled as a byte row, the contents of an AV stream file is rendered on the temporal axis, and an access point of a Clip is principally a time stamp, which is specified with a PlayList. That is to say, a PlayList and a Clip are layers arranged to manage AV streams.

In the event that an access point within a Clip is a time stamp, which is indicated with a PlayList, a Clip information file (e.g., EP_map) is employed for searching address information to start decoding within an AV stream file with reference to the time stamp.

A PlayList is a group of playback zones of an AV stream. One playback zone within a certain AV stream is referred to as a PlayItem, which is represented with a pair of an IN point (playback start point) and an OUT point (playback end point) of a PlayItem on the temporal axis. Accordingly, a PlayList is made up of one or multiple PlayItems such as shown in FIG. 24.

In FIG. 24, the leftmost PlayList is made up of two PlayItems, and according to the two PlayItems thereof, the first half portion and the latter half portion of an AV stream included in the left-hand side Clip are each referenced. Also, the second PlayList from the left side is made up of one PlayItem, whereby the entire AV stream included in the left-side Clip is referenced. Further, the third PlayList from the left is made up of two PlayItems, and according to the two PlayItems thereof, a certain portion of an AV stream included in the left-side Clip, and a certain portion of an AV stream included in the right-side Clip are each referenced.

For example, in the event that the left-side PlayItem included in the leftmost PlayLIst is specified by a user as information indicating the playback position at that time using a disc navigation program shown in FIG. 24, the first half portion of the AV stream included in the left-side Clip to which the PlayItem thereof refers is played. Thus, a PlayList is employed as playback management information arranged to manage the playback of an AV stream file.

The disc navigation program includes a function arranged to control the order of playback of a PlayList, and interactive playback of a Playlist. Also, the disc navigation program also includes a function arranged to display a menu screen configured to allow a user to execute various types of playback, and so forth. This disc navigation program is, for example, described with a program language such as Java (registered trademark), and prepared on a recording medium.

With the present embodiment, of a PlayList, a playback path created with one or more PlayItem rows (continuous PlayItems) is referred to as a main path, and a playback path created with one or more sub path rows (discontinuous or continuous SubPlayItems) in parallel (concurrent) with a main path is referred to as a sub path. That is to say, an application format on a recording medium to be mounted on the recording apparatus 501 or a playback apparatus (a playback apparatus 641 described later with reference to FIG. 30) has a sub path to be played, correlated (together) with a main path, within a PlayLIst.

Next, description will be made regarding a Clip information file (Clip information shown in FIG. 24). The recording apparatus 501 according to the present embodiment records one Clip AV stream, and the Clip information file corresponding thereto in the optical disc 511 as separate files. Here, a Clip AV stream is a file into which the MPEG-TS sent in the above-mentioned processing shown in FIG. 17 and FIG. 18 is converted. A Clip information file includes CPI (Characteristic Point Information) and a ClipMark.

CPI is data included in a Clip information file, and is principally employed for finding a data address from which read-out of data of a Clip AV stream file should be started. With the present embodiment, CPI of the type of EP_map is employed.

Figure 25:
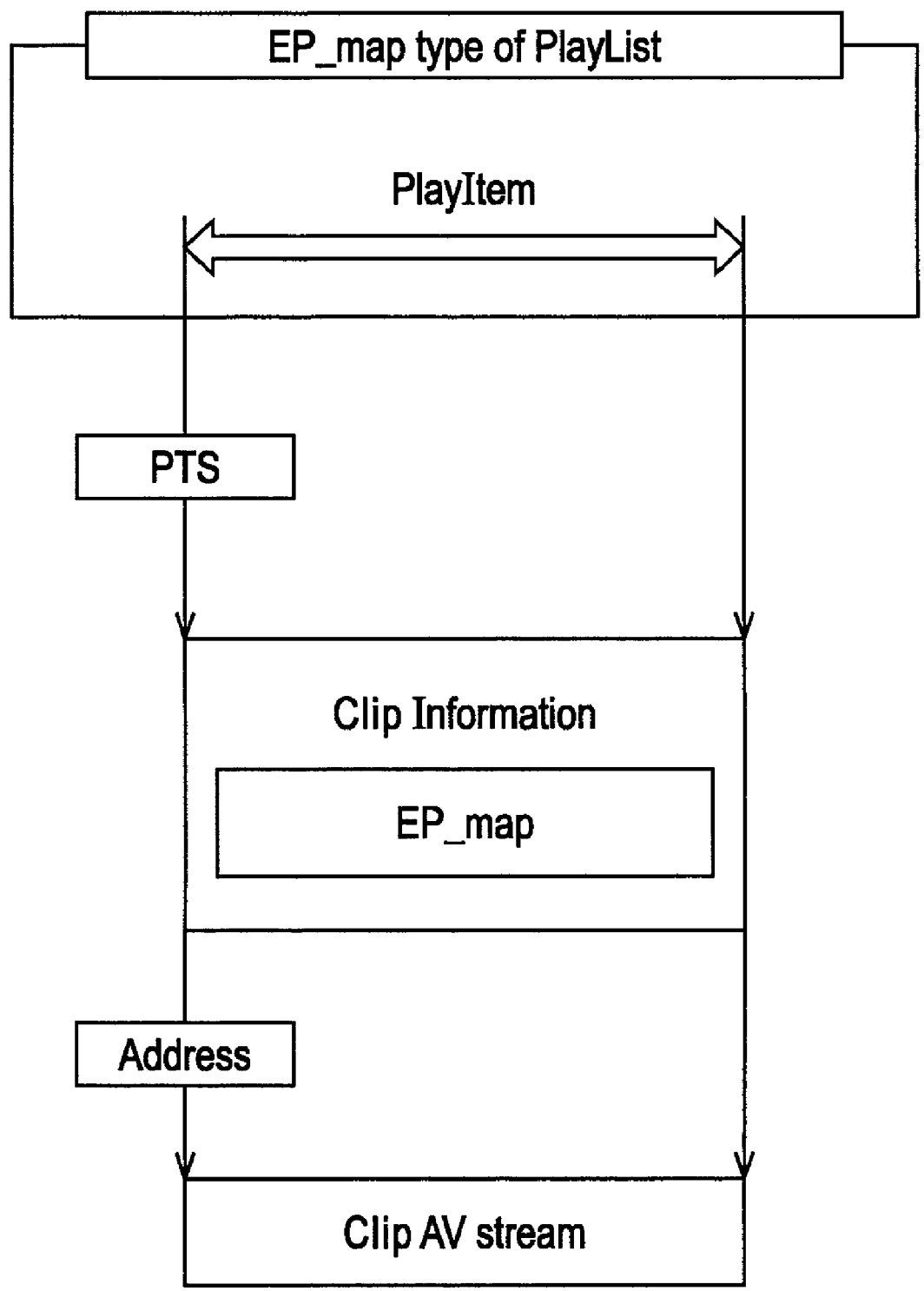
FIG. 25 is a diagram describing a relation between an EP_map and a Clip AV stream.

FIG. 25 is a diagram describing the relation between an EP_map and a Clip AV stream.

An EP_map is a list of entry point (EP) data, which is data extracted from an elementary stream and a transport stream. This has address information for finding the place of an entry point from which decoding should be started of an AV stream. One piece of EP data is made up of a pair of a presentation time stamp (PTS), and the data address of the AV stream of the access unit corresponding to the PTS thereof.

An EP_map is principally employed for the sake of two objects. Firstly, an EP_map is employed for finding the data address of the AV stream of an access unit to be referred with a presentation time stamp of a PlayList. A case of random access playback also corresponds to this. Secondarily, an EP_map is employed for fast forward playback or fast reverse playback. When the recording apparatus 501 records an AV stream, or analyzes the syntax of an AV stream, an EP_map is created, and recorded in the disc.

As shown in FIG. 25, when an access point within a Clip is specified with a presentation time stamp (PTS), an EP_map is employed for finding address information from which decoding of a stream of a Clip AV stream file should be started. Thus, an EP_map is a table indicating an address corresponding to an IN point and an OUT point on the temporal axis shown with the above-mentioned PlayList, and is employed for converting a presentation time stamp (PTS) such as a PlayList or the like into an address corresponding thereto. That is to say, an EP_map is a table, whereby a presentation time stamp (PTS), and the source packet number of a Clip AV stream (the TS (Transport Stream) packet number of a transport stream) are correlated with each other.

According to this EP_map, the corresponding data can be selected and read out from a Clip AV stream. Also, an EP_map is employed in the case of performing random access. For example, in the event that a user inputs an operation to the operation input unit 522 to specify an access point within a Clip using a time stamp (PTS), the controller 521 obtains address information from which decoding of a stream within a Clip AV stream file should be started with reference to an EP_map, and controls the recording control unit 526 to perform random access based on this. Note that as for the types of EP_map, there are a video EP_map and an audio EP_map.

Figure 26:
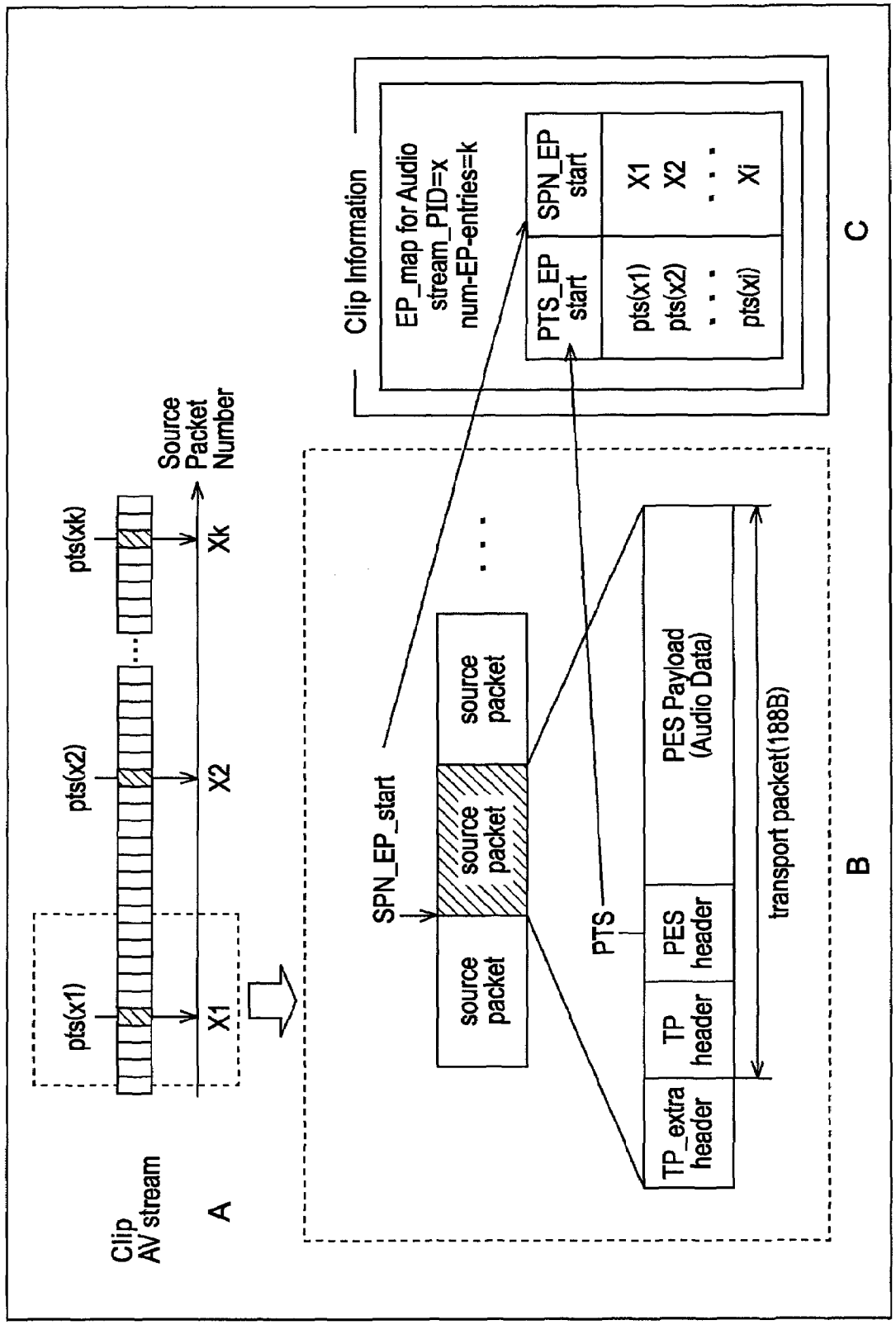
FIG. 26 is a diagram describing the configuration of an audio EP_map.

FIG. 26 is a diagram describing the configuration of an audio EP_map. Specifically, FIG. 26(A) is a diagram describing the position of a presentation time stamp (PTS) according to a Clip AV stream, FIG. 26(B) is a diagram enlarging and illustrating a part of the Clip AV stream shown in FIG. 26(A), and FIG. 26(C) is a diagram illustrating the data configuration of an audio EP_map.

An audio EP_map, as shown in FIG. 26(C), is a table in which the presentation time stamp (PTS) of a Clip AV stream (PTS_EP_start) and information indicating the source packet number (TS packet number) corresponding thereto (SPN_EP_start) are described.

Here, as for the expression of an address, a source packet number (SPN) can be employed. With the source packet numbers (SPN), a series of numbers are assigned to all the source packets in a Clip AV stream. With the source packet numbers SPN, let us say that of a Clip AV stream, the source packet number SPN of the first source packet is set to zero (SPN=0), the source packet number SPN of the next source packet is set to 1 (SPN=1), and so on, i.e., the source packet number SPN increases by one for each next packet. Accordingly, as for the SPN_EP_start of an audio EP_map, a source packet number (SPN) is described.

Next, description will be made with reference to FIG. 27 regarding an EP_map example generated based on the TS 190 (see FIG. 6 and FIG. 9) multiplexed and generated with the processing shown in FIG. 17 and FIG. 18.

Figure 27:
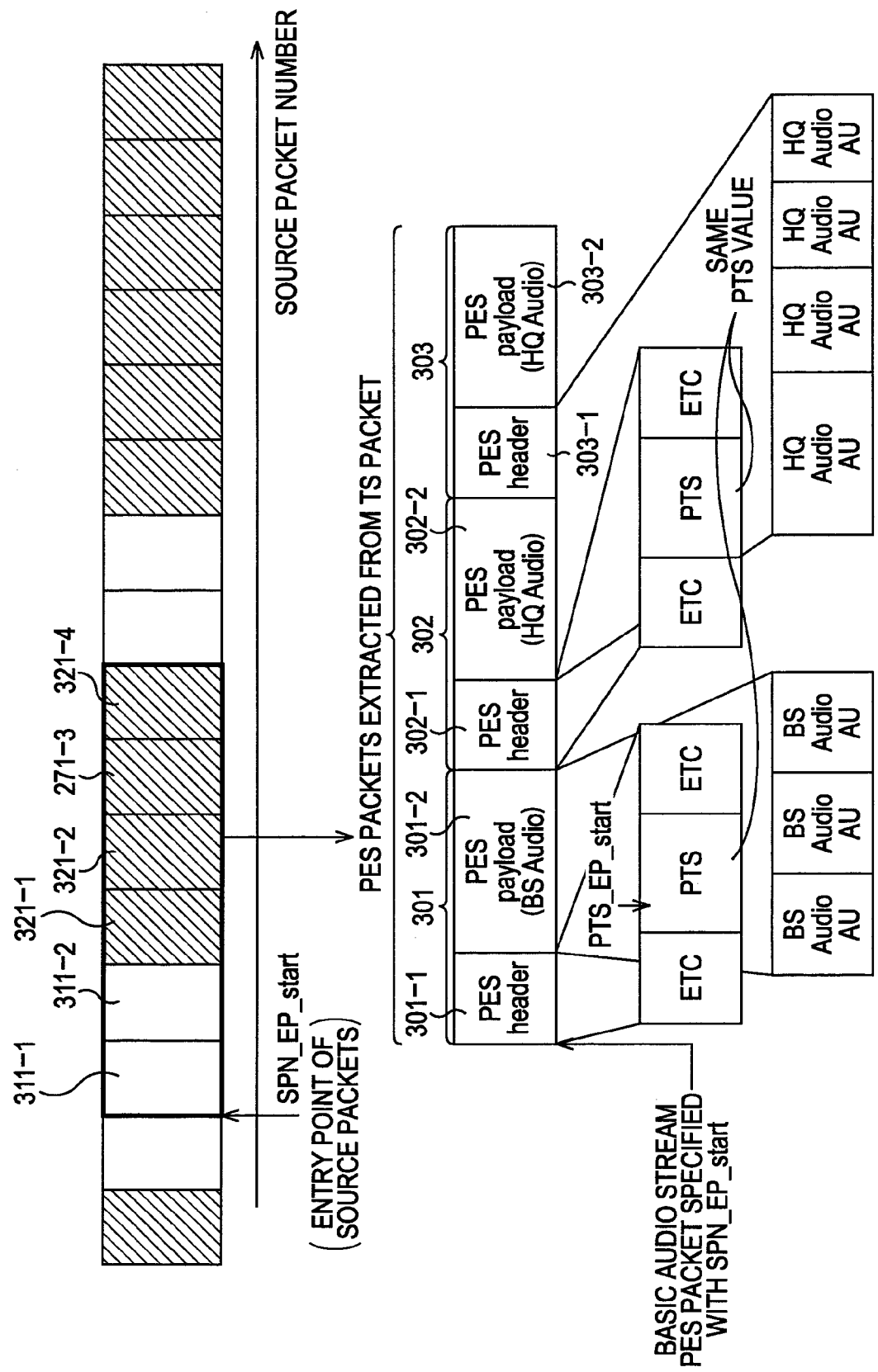
FIG. 27 is a diagram describing an EP_map in a case wherein a TS is configured of a BS audio ES and an HQ audio TS.

FIG. 27 illustrates an EP_map example of the TS 190 in the case of multiplexing the BS audio TS 173 and the HQ audio TS 183. That is to say, as for audio, the two types of audio ES of the BS audio TS 173 and the HQ audio TS 183 are included.

In the case of the example shown in FIG. 27, a Clip AV stream is made up of the TS packets of the BS audio ES and the HQ audio ES. At this time, in the event that an HQ audio TS packet having the same PTS value as the PTS value (of the PES packet) of a BS audio TS packet exists after the BS audio TS packet, the BS audio TS packet can become an entry point. At this time, in the event that multiplexing has been performed so as to satisfy the above-mentioned constraint shown in FIG. 22, with regard to the audio TS packets having the same PTS value, consequently the BS audio TS packet exists before the HQ audio TS packet.

The SPN_EP_start is information indicating the entry point of a source packet (TS packet), and in FIG. 27, the position of the BS audio TS packet 311-1 shown with the arrow of the SPN_EP_start is indicated with the SPN_EP_start. With the TS shown in FIG. 27, in the order from the TS packet shown in the SPN_EP_start, the BS audio TS packets 311-1 and 311-2, and the HQ audio TS packets 321-1 through 321-4 are disposed.

Now, the multiple TS packets stored in a Clip AV stream file include the multiple PES packets (Packetized Elementary Stream). Therefore, from the multiple TS packets (seven TS packets in the example shown in FIG. 27), as shown in FIG. 27, PES packets (in the example shown in FIG. 27, three PES packets) can be extracted. The PES packets shown in FIG. 27 are PES packets extracted from the multiple TS packets including the TS packet serving as the entry point of source packets. In more detail, let us say that the headmost data of the PES packets shown in FIG. 27 is included in the TS packet serving as the entry point of the source packets. In the case of this example, the PES packets extracted from the TS packets 311-1, 311-2, 321-1 through 321-4 including the TS packet serving as the entry point of the source packets are PES packets 301 through 303. The PES packets 301 through 303 are each made up of a PES header and a PES payload.

The PES packet 301 is obtained by subjecting the BS audio ES to PES packetizing, and the PES packets 302 and 303 are obtained by subjecting the HQ audio ES to PES packetizing. The PES packet 301 is made up of a PES header 301-1 and a PES payload 301-2, the PES packet 302 is made up of a PES header 302-1 and a PES payload 302-2, and the PES packet 303 is made up of a PES header 303-1 and a PES payload 303-2. At this time, the BS audio ES data is stored in the PES payload 301-2 of the PES packet 301, and the HQ audio ES data is stored in the PES payloads 302-2 and 303-2 of the PES packets 302 and 303.

Now, let us say that the PTS stored in the PES header 301-1 of the headmost PES packet 301 is PTS_EP_start (the PTS value of the PES packet). That is to say, let us say that SPN_EP_start is the source packet number of the TS packet 311-1 including the first byte of the PES packet 301 referred to by the PTS_EP_start.

The PES payload 301-2 of the PES packet 301 includes multiple audio access units (BS Audio AU) serving as the BS audio ES. In the case of the example shown in FIG. 27, the BS audio ES is encoded with a fixed-length encoding method (first encoding method), so the size of each audio access unit is fixed. The PES payload 302-2 of the PES packet 302 includes multiple audio access units (HQ Audio AU) serving as the HQ audio ES. In the case of the example shown in FIG. 31, the HQ audio ES is encoded with a variable-length encoding method (second encoding method), so the size of each audio access unit is variable. Now, let us say that the PTS value included in the PES header 302-1 of the PES packet 302 (the PTS value obtained from the BS audio TS packet 311-1 indicated with PTS_EP_start), and the PTS value included in the PES header 301-1 of the PES packet 301 are the same. The PES payload 303-2 of the PES packet 303 includes multiple audio access units serving as the HQ audio ES. In the case of the example shown in FIG. 27, the HQ audio ES is encoded with a variable-length encoding method, so the size of each audio access unit is variable.

Thus, the PTS_EP_start represents the PTS value of the PES packet, and the SPN_EP_start is the source packet number of the TS packet 311-1 including the first byte of the PES packet 301 referred to by the PTS_EP_start.

Next, description will be made with reference to the flowchart shown in FIG. 28 regarding processing arranged to create and record a Clip information file relating to a Clip AV stream file recorded in the optical disc 511. This processing is started, for example, by the sending apparatus 111 shown in FIG. 4 in a state in which a Clip AV stream file is recorded in the optical disc 511. That is to say, this processing is started in a state wherein the recording apparatus 501 shown in FIG. 23 is mounted with the optical disc 511 in which a Clip AV stream file into which the TS made up of the BS audio TS packets and the HQ audio TS packets (TS satisfying the above-mentioned constraints) was converted is recorded.

In step S311, the recording control unit 526 reads out the Clip AV stream file recorded in the optical disc 511, and supplies this to the controller 521. The readout Clip AV stream file is a file into which the MPEG2-TS multiplexed and generated as a result of processing in FIG. 17 through FIG. 22 was converted.

In step S312, the controller 521 creates ClipInfo regarding the Clip AV stream file. ClipInfo( ) is information arranged to store the attribute information of the AV stream file (Clip AV stream) corresponding thereto.

In step S313, the controller 521 creates SequenceInfo regarding the Clip AV stream file.

In step S314, the controller 521 creates ProgramInfo regarding the Clip AV stream file.

In step S315, the controller 521 creates CPI (EP_map) regarding the Clip AV stream file. Specifically, the controller 521 cerates an EP_map included in the CPI( ) of the Clip information file. Note that the details of this processing will be described with reference to FIG. 29.

In step S316, the controller 521 creates ClipMark regarding the Clip AV stream file.

In step S317, the controller 521 records a Clip information file in which the ClipInfo( ), SequenceInfo( ), ProgramInfo( ), CPI( ), and ClipMark( ) are stored.

Figure 28:
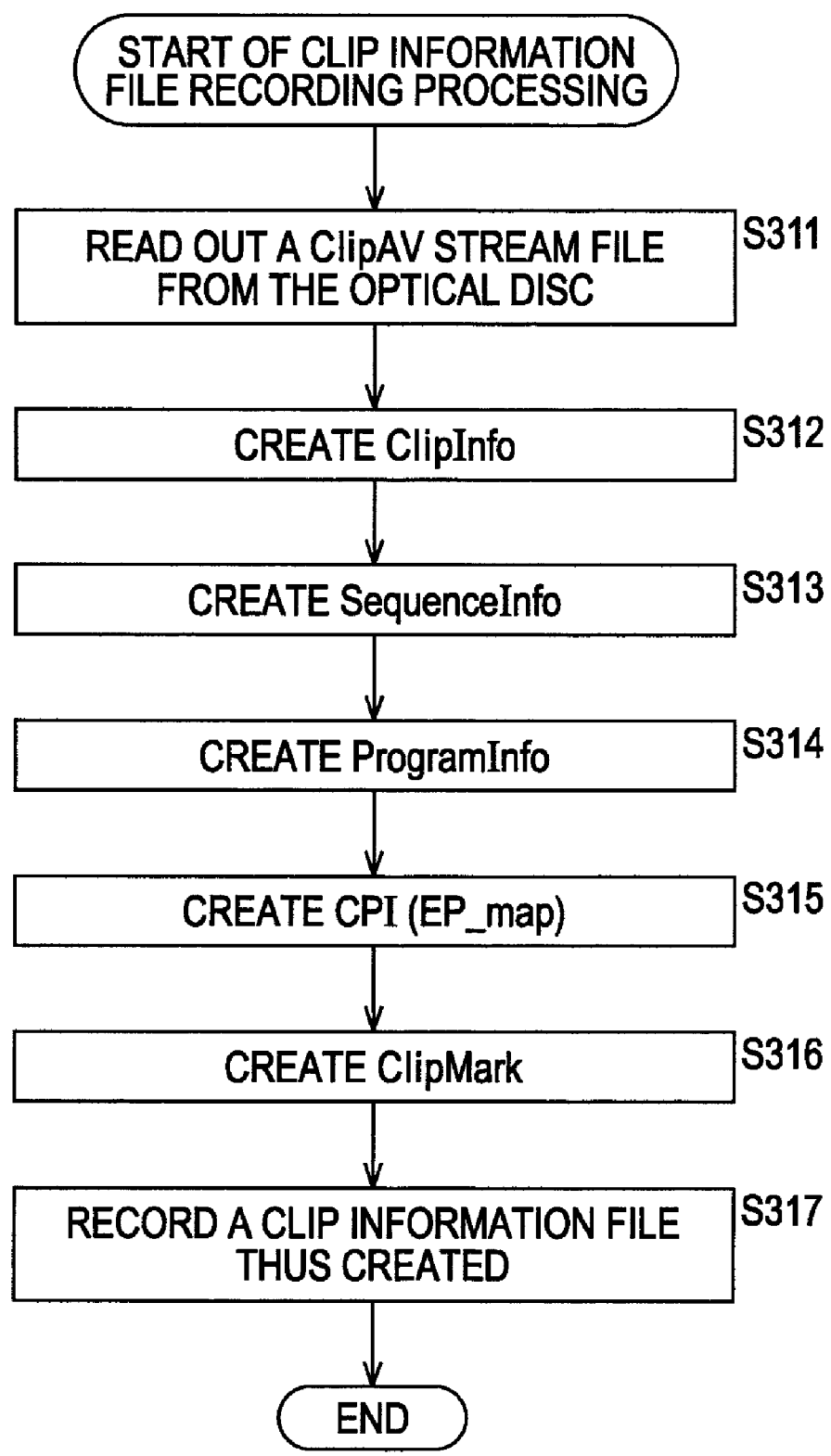
FIG. 28 is a flowchart describing the recording processing of a clip information file.

According to the processing shown in FIG. 28, a Clip information file can be created and recorded based on a Clip AV stream file.

Note that in FIG. 28 each processing has been described in time-series order, but the processing in step S312 through step S316 actually operates concurrently.

Next, description will be made with reference to the flowchart shown in FIG. 29 regarding the details of processing arranged to create an EP_map in step S315 shown in FIG. 32. Note that this processing is started in a state wherein the recording apparatus 501 shown in FIG. 1 is mounted with the optical disc 511 in which the TS 190 such as described with reference to FIG. 6, FIG. 9, or FIG. 27 is recorded. That is to say, this processing is started in state wherein the recording medium 501 is mounted with the optical disc 511 in which the TS 190 made up of the BS audio ES and the HQ audio ES is recorded.

In step S351, the recording control unit 526 reads out a Clip information file recorded in the optical disc 511, and accepts input of the TS 190 made up of the BS audio ES and the HQ audio ES. The TS, as described above, has a configuration shown in FIG. 6, FIG. 9, and FIG. 27, and is made up of the TS packets of the HQ audio ES and the TS packets of the HQ audio ES. The TS of which the input is accepted is made up of multiple TS packets, so these TS packets are sequentially supplied to the controller 521.

In step S352, the controller 521 obtains the TS packet supplied from the recording control unit 526, and determines whether or not this TS packet is the TS packet of the BS audio ES. The TS packet, as shown in FIG. 27, is the BS audio TS packet 311-1 (the TS packet of the BS audio ES), or the HQ audio TS packet 321-1 (the TS packet of the HQ audio ES), so the controller 521 determines whether or not the obtained TS packet is the TS packet of the BS audio ES. The header of each TS packet is added with a transport_priority flag (tp flag) arranged to identify whether the TS packet thereof is the TS packet of the BS audio ES or the TS packet of the HQ audio ES, so the controller 521 determines this based on the tp flag added to the header of the TS packet. For example, when the tp flag is 1, the controller 521 determines that the TS packet thereof is the TS packet of the BS audio ES.

In step S352, in the event that determination is made that the TS packet thereof is not the TS packet of the BS audio ES, the processing returns to step S352, where the subsequent processing is repeated. That is to say, in the event of the TS packet of the BS audio ES, the processing in step S352 and on is executed.

In step S352, in the event that determination is made that the TS packet thereof is the TS packet of the BS audio ES, the processing proceeds to step S353, where the controller 521 obtains the PTS value of the PES packet from the payload of the TS packet. Now, a TS packet is made up of a TS header and a TS payload, and the data of a PES packet is stored in the TS payload. Therefore, for example, the TS payload of the TS packet 311-1 shown in FIG. 27 includes the PES header 301-1, so the controller 521 obtains the PTS value stored in the PES header 301-1. For example, the controller 521 obtains PTS#L as a PTS value.

Note that one PES packet is made up of multiple TS packets, so the TS packet to be processed includes no PES header in some cases. Therefore, for example, in the event that the payload of the TS packet includes no PES header but a PES payload alone, the processing returns to step S352, the next TS packet is obtained, and the subsequent processing thereof is repeated.

In step S354, the controller 521 determines whether or not the TS packet including the PES packet of the HQ audio ES having the same PTS value as the obtained PTS (e.g., PTS#1) exists after the TS, and also the headmost access unit includes a header of the detailed information (detailed information 276 shown in FIG. 11). First, the controller 521, for example, determines whether or not the TS packet including the PES packet of the HQ audio ES having the same PTS value as the PTS#1 obtained at the processing in step S353 exists after the TS (i.e., with the TS, after the TS packet obtained at the processing in step S352). In other words, the controller 521 determines whether or not the TS packet of the HQ audio ES having the PTS#1 exists at a position in the TS after the TS packet of the BS audio ES where the PTS#1 was obtained. Subsequently, next, in the event of the above-mentioned determination result is positive (YES) (in the event that the TS packet of the HQ audio ES having the PTS#1 exists at a position in the TS after the TS packet of the BS audio ES where the PTS#1 was obtained), the controller 521 further determines whether or not the PES payload 302-2 (in more detail, the header of the PES payload 302-2) of the HQ audio TS packet having the PTS #1 thereof includes the detailed information (the detailed information 276 shown in FIG. 11). That is to say, the controller 521 determines whether or not the above-mentioned placement described with FIG. 12 is satisfied, and further the PES payload extracted from the HQ audio TS packet having the same PTS includes the detailed information 276 (FIG. 11). Note that multiplexing and PES packetizing are performed so as to satisfy the above-mentioned constraints for this reason.

In the event that determination is made in step S354 that no TS packet including the PES packet of the HQ audio ES having the same PTS value as the obtained PTS (e.g., PTS#1) exists after the TS, or in the event that determination is made that the headmost access unit includes no header of the detailed information 276, the processing returns to step S352, where the subsequent processing and on is repeated. That is to say, in the event that both these two conditions are not satisfied (in the case of YES), the processing proceeds to step S355.

In the event that determination is made in step S354 that the TS packet including the PES packet of the HQ audio ES having the same PTS value as the obtained PTS (e.g., PTS#1) exists after the TS, and also the headmost access unit includes a header of the detailed information, in step S355 the controller 521 takes the current TS packet as an entry point. For example, the controller 521 takes the TS packet 311-1 shown in FIG. 27 as an entry point. That is to say, in the event of the PTS value being matched, and also in the event that a BS audio TS packet having the matched PTS is disposed after an HQ audio TS packet having the matched PTS, and also the PES payload obtained from the HQ audio TS packet includes the detailed information 276, the BS audio TS packet thereof is taken as an entry point.

Thus, the detailed information is included in the HQ audio TS packet having the same PTS as the PTS serving as an entry point, whereby the detailed information can be obtained smoothly in the case of playing HQ audio, and consequently, playback can be performed rapidly.

In step S356, the controller 521 creates an EP_map based on the PIDs of the BS audio ES and the HQ audio ES, the number of the TS packet, and the PTS value obtained in the processing in step S353. Now, let us say that a PID, as described above, is added when performing TS packetizing, and the PIDs of the BS audio ES and the HQ audio ES are the same (e.g., PID=a0). Therefore, for example, the controller 521 creates an EP_map based on PID=a0, the number of the TS packet (the source packet number of the BS audio TS packet 311-1 shown in FIG. 27), and the PTS#1.

In step S357, the controller 521 determines whether or not the TS packet currently being processed is the last TS packet. In the event that the TS packet currently being processed is not the last TS packet, i.e., in the event that determination is made that there is a TS packet which has not been processed, the processing returns to step S352, where the subsequent processing and on is repeated. That is to say, the processing is repeated until the last TS packet is processed. In the event that determination is made in step S357 that the TS packet currently being processed is the last TS packet, the processing ends.

Figure 29:
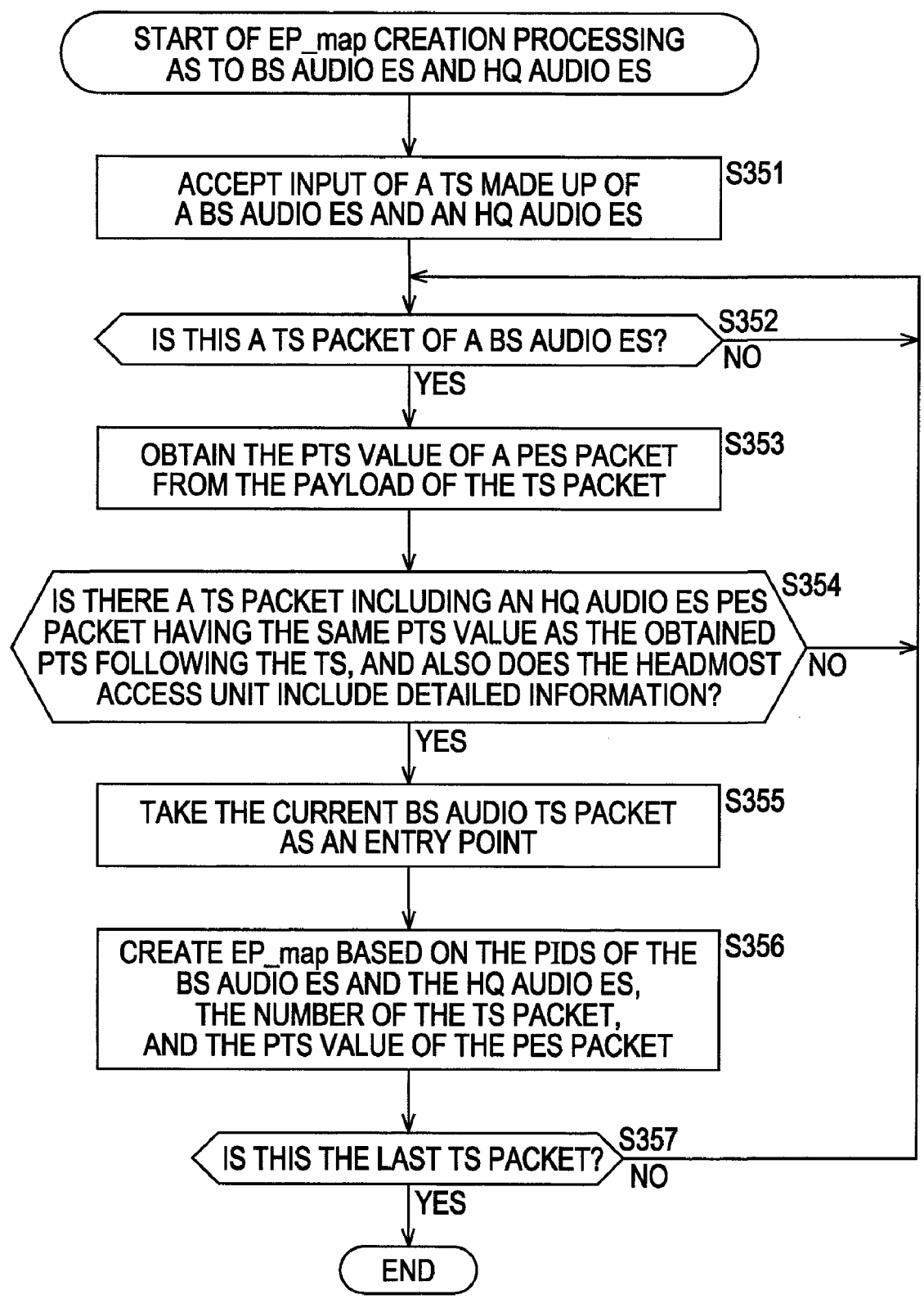
FIG. 29 is a flowchart describing processing for creating an EP_map as to a BS audio ES and an HQ audio ES.

An EP_map can be generated by the processing shown in FIG. 29.

Next, description will be made regarding a case of playing the Clip AV stream file recorded in the optical disc 511, and the Clip information file (Clip) recorded in the optical disc 511 by the processing shown in FIG. 28. FIG. 30 is a block diagram illustrating a configuration example of the playback apparatus 641 configured to play the data recorded in the optical disc 511.

A controller 651 controls the overall operations of a playback apparatus 641, based on a user's operation input through an operation input unit 652, by executing a control program prepared beforehand, or controlling a playback control unit 654 to read out a control program recorded in the optical disc 511, render this in memory 653, and execute this. For example, the controller 651 can display a predetermined menu screen on an external display device when the optical disc 311 is mounted.

The operation input unit 652 is made up of an input device, for example, such as buttons, keys, a touch panel, a jog dial, a mouse and so forth, and a receiving unit configured to receive signals such as infrared rays sent from a predetermined remote commander, and obtains a user's operation input to supply this to the controller 651.

The memory 653 stores data necessary for the controller 651 executing various types of processing as appropriate.

The playback control unit 654 reads out data from the optical disc 511, and outputs this to a buffer 655 to supply the readout data to the controller 651, memory 653, or an AV decoder 656 in accordance with the control by the controller 651. In the event that information read out from the optical disc 511 is a control program, control information, or a Clip information file (EP_map), or the like, the information read out by the playback control unit 654 is output to the controller 651 or memory 653. In the event that the information read out from the optical disc 511 is AV data such as an AV stream file or the like, the information read out by the playback control unit 654 is output to the buffer 655 to supply this to the AV decoder 656.

The buffer 655 temporarily buffers AV data such as an AV stream or the like read out from the optical disc 511 by the playback control unit 654, and supplies this to the AV decoder 656. Note that the AV stream is actually made up of the TS 190, so the controller 651 obtains a PES from the TS, and further obtains an ES. A BS audio ES, HQ audio ES, and video ES are included in this ES.

The AV decoder 656 decodes AV data such as the AV stream or the like supplied from the playback control unit 654, and outputs the obtained video signal and audio signal to an external display device. Specifically, an encoded BS audio ES, HQ audio ES, and video ES are included in this AV stream.

Figure 31:
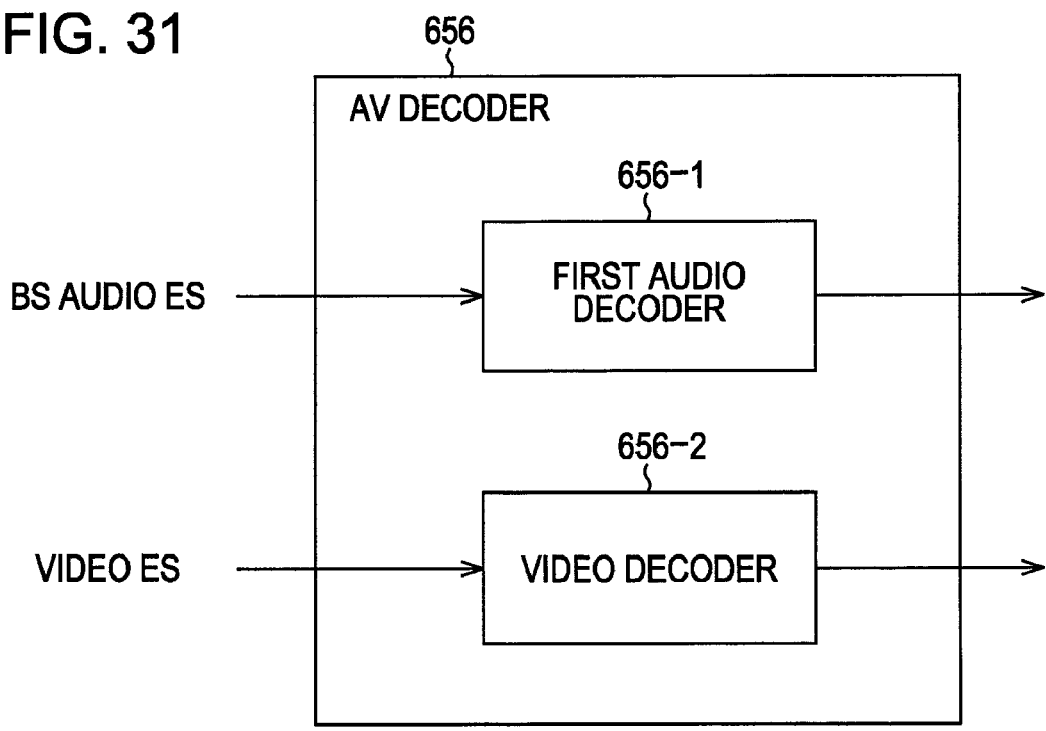
FIG. 31 is a block diagram illustrating a configuration example of the AV decoder shown in FIG. 30.
Figure 32:
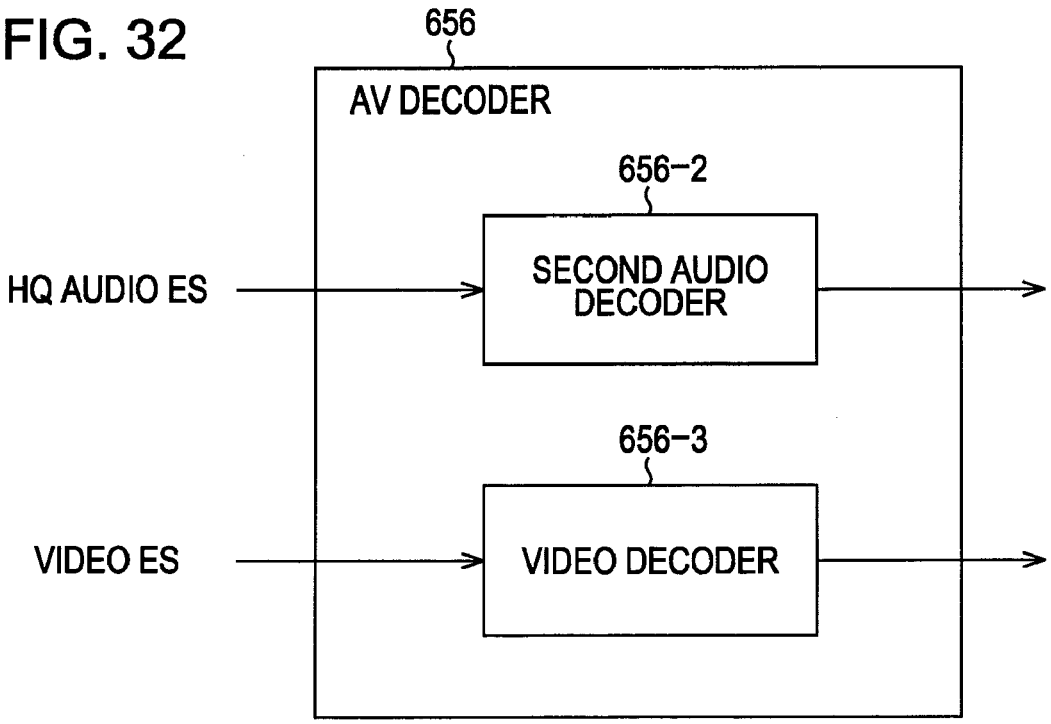
FIG. 32 is a block diagram illustrating another configuration example of the AV decoder shown in FIG. 30.

The AV decoder 656 is, for example, as shown in FIG. 31, in the case of an AV decoder including a first audio decoder 656-1 configured to decode an audio ES encoded with the first encoding method, and a video decoder 656-3 configured to decode a video ES, or as shown in FIG. 32, in the case of an AV decoder including a second audio decoder 656-2 configured to decode an audio ES encoded with the second encoding method, and a video decoder 656-3 configured to decode a video ES.

That is to say, the AV decoder 656 shown in FIG. 31, as for audio, can decode a BS audio ES alone, but cannot decode an HQ audio ES. The AV decoder 656 shown in FIG. 32, as for audio, can decode an HQ audio ES. Note that the AV decoder 656 shown in FIG. 32 includes the second audio decoder 656-2 which has higher performance than the first audio decoder 656-1, so can of course decode a BS audio ES, but it is common for a decoder to play audio with higher performance, and accordingly, description will be made assuming that the AV decoder 656 shown in FIG. 32 can decodes an HQ audio ES.

Now, let us return to FIG. 30, where with a display device, output (display of a picture, output of audio) of contents recorded in the optical disc 511 is performed based on the data (video data and audio data) decoded by the decoder 656.

Also, the controller 651 is also connected with a drive 657 as necessary, and the drive 657 is mounted with a removable medium 658, for example, such as a magnetic disk (including a flexible disk), an optical disc (including CD-ROM (Compact Disk-Read Only Memory), and DVD), an magneto-optical disk (including MD (registered trademark) (Mini-Disk)) or semiconductor memory.

Next, description will be made regarding a method arranged to perform special playback using an EP_map created by the processing shown in FIG. 29 (created and recorded by the processing in step S315 shown in FIG. 28). An EP_map is useful for performing random access playback.

Of transport streams of digital broadcasting, audio PIDs sometimes change, so it is necessary for an AV decoder (the AV decoder 656 of the playback apparatus 641 shown in FIG. 30) to know the PID mapping of the recorded transport streams. Therefore, an EP_map has an audio PID value for each sub table called EP_map_for_one_stream_PID( ) referred thereto, and also the ProgramInfo has information regarding the PID mapping.

Figure 33:
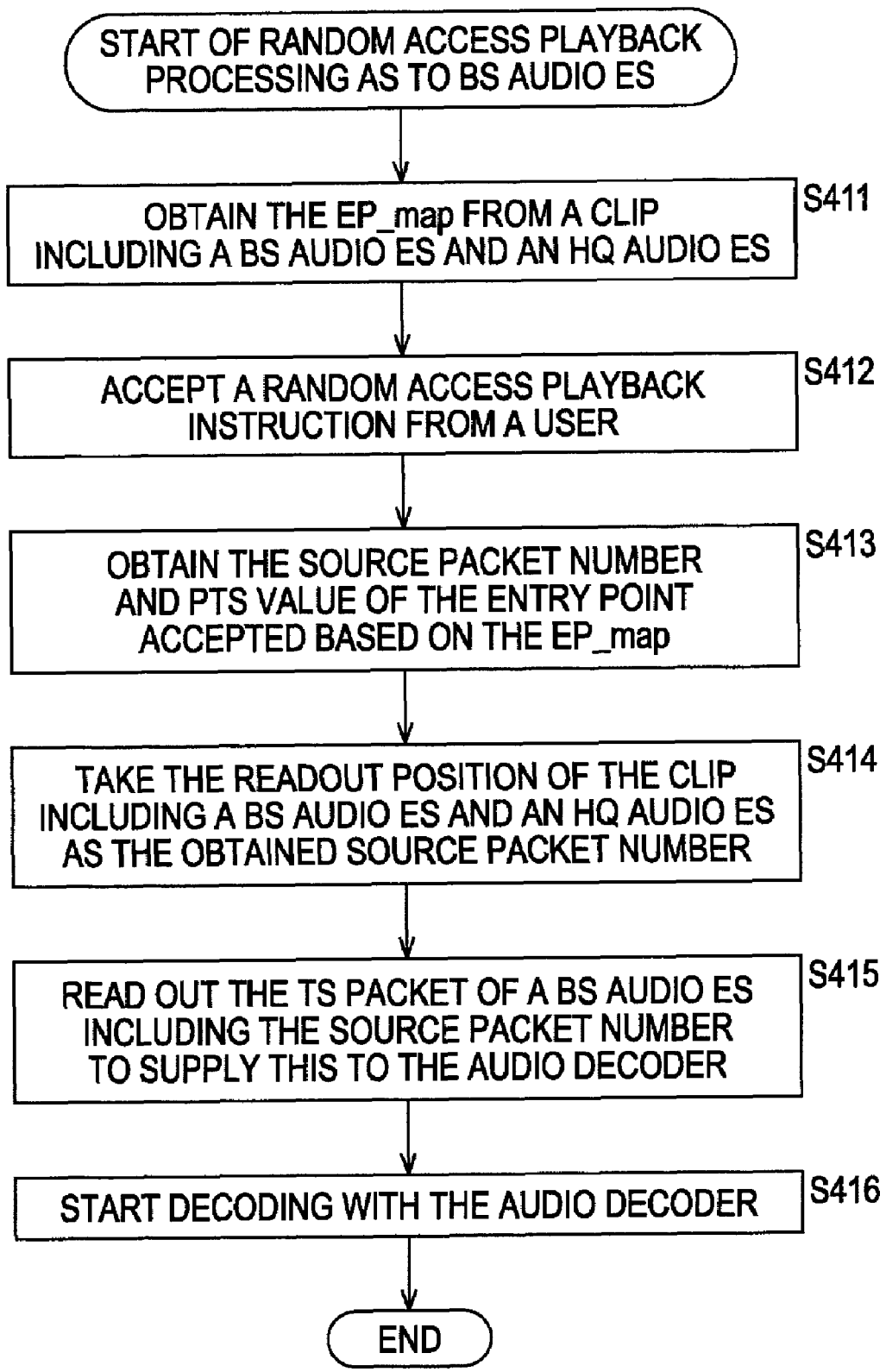
FIG. 33 is a flowchart describing random access playback processing as to a BS audio ES.

FIG. 33 is a flowchart describing random access playback processing as to a BS audio ES. This processing is, for example, processing to be executed in the case of the playback apparatus 641 shown in FIG. 30 including the AV decoder 656 shown in FIG. 31 playing a BS audio ES from the Clip (Clip AV stream file a Clip information file) recorded in the optical disc 511 by the above-mentioned processing. That is to say, this processing is executed in a case wherein the playback apparatus 641 can handle a BS audio ES and a video ES alone (a case wherein the playback apparatus 641 cannot handle an HQ audio ES), and also in a case of performing the random access playback of a BS audio ES. Also, this processing is processing arranged to perform random access playback, i.e., start playback not from the top of the Clip AV stream file recorded in the optical disc 511, but from the playback position instructed by the user. Note that this processing is started when the optical disc 511 in which the Clip is recorded is mounted on the playback apparatus 641 shown in FIG. 30 (playback apparatus including the AV decoder 656 shown in FIG. 31).

In step S411, the playback control unit 654 obtains an EP_map (e.g., EP_map created in the processing shown in FIG. 29) from the Clip including the BS audio ES and the HQ audio ES recorded in the optical disc 511 based on the control from the controller 651. The playback control unit 654 supplies the obtained EP_map to the controller 651.

In step S412, the operation input unit 652 accepts a random access playback instruction from the user. The operation input unit 652 supplies the signal corresponding to the received instruction to the controller 651. For example, the user instructs a playback position (entry point) with point-in-time (playback point-in-time on this AV stream) as a random access playback instruction, so the operation input unit 652 supplies the signal corresponding to the point-in-time of the accepted entry point to the controller 651. The entry point is, as described with FIG. 29, set as to the predetermined BS audio TS packet. The controller 651 performs a predetermined calculation based on the signal corresponding to the point-in-time supplied from the operation input unit 652, and obtains a PTS. That is to say, the controller 651 can convert the point-in-time (point-in-time on this AV stream) specified by the user into a PTS.

In step S413, the controller 651 obtains the source packet number and PTS value of the accepted entry point based on the obtained EP_map. For example, in FIG. 27, in the event that the position (point-in-time) indicated with the SPN_EP_start is accepted as an entry point, the controller 651 obtains SPN#1 that is the SPN_EP_start (i.e., the number of the BS audio TS packet 311-1) as the source packet number of the entry point, and also obtains PTS#L as the PTS value (PTS_EP_start) stored in the PES header of the PES packet extracted from the TS packet (the portion of the TS payload of the TS packet) including the BS audio TS packet 311-1.

In step S414, the controller 651 takes the readout position of the Clip including the BS audio ES and the HQ audio ES as the obtained source packet number. For example, the controller 651 takes the obtained source packet number SPN#1 (SPN_EP_start) as the readout position of the Clip of the optical disc 511. At this time, an entry point can be set as to a BS audio TS packet alone as described with FIG. 29, so the readout position of the optical disc 511 is set as to the BS audio TS packet.

In step S415, the playback control unit 654 reads out the TS packet of the BS audio ES having the source packet number thereof based on the control from the controller 651, and supplies this to the first audio decoder 656-1. For example, the playback control unit 654 reads out the TS packet of the BS audio ES having the source packet number SPN#1, and supplies this to the first audio decoder 656-1 shown in FIG. 31.

In step S416, the first audio decoder 656-1 starts decoding from the TS packet of the supplied BS audio ES. That is to say, playback is started from the BS audio TS packet 311-1 (FIG. 27) having the source packet number SPN#L. The first audio decoder 656-1 having a configuration such as FIG. 31 can decode a BS audio ES, so the TS packets of the BS audio ES are sequentially read out, decoded and output. Playback of the subsequent TS packets is the same as common playback, so the detailed description thereof will be omitted, but only the BS audio TS packets are sequentially picked up, and decoded.

According to the processing shown in FIG. 33, the playback apparatus 641 (FIG. 30) including the AV decoder 656 shown in FIG. 31, which can handle a BS audio ES, can perform the random access playback of a BS audio ES based on a random access playback instruction from the user with reference to the EP_map.

Next, random access playback processing as to an HQ audio ES will be described with reference to the flowchart shown in FIG. 34. This processing is processing to be executed in the case of the playback apparatus 641 shown in FIG. 30 including the AV decoder 656 shown in FIG. 32 playing the HQ audio ES from the Clip (Clip AV stream file and Clip information file) recorded in the optical disc 511 by the above-mentioned processing. That is to say, this processing is processing to be executed in the case of the playback apparatus 641 being capable of handling an HQ audio ES and a video ES, and also in the case of performing the random access playback of an HQ audio ES. Also, this processing is processing arranged to perform random access playback, i.e., start playback not from the top of the Clip AV stream file recorded in the optical disc 511, but from the playback position instructed by the user. Note that this processing is started when the optical disc 511 in which the Clip is recorded is mounted on the playback apparatus 641 shown in FIG. 30 (playback apparatus including the AV decoder 656 shown in FIG. 32).

In step S451, the playback control unit 654 obtains an EP_map (e.g., EP_map created in the processing shown in FIG. 29) from the Clip including the BS audio ES and the HQ audio ES recorded in the optical disc 511 based on the control from the controller 651. The playback control unit 654 supplies the obtained EP_map to the controller 651.

In step S452, the operation input unit 652 accepts a random access playback instruction from the user. The operation input unit 652 supplies the signal corresponding to the received instruction to the controller 651. For example, the user instructs a playback position (entry point) with point-in-time as a random access playback instruction, so the operation input unit 652 supplies the signal corresponding to the point-in-time of the accepted entry point to the controller 651. The entry point is, as described with FIG. 29, set as to the predetermined BS audio TS packet. That is to say, the playback apparatus 641 including the AV decoder 656 shown in FIG. 32 can handle an HQ audio ES, so for example, in the case of the example shown in FIG. 27, playback from the HQ audio TS packet 321-1 is requested, but obtained here is the entry point which is the BS audio TS packet 311-1. Therefore, with the subsequent processing, it is necessary to set a readout position as to the most appropriate HQ audio TS packet. Note that the user can specify time (playback time) converted from a PTS as the playback position of random access.

In step S453, the controller 651 obtains the source packet number and PTS value of the accepted entry point based on the obtained EP_map. For example, in FIG. 27, in the event that the position (point-in-time) indicated with the SPN_EP_start is accepted as an entry point, the controller 651 obtains SPN#1 that is the SP_EP_start (i.e., the number of the BS audio TS packet 311-1) as the source packet number of the entry point, and also obtains PTS#1 as the PTS value (PTS_EP_start) stored in the PES header of the PES packet extracted from the TS packet (the portion of the TS payload of the TS packet) including the BS audio TS packet 311-1.

In step S454, the controller 651 takes the readout position of the Clip including the BS audio ES and the HQ audio ES as the obtained source packet number. For example, the controller 651 takes the obtained source packet number SPN#L (SPN_EP_start) as the readout position of the Clip of the optical disc 511. At this time, an entry point can be set as to a BS audio TS packet alone as described with FIG. 29, so the readout position of the optical disc 511 is set as to the BS audio TS packet.

In step S455, the playback control unit 654 reads out the optical disc 511 from the current readout position based on the control from the controller 651, and obtains the HQ audio TS packet recorded first after the readout position (after as recording time). For example, in the example shown in FIG. 27, in the event of the readout position being set to the BS audio TS packet 311-1, the playback control unit 654 obtains the HQ audio TS packet 321-1 of which the source packet number is after the BS audio TS packet 311-1 (SPN#1), which is the first HQ audio TS packet. The playback control unit 654 supplies the obtained HQ audio TS packet 321-1 to the controller 651.

In step S456, the controller 651 determines whether or not the PTS value of the PTS header included in the TS payload of the obtained HQ audio TS packet is identical to the obtained PTS value. In the case of the example shown in FIG. 27, the controller 651 determines whether or not the PTS value of the PTS header 302-1 included in the TS payload of the obtained HQ audio TS packet 321-1 is identical to the PTS value (PTS#1) obtained at the processing in step S453. In the event that determination is made that the PTS value corresponding to the obtained HQ audio TS packet is not identical to the PTS value obtained at the processing in step S453, the processing returns to step S453, where the subsequent processing is repeated. For example, the HQ audio TS packet 321-2 (of which the source socket number is after) recorded at the position further after the HQ audio TS packet 321-1 read out now is obtained, and the determination in step S456 is made regarding the obtained HQ audio TS packet 321-2. Note that one PES packet is made up of multiple TS packets, so the HQ audio TS packet to be processed may include no PES header in some cases. Therefore, for example, in the event that the payload of the HQ audio TS packet includes no PES header but a PES payload alone, the processing returns to step S455, where the next HQ audio TS packet is obtained, and the subsequent processing is repeated.

In the event that determination is made in step S456 that the PTS value corresponding to the obtained HQ audio TS packet is identical to the PTS value obtained at the processing in step S453, the controller 651 takes the HQ audio TS packet thereof as a new readout position. Subsequently, the processing proceeds to step S457, where the playback control unit 654 reads out the HQ audio TS packet of which the PTS value has been determined to be identical to the PTS value obtained at the processing in step S453 based on the control from the controller 651, and supplies this to the second audio decoder 656-5 shown in FIG. 32. That is to say, in the event that the PTS value corresponding to the obtained HQ audio TS packet 321-1 is identical to the PTS value obtained at the processing in step S453, the BS audio TS packet 311-1 and the HQ audio TS packet 321-1 correspond to the same playback point-in-time. Therefore, the playback control unit 654 starts playback from the position of the HQ audio TS packet 321-1 of which the PTS value has been determined to be identical to the PTS value obtained at the processing in step S453.

In step S458, the second audio decoder 656-2 starts decoding from the supplied HQ audio TS packet 321-1. That is to say, playback is started from the HQ audio TS packet 321-1 having the same PTS#1 as the BS audio TS packet 311-1 (FIG. 27) serving as the entry point specified as the position to be played. The second audio decoder 656-2 having a configuration such as FIG. 32 can decode an HQ audio ES, so the TS packets of the HQ audio ES are sequentially read out, decoded and output. Playback of the subsequent TS packets is the same as common playback, so the detailed description thereof will be omitted, but only the HQ audio TS packets are sequentially picked up, and decoded.

As described with the processing in step S354 and step S355 in FIG. 29, an arrangement is made wherein an EP_map is created so as to include the detailed information 276 (FIG. 11), i.e., information indicating a decoding start position in the HQ audio TS packet having the same PTS as the BS audio TS packet serving as the entry point, so the second audio decoder 656-2 can decode from the supplied HQ audio TS packet, whereby playback can be performed rapidly. If the detailed information 276 is not included in the HQ audio TS packet thereof, it is necessary to search the HQ audio TS packet including the detailed information, and accordingly, rapid playback of an HQ audio ES cannot be performed, but with the present embodiment, in the event that the HQ audio TS packet having the same PTS value as the PTS of a BS audio TS packet includes the detailed information 276, the BS audio TS packet is taken as the entry point (processing in FIG. 29), whereby the HQ audio ES can be rapidly played.

Figure 34:
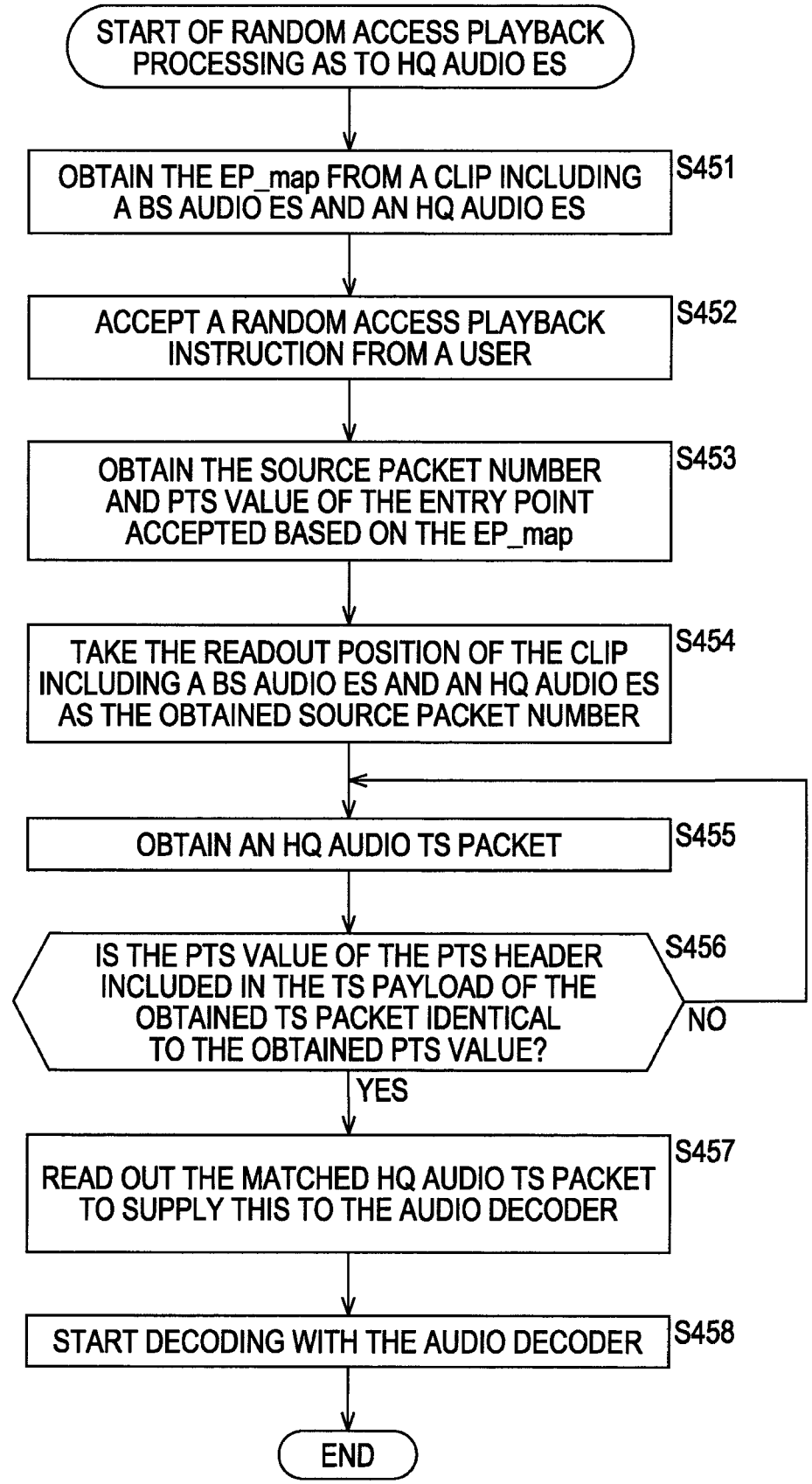
FIG. 34 is a flowchart describing random access playback processing as to an HQ audio ES.

According to the processing in FIG. 34, the playback apparatus 641 (FIG. 30) including the AV decoder 656 shown in FIG. 32, which can handle an HQ audio ES, can perform the random access playback of an HQ audio ES by referring to the EP_map based on the random access playback instruction from the user.

Thus, in the event of multiplexing BS audio TS packets and HQ audio TS packets, an arrangement is made wherein processing such as shown in FIG. 18 through FIG. 22 is executed, multiplexing is performed so as to satisfy the constraints at the time of PES packetizing, and the multiplexing constraints for random access, and with the optical disc 511 in which the Clip AV stream file generated with the above-mentioned processing is recorded, an EP_map is created by the processing described above with reference to FIG. 29, whereby random access playback can be performed based on the EP_map. That is to say, the multiplexing constraints for random access shown in FIG. 22 are multiplexing constraints arranged to create an EP_map shown in FIG. 29.

Also, in the event that audio data encoded with different encoding methods is subjected to TS packetizing, and multiplexing, and recorded in an optical disc, there is an HQ audio TS packet having the same PTS value as the PTS of the TS packet of one audio stream (the TS packet of a BS audio ES) that can be set as the entry point, with the TS, the HQ audio TS packet having the PTS value thereof is recorded so as to be disposed after the BS audio TS packet having the PTS value thereof, the BS audio TS packet thereof is set as the entry point, thereby creating an EP_map, so even in the event of playing the HQ audio ES corresponding to the position specified by the user, the HQ audio TS having the same PTS as the PTS of the BS audio TS packet serving as the entry point can be read out, whereby random access playback of the HQ audio ES can be performed.

Also, in the event that a BS audio TS packet and an HQ audio TS packet have the same PTS, and the HQ audio TS packet is disposed after the BS audio TS packet, and further the detailed information 276 (FIG. 11) is recorded in the HQ audio TS packet, an entry point is arranged to be set, and consequently, the detailed information 276 is always recorded in the HQ audio TS having the same PTS as the PTS of the BS audio TS packet serving as the entry point, and accordingly, the HQ audio ES can be rapidly played from the position thereof.

Note that in FIG. 33 and FIG. 34, description has been made regarding a case wherein the Clip recorded in the optical disc 511 (Clip AV stream file and Clip information file) is played using an audio EP_map (EP_map included in the recorded Clip thereof). Now, as for a case wherein an audio EP_map is used, for example, in addition to a case wherein a browser-able slide show is played, a case can be conceived wherein a video stream recorded in another first recording medium (not shown) beforehand, and an audio stream downloaded via a network or another second recording medium (second recording medium may be, for example, the optical disc 511 shown in FIG. 30) are played in a synchronized manner. In the event that a video stream recorded in another first recording medium beforehand, and an audio stream downloaded via a network or another second recording medium are played in a synchronized manner, a random access instruction from the user is accepted in step S412 and step S452, and with the processing in step S413 and step S453, first a video EP_map (video EP_map recorded in another first recording medium beforehand) is referenced, the entry point of the audio stream synchronized with the entry point of the video EP_map is obtained from the audio EP_map (EP_map corresponding to the downloaded audio), and next the source packet number and PTS of the entry point is obtained, as with the above-mentioned processing in step S413 and step S453.

Note that with the present embodiment, the recording apparatus 501 (FIG. 23) and the playback apparatus 641 (FIG. 30) have been described as separate apparatuses, but the present embodiment can be applied to a recording/playback apparatus into which those apparatuses are integrated. In this case, consequently the above-mentioned recording processing and playback processing are all executed by the recording/playback apparatus. Also, the sending apparatus 111 (FIG. 4) and the recording apparatus 501 (FIG. 23) may be integrated into one apparatus.

Thus, in the event that a BS audio ES and an HQ audio ES which were encoded with different encoding methods and generated are each subjected to TS packetizing, and multiplexed into one transport stream, TS packets to be multiplexed are arranged to be determined so as to satisfy the multiplexing constraints for random access, assuming the first virtual receiving apparatus 120 including the first virtual decoder (the virtual decoder 121 shown in FIG. 14 including the BS audio data decoding processing unit 360-1 shown in FIG. 15) which can handle a BS audio ES alone, and the second virtual receiving apparatus 120 including the second virtual decoder (the virtual decoder 121 shown in FIG. 14 including the HQ audio data decoding processing unit 360-2 shown in FIG. 15) which can handle an HQ audio ES, whereby decoding can be performed smoothly regardless of a receiving apparatus capable of handling a BS audio ES alone and a receiving apparatus capable of handling an HQ audio ES.

That is to say, the sending apparatus 111 regulates (determines) TS packets to be multiplexed while causing the transport buffer 362-1 to no overflow, and while causing the elementary buffer 363-1 to neither overflow nor underflow, of the first virtual receiving apparatus including the first virtual decoder, and also regulates (determines) TS packets to be multiplexed while causing the transport buffer 362-2 to no overflow, while causing the elementary buffer 363-2 to neither overflow nor underflow, while causing the FIFO buffer 391 to no underflow, of the second virtual receiving apparatus including the second virtual decoder, and further so as to satisfy the multiplexing constraints for random access, whereby decoding can be performed smoothly regardless of a receiving apparatus capable of handling a BS audio ES alone and a receiving apparatus capable of handling an HQ audio ES.

Also, in the event of subjecting an HQ audio ES to PES packetizing, it is unnecessary for the PES-packetizing unit 136 to calculate a DTS, whereby the PES packetizing processing can be further performed smoothly. Further, it is unnecessary for the PES-packetizing unit 136 to store a DTS value in a PES packet to be generated, whereby the data amount of PES packets can be suppressed. That is to say, the data amount of PES packets can be further reduced.

Note that the present invention is not restricted to the sending apparatus 111 shown in FIG. 4, and rather can be applied to all multiplexing apparatuses configured to multiplex the TS packets of an audio stream (audio ES).

Also, with the above-mentioned examples, description has been made regarding the order (timing) in the case of subjecting each of the BS audio ES encoded with the first encoder 141, and the HQ audio ES encoded with the second encoder 142 to TS packetizing, and multiplexing into one stream, but the present invention can be applied to another case as long as it is a case wherein an audio ES encoded with different encoding methods are each subjected to TS packetizing, and multiplexing into one stream.

The above-mentioned series of processing can be realized with not only hardware but also software. In this case, the above-mentioned processing is executed by a personal computer 700 such as shown in FIG. 35.

Figure 35:
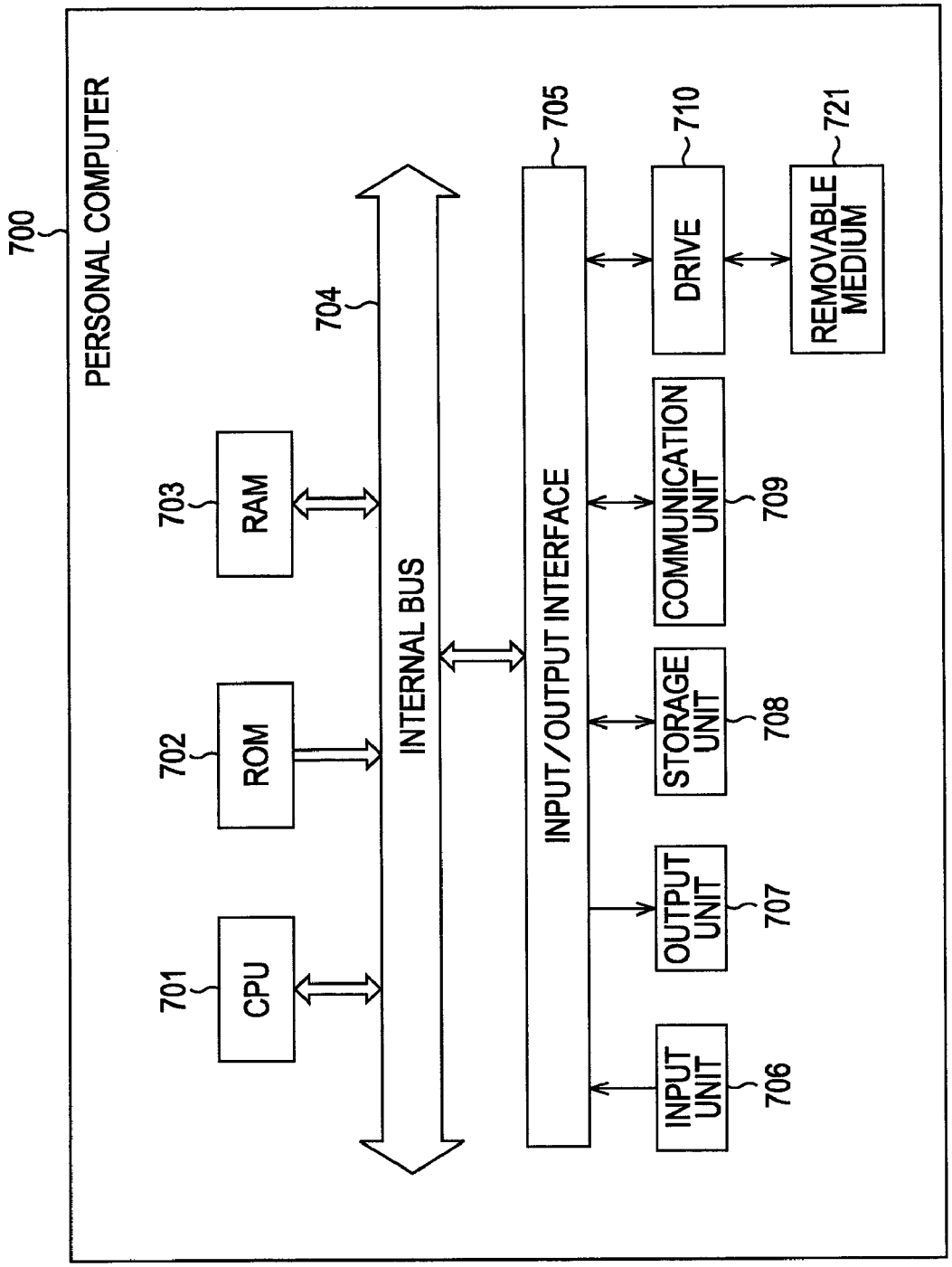
FIG. 35 is a diagram illustrating a configuration example of a personal computer.

In FIG. 35, a CPU 701 executes various types of processing in accordance with a program stored in ROM 702, or a program loaded to RAM 703 from a storage unit 708. The RAM 703 also stores data necessary for the CPU 701 executing various types of processing.

The CPU 701, ROM 702, and RAM 703 are mutually connected via an internal bus 704. This internal bus 704 is also connected with an input/output interface 705.

The input/output interface 705 is connected with an input unit 706 made up of a keyboard, mouse, and the like, a display made up of a CRT, LCD, or the like, an output unit 707 made up of speakers and the like, a storage unit 708 made up of a hard disk and the like, and a communication unit 709 made up of a modem, terminal adapter, or the like. The communication unit 709 performs communication processing via various types of network including a phone line and CATV.

The input/output interface 705 is connected with a drive 710 as necessary, on which a removable medium 721 made up of a magnetic disk, optical disc, magneto-optical disk, semiconductor memory, or the like is mounted as appropriate, and a computer program read out therefrom is installed into the storage unit 708 as necessary.

In the event of executing the series of processing using software, a program making up the software thereof is installed from a network or recording medium.

This recording medium is, as shown in FIG. 35, made up of not only a package medium made up of a removable medium in which the program is recorded, which is distributed to provide the program to a user apart from the computer, but also a hard disk or the like including the ROM 702 and storage unit 708 in which the program is recorded, which is provided a user in a state of being built in the apparatus main unit beforehand.

Note that with the present Specification, the steps describing the computer program include not only processing to be processed serially in accordance with the described order, but also processing to be executed in parallel or individually even if not necessarily processed serially.

The invention claimed is:

1. A multiplexer configured to multiplex audio data as TS (Transport Stream) packets, comprising:
   first encoding means configured to encode said audio data using a first encoding method serving as a predetermined encoding method;
   second encoding means configured to encode said audio data using a second encoding method, which is a variable-length encoding method, and also differs from said first encoding method, arranged to add a timing value representing timing employed for a case of being decoded;
   PES packetizing means configured to packetize said audio data encoded by said first encoding means, and said audio data encoded by said second encoding means to a PES packet, and also add point-in-time information employed for a case of being decoded;
   TS packetizing means configured to packetize said PES packet PES-packetized by said PES packetizing means to a TS packet, and also add a same ID to a plurality of said packetized TS packets;
   determining means configured to determine TS packets to be multiplexed from a plurality of said TS packets packetized by said TS packetizing means; and
   multiplexing means configured to multiplex said TS packets determined by said determining means;
   wherein said PES packetizing means packetize said audio data encoded by said first encoding means, and said audio data encoded by said second encoding means to a PES packet such that said audio data unit satisfying a predetermined cycle appears at the head of a PES payload;
   and wherein said determining means is configured to assume a first virtual decoder configured to decode said audio data encoded by said first encoding means, and a second virtual decoder configured to decode said audio data encoded by said second encoding means based on said timing value added to said audio data encoded by said second encoding means, and also determine TS packets to be multiplexed based on multiplexing constraints arranged to randomly access said multiplexed TS packets,
   the determination means determines a TS packet to be multiplexed from among the plurality of TS packets packetized by the TS packetization means on the basis of a first elementary buffer possessed by the first system target decoder and a rate at which data is transferred to the first elementary buffer and on the basis of a second elementary buffer possessed by the second system target decoder and a rate at which data is transferred to the second elementary buffer, and
   said multiplexing constraints are constraints in which in the event that a TS includes a TS packet of audio data encoded by said second encoding means having a same point-in-time information as said point-in-time information included in a TS packet of audio data encoded by said first encoding means, the TS packet of the audio data encoded by said first encoding means is multiplexed prior to the TS packet of the audio data encoded by said second encoding means;
   and wherein said determining means determine TS packets to be multiplexed based on said first virtual decoder and said second virtual decoder, and said multiplexing constraints.

2. The multiplexer according to claim 1, wherein said determining means determine TS packets to be multiplexed from a plurality of said TS packets packetized by said TS packetizing means while causing said first elementary buffer included in said first virtual decoder, and said second elementary buffer included in said second virtual decoder to neither overflow nor underflow.

3. The multiplexer according to claim 1, further comprising:
   recording means configured to record said TS packets multiplexed by said multiplexing means in a recording medium.

4. The multiplexer according to claim 1, wherein said audio data unit is an audio access unit.

5. The multiplexer according to claim 1, wherein said first virtual decoder includes a transport buffer at the previous stage of said first elementary buffer;
   and wherein said second virtual decoder includes a transport buffer at the previous stage of said second elementary buffer, and also includes a third elementary buffer at the subsequent stage of said second elementary buffer.

6. The multiplexer according to claim 5, wherein said determining means determine TS packets to be multiplexed from a plurality of said TS packets packetized by said TS packetizing means, assuming that input timing as to said third elementary buffer is timing as to said timing value.

7. The multiplexer according to claim 6, wherein said timing value is a value represented with a sampling cycle of audio information at which said audio stream unit is transmitted to said third elementary buffer.

8. The multiplexer according to claim 1, wherein in the event of subjecting said audio data encoded by said second encoding means to PES packetizing, said PES packetizing means packetize said audio data encoded by said second encoding means such that said audio data unit satisfying said cycle, and including decoding information to start decoding from that position appears at the head of a PES payload.

9. A multiplexing method of a multiplexer configured to multiplex audio data as TS (Transport Stream) packets, comprising:
   a first encoding step arranged to encode said audio data using a first encoding method serving as a predetermined encoding method;
   a second encoding step arranged to encode said audio data using a second encoding method, which is a variable-length encoding method, and also differs from said first encoding method, arranged to add a timing value representing timing employed for a case of being decoded;
   a PES packetizing step arranged to packetize said audio data encoded by the processing in said first encoding step, and said audio data encoded by the processing in said second encoding step to a PES packet, and also add point-in-time information employed for a case of being decoded;
   a TS packetizing step arranged to packetize said PES packet PES-packetized by the processing in said PES packetizing step to a TS packet, and also add a same ID to a plurality of said packetized TS packets;
   a determining step arranged to determine TS packets to be multiplexed from a plurality of said TS packets packetized by the processing in said TS packetizing step; and
   a multiplexing step arranged to multiplex said TS packets determined by the processing in said determining step;

wherein with the processing in said PES packetizing step, said audio data encoded by the processing in said first encoding step, and said audio data encoded by the processing in said second encoding step is packetized to a PES packet such that said audio data unit satisfying a predetermined cycle appears at the head of a PES payload;

and wherein the processing in said determining step is arranged to assume a first virtual decoder configured to decode said audio data encoded by the processing in said first encoding step, and a second virtual decoder configured to decode said audio data encoded by the processing in said second encoding step based on said timing value added to said audio data encoded by the processing in said second encoding step, and also determine TS packets to be multiplexed based on multiplexing constraints arranged to randomly access said multiplexed TS packets, wherein the determining step includes determining a TS packet to be multiplexed from among the plurality of TS packets packetized in the TS packetizing step on the basis of a first elementary buffer used in the first virtual decoder and a rate at which data is transferred to a first elementary buffer and on the basis of a second elementary buffer used by a second virtual decoder and a rate at which data is transferred to the second elementary buffer, said multiplexing constraints are constraints in which in the event that a TS includes a TS packet of audio data encoded in said second encoding step having a same point-in-time information as said point-in-time information included in a TS packet of audio data encoded in said first encoding step, the TS packet of the audio data encoded in said first encoding step is multiplexed prior to the TS packet of the audio data encoded by said second encoding step, and said determining step determines TS packets to be multiplexed based on said first virtual decoder and said second virtual decoder, and said multiplexing constraints.

10. A computer program product having computer readable instructions that when executed by a processor multiplex audio data as TS (Transport Stream) packets, and control a computer to execute processing including:

a first encoding step arranged to encode with the processor said audio data using a first encoding method serving as a predetermined encoding method;

a second encoding step arranged to encode said audio data using a second encoding method, which is a variable-length encoding method, and also differs from said first encoding method, arranged to add a timing value representing timing employed for a case of being decoded;

a PES packetizing step arranged to packetize said audio data encoded by the processing in said first encoding step, and said audio data encoded by the processing in said second encoding step to a PES packet, and also add point-in-time information employed for a case of being decoded;

a TS packetizing step arranged to packetize said PES packet PES-packetized by the processing in said PES packetizing step to a TS packet, and also add a same ID to a plurality of said packetized TS packets;

a determining step arranged to determine TS packets to be multiplexed from a plurality of said TS packets packetized by the processing in said TS packetizing step; and a multiplexing step arranged to multiplex said TS packets determined by the processing in said determining step;

wherein with the processing in said PES packetizing step, said audio data encoded by the processing in said first encoding step, and said audio data encoded by the processing in said second encoding step is packetized to a PES packet such that said audio data unit satisfying a predetermined cycle appears at the head of a PES payload;

and wherein the processing in said determining step is arranged to assume a first virtual decoder configured to decode said audio data encoded by the processing in said first encoding step, and a second virtual decoder configured to decode said audio data encoded by the processing in said second encoding step based on said timing value added to said audio data encoded by the processing in said second encoding step, and also determine TS packets to be multiplexed based on multiplexing constraints arranged to randomly access said multiplexed TS packets, wherein the determining step includes determining a TS packet to be multiplexed from among the plurality of TS packets packetized in the TS packetizing step on the basis of a first elementary buffer used in the first virtual decoder and a rate at which data is transferred to a first elementary buffer and on the basis of a second elementary buffer used by a second virtual decoder and a rate at which data is transferred to the second elementary buffer, said multiplexing constraints are constraints in which in the event that a TS includes a TS packet of audio data encoded in said second encoding step having a same point-in-time information as said point-in-time information included in a TS packet of audio data encoded in said first encoding step, the TS packet of the audio data encoded in said first encoding step is multiplexed prior to the TS packet of the audio data encoded by said second encoding step, and said determining step determines TS packets to be multiplexed based on said first virtual decoder and said second virtual decoder, and said multiplexing constraints.

11. A multiplexer to multiplex audio data as TS, transport stream, packets comprising:

a first encoder that encodes said audio data using a first encoding method serving as a predetermined decoding method;

a second encoder that encodes said audio data using a second encoding method, which is a variable-length encoding method, and also differs from said first encoding method, arranged to add a timing value representing timing employed for a case of being decoded;

a PES packetizer to packetize said audio data encoded by said first encoder, said audio data encoded by said second encoder to a PES packet, and also adds point-in-time information employed for a case of being decoded;

a TS packetizer to packetize said PES packetizer to a TS packet, and also add a same ID to a plurality of said packetized TS packets;

a determination mechanism that determines TS packets to be multiplexed from a plurality of said TS packets packetized by said TS packetizer;

and a multiplexer that multiplexes said TS packets determined by said determination mechanism, wherein said PES packetizer packetizes said audio data encoded by said first encoder, said audio data encoded by said second encoder to a PES packet such that said audio data unit satisfying a predetermined cycle appears at the head of a PES payload, said determination mechanism includes a first virtual decoder configured to decode said audio data encoded by said first encoder, and a second virtual decoder configured to decode said audio data encoded by the second encoder based on said timing value added to said audio data encoded by said second encoder, and also determines TS packets to be multiplexed based on multiplexing constraints arranged to randomly access said multiplexed TS packets, wherein the determination mechanism determines a TS packet to be multiplexed from among the plurality of TS packets packetized by the TS packetizer means on the basis of a first elementary buffer possessed by the first system target decoder and a rate at which data is transferred to the first elementary buffer and on the basis of a second elementary buffer possessed by the second system target decoder and a rate at which data is transferred to the second elementary buffer, said multiplexing constraints are constraints in which in the event that a TS includes a TS packet of audio data encoded by said second encoding means having a same point-in-time information as said point-in-time information included in a TS packet of audio data encoded by said first encoding means, the TS packet of the audio data encoded by said first encoding means is multiplexed prior to the TS packet of the audio data encoded by said second encoding means, and and wherein said determination mechanism determines TS packets to be multiplexed based on said first virtual decoder and said second virtual decoder, and said multiplexing constraints.

* * * * *